United States Patent
Baudin et al.

(10) Patent No.: US 6,929,828 B2
(45) Date of Patent: Aug. 16, 2005

(54) SURFACE-ACTIVE PHOTOINITIATORS

(76) Inventors: Gisèle Baudin, Baselmattweg 141, 4123 Allschwil (CH); Tunja Jung, Eggbergstrasse 19, 79618 Rheinfelden-Herten (DE)

(*) Notice: Subject to any disclaimer, the term of this patent is extended or adjusted under 35 U.S.C. 154(b) by 138 days.

(21) Appl. No.: 10/432,301

(22) PCT Filed: Dec. 6, 2001

(86) PCT No.: PCT/EP01/14355
§ 371 (c)(1),
(2), (4) Date: May 21, 2003

(87) PCT Pub. No.: WO02/48203
PCT Pub. Date: Jun. 20, 2002

(65) Prior Publication Data
US 2004/0058087 A1 Mar. 25, 2004

(30) Foreign Application Priority Data
Dec. 13, 2000 (EP) .............................. 00811186

(51) Int. Cl.⁷ .............................. B05D 3/02; B05D 3/06
(52) U.S. Cl. .................. 427/493; 427/515; 427/517; 427/519; 427/521
(58) Field of Search ................ 427/487, 493, 427/508, 515, 517, 519, 521

(56) References Cited

U.S. PATENT DOCUMENTS

| | | | | |
|---|---|---|---|---|
| 4,271,294 A | * | 6/1981 | Felder et al. | 544/87 |
| 4,273,907 A | * | 6/1981 | Takamizawa et al. | 528/17 |
| 4,287,367 A | * | 9/1981 | Kuesters et al. | 568/43 |
| 4,337,348 A | * | 6/1982 | Takamizawa et al. | 556/436 |
| 4,391,963 A | * | 7/1983 | Shirahata | 528/37 |
| 4,477,326 A | * | 10/1984 | Lin | 522/21 |
| 4,536,265 A | * | 8/1985 | Fabrizio et al. | 522/44 |
| 4,587,276 A | * | 5/1986 | Lien et al. | 522/34 |
| 5,095,044 A | * | 3/1992 | Husler et al. | 522/35 |
| 5,288,917 A | * | 2/1994 | Berner et al. | 568/331 |
| 5,532,112 A | * | 7/1996 | Kohler et al. | 430/281.1 |
| 5,744,512 A | | 4/1998 | Köhler et al. | 522/34 |
| 5,837,746 A | | 11/1998 | Köhler et al. | 522/8 |
| 6,197,842 B1 | * | 3/2001 | Marchin et al. | 522/35 |
| 6,376,568 B1 | | 4/2002 | Baudin et al. | 522/6 |

FOREIGN PATENT DOCUMENTS

| | | | |
|---|---|---|---|
| EP | 162572 | * | 8/1985 |
| EP | 281941 | * | 9/1988 |
| WO | WO 93/12150 | * | 6/1993 |
| WO | WO 97/49768 | * | 12/1997 |

* cited by examiner

Primary Examiner—Erma Cameron
(74) Attorney, Agent, or Firm—Shiela A. Loggins

(57) ABSTRACT

A process for the production of coatings having scratch-resistant durable surfaces, in which there is used a photo-curable formulation comprising a surface-active photoinitiator, concentrated at the surface of the formulation, of formula (Ia) or (Ib), wherein R and $R_3$ are, for example, a radical of formula (II); $R_1$ is, for example, hydrogen, $A_1$-$X_1$- or a radical of formula (II); $R_2$ is, for example, unsubstituted or substituted $C_1$–$C_{12}$alkyl or $A_2$-$X_2$-; $R_4$ is, for example, hydrogen or $A_4$-$X_4$-; $R_5$ is, for example, hydrogen or $A_5$-$X_5$- or is a radical of formula (II); $R_6$, $R_7$, $R_8$, $R_9$ and $R_{10}$ are each independently of the others, for example, hydrogen, A-X-, $A_3$-$X_3$- or $C_1$–$C_{12}$alkyl; A, $A_1$, $A_2$, $A_3$, $A_4$ and $A_5$ are each independently of the others, for example, a surface-active radical of formula (III); n is a number from 1 to 1000, m is a number from 0 to 100; p is a number from 0 to 10 000; $R_{18}$, $R_{19}$, $R_{20}$, $R_{21}$, $G_1$ and $G_2$ are, for example, $C_1$–$C_{18}$alkyl; and X, $X_1$, $X_2$, $X_3$, $X_4$ and $X_5$ are, for example, a single bond.

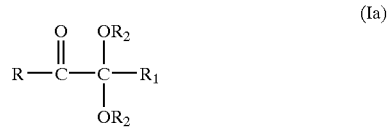

(Ia)

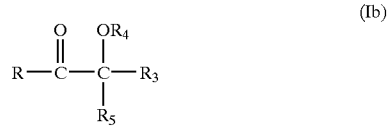

(Ib)

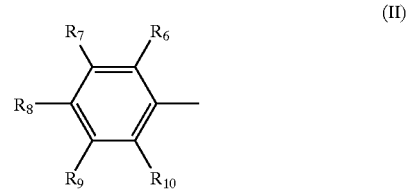

(II)

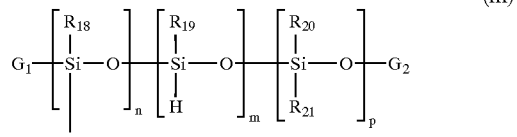

(III)

14 Claims, No Drawings

SURFACE-ACTIVE PHOTOINITIATORS

The invention relates to surface-active photoinitiators, to a process for the production of scratch-resistant durable coatings in which such photoinitiators are used, and to compositions comprising novel surface-active photoinitiators.

In order to improve the miscibility (compatibility) of photoinitiators with silicone-containing substrates that are to be photochemically crosslinked, there are proposed, for example in WO 97/49768, U.S. Pat. Nos. 5,776,658, 4,391,963 and EP 088 842, photoinitiators, for example of the hydroxyketone, aminoketone, benzoin ether, benzophenone or thioxanthone type, modified with silyl radicals, especially also polymeric silyl radicals. Also described, in patent specifications U.S. Pat. Nos. 4,536,265, 4,534,838 and EP 162 572, is a wide variety of photoinitiator structures provided with organopolysiloxane radicals. Such compounds are derived, for example, from dialkoxyacetophenones and exhibit an increased solubility in silicone substrates. U.S. Pat. No. 4,507,187 discloses silyl-group-containing diketo photoinitiators as photoinitiators that are readily soluble in silicone polymers, as well as the polymers obtained using those initiators. There are described in U.S. Pat. No. 4,477,326 self-polymerizing siloxane polymers that contain photoinitiator units as groups triggering a polymerization reaction. Polymeric photoinitiators having siloxane radicals are described in U.S. Pat. No. 4,587,276.

In J.M.S. Pure Appl. Chem. A31(3) (1994), 305–318, A. Kolar, H. F. Gruber and G. Greber report on reactive silyl-derived α-hydroxyketone photoinitiators. The literature references mentioned are concerned especially with solving the problem of improving the miscibility of the photoinitiators with the substrate to be polymerized, that is to say of making the distribution of the initiator in the substrate as homogeneous as possible. WO 98/00456 proposes specific coating compositions, as well as a curing method that results in improved properties of the coating surface.

In the coating industry, new, energy-saving curing mechanisms and applications causing as few emissions as possible are being sought for the production of durable scratch-resistant coatings. There is also a particular need to improve the surface of coatings, especially in respect of hardness, durability and gloss properties.

It has now been found that the desired properties can be attained by using certain photoinitiators in the coatings to be cured. For that purpose the photoinitiator is not distributed as homogeneously as possible in the formulation to be cured but concentrated specifically at the surface of the coating to be cured, specific orientation of the initiator towards the surface of the formulation thus taking place. To achieve this it is necessary to use photoinitiators having particular properties.

The invention relates to a process for the production of coatings having scratch-resistant durable surfaces, which comprises
(1) preparing a photocurable formulation comprising
    (A) an ethylenically unsaturated polymerizable compound; and
    (B) a photoinitiator;
(2) applying the formulation to a substrate; and
(3) curing the formulation either solely by irradiation with electromagnetic radiation of a wavelength ranging from 200 nm into the IR region, especially from 200 to 800 nm or from 200 to 600 nm, or by irradiation with electromagnetic radiation of a wavelength ranging from 200 nm into the IR region, for example from 200 to 800 nm or from 200 to 600 nm, and the prior, simultaneous and/or subsequent action of heat;
wherein
the formulation comprises as photoinitiator (B) at least one surface-active photoinitiator, concentrated at the surface of the formulation, of formula Ia or Ib:

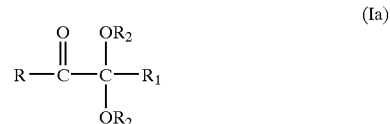

(Ia)

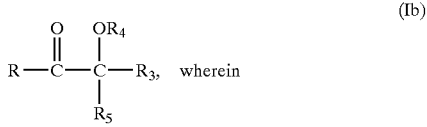

(Ib)

R and $R_3$ are each a radical of formula II

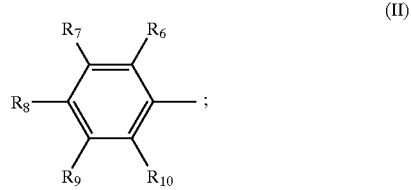

(II)

or
R and $R_3$ are naphthyl, anthracyl, phenanthryl or a heterocyclic radical, the radicals naphthyl, anthracyl, phenanthryl and the heterocycle being unsubstituted or substituted by A-X-, $A_3$-$X_3$-, $C_1$–$C_8$alkyl, phenyl, $OR_{12}$, $SR_{13}$ or/and by $NR_{14}R_{15}$, and the substituents $OR_{12}$, $SR_{13}$ and $NR_{14}R_{15}$ being capable, by way of the radicals $R_{12}$, $R_{13}$, $R_{14}$ and/or $R_{15}$ together with further substituents on the naphthyl ring, anthracyl ring, phenanthryl ring or heterocycle or together with one of the carbon atoms of the naphthyl ring, anthracyl ring, phenanthryl ring or heterocycle, of forming 5- or 6-membered rings;
$R_1$ is hydrogen, $A_1$-$X_1$- or a radical of formula (II), or $R_1$ is $C_1$–$C_{12}$alkyl unsubstituted or substituted by OH, $C_1$–$C_4$alkoxy, phenyl, naphthyl, halogen, CN, —C(O)$R_{11}$ and/or by O(CO)$R_{11}$; or $R_1$ is $C_2$–$C_{12}$alkyl interrupted by one or more non-consecutive oxygen atoms;
$R_2$ is $A_2$-$X_2$- or $C_1$–$C_{12}$alkyl unsubstituted or substituted by $C_1$–$C_4$alkoxy, phenyl, —C(O)$R_{11}$ and/or by —O(CO)$R_{11}$; or the two $R_2$ radicals together are $C_2$–$C_5$alkylene unsubstituted or substituted by $C_1$–$C_4$alkyl or by phenyl;
$R_4$ is hydrogen, $A_4$-$X_4$-; $C_1$–$C_{12}$alkyl unsubstituted or substituted by OH, $C_1$–$C_4$alkoxy, phenyl, naphthyl, halogen, CN, —C(O)$R_{11}$ and/or by —O(CO)$R_{11}$; or $R_4$ is $C_2$–$C_{12}$alkyl interrupted by one or more non-consecutive oxygen atoms;
$R_5$ is hydrogen, $A_5$-$X_5$-, -$CH_2$-$OR_4$; or $C_1$–$C_{12}$alkyl unsubstituted or substituted by OH, $C_1$–$C_4$alkoxy, phenyl, naphthyl, halogen, CN, —C(O)$R_{11}$ and/or by —O(CO) $R_{11}$; or $R_5$ is $C_2$–$C_{12}$alkyl interrupted by one or more non-consecutive oxygen atoms; or $R_5$ is a radical of formula II;
$R_6$, $R_7$, $R_8$, $R_9$, and $R_{10}$ are each independently of the others hydrogen, A-X-, $A_3$-$X_3$-; $C_1$–$C_{12}$alkyl unsubstituted or substituted by OH, $C_1$–$C_4$alkoxy, phenyl, naphthyl, halogen, CN, -C(O)$R_{11}$ and/or by -O(CO)$R_{11}$; or $C_2$–$C_{12}$alkyl interrupted by one or more non-consecutive oxygen atoms; or $R_6$, $R_7$, $R_8$, $R_9$ and $R_{10}$ are each independently of the other $OR_{12}$, $SR_{13}$, $NR_{14}R_{15}$, —C(O)$R_{11}$ or halogen, or phenyl unsubstituted or substituted by $C_1$–$C_4$alkyl or/and by $C_1$–$C_4$alkoxy, the substituents $OR_{12}$, $SR_{13}$ and $NR_{14}R_{15}$ being capable, by way of the radicals $R_{12}$, $R_{13}$, $R_{14}$ and/or $R_{15}$ together with further substituents on the phenyl ring or together with one of the carbon atoms of the phenyl ring, of forming 5- or 6-membered rings;

$R_{11}$ is $C_1$–$C_8$alkyl, or phenyl unsubstituted or substituted by $C_1$–$C_4$alkyl and/or by $C_1$–$C_4$alkoxy;

$R_{12}$ and $R_{13}$ are each independently of the other hydrogen; or $C_1$–$C_{12}$alkyl unsubstituted or substituted by OH, $C_1$–$C_4$alkoxy, phenyl, phenoxy or/and by —O(CO)$R_{11}$; or $R_{12}$ and $R_{13}$ are $C_2$–$C_{12}$alkyl interrupted by one or more non-consecutive oxygen atoms; or $R_{12}$ and $R_{13}$ are phenyl, $C_3$–$C_6$alkenyl, cyclopentyl, cyclohexyl or naphthyl, those radicals being unsubstituted or substituted by $C_1$–$C_4$alkoxy, phenyl or/and by $C_1$–$C_4$alkyl;

$R_{14}$ and $R_{15}$ are each independently of the other hydrogen; $C_1$–$C_{12}$alkyl unsubstituted or substituted by OH, $C_1$–$C_4$alkoxy or/and by phenyl; or $C_2$–$C_{12}$alkyl interrupted by one or more non-consecutive oxygen atoms; or $R_{14}$ and $R_{15}$ are phenyl, —(CO)$R_{11}$ or $SO_2R_{16}$; or $R_{14}$ and $R_{15}$, together with the nitrogen atom to which they are bonded, form a 5-, 6- or 7-membered ring that is optionally interrupted by —O— or by —$NR_{17}$—;

$R_{16}$ is $C_1$–$C_{12}$alkyl, unsubstituted phenyl or phenyl substituted by $C_1$–$C_4$alkyl;

$R_{17}$ is hydrogen, $C_1$–$C_8$alkyl unsubstituted or substituted by OH or by $C_1$–$C_4$alkoxy; or phenyl unsubstituted or substituted by OH, $C_1$–$C_4$alkyl or by $C_1$–$C_4$alkoxy;

with the proviso that in formulae (Ia) and (Ib) at least one substituent A-X- , $A_1$-$X_1$-, $A_2$-$X_2$-, $A_3$-$X_3$-, $A_4$-$X_4$- or $A_5$-$X_5$- is present;

A, $A_1$, $A_2$, $A_3$, $A_4$ and $A_5$ are each independently of the others a surface-active radical of formula III

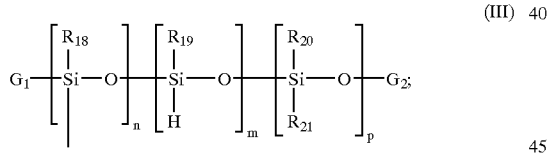
(III)

wherein the units IIIa1, IIIa2, IIIa3, IIIa4, IIIa5, IIIa6, IIIa7, IIIb and/or IIIc

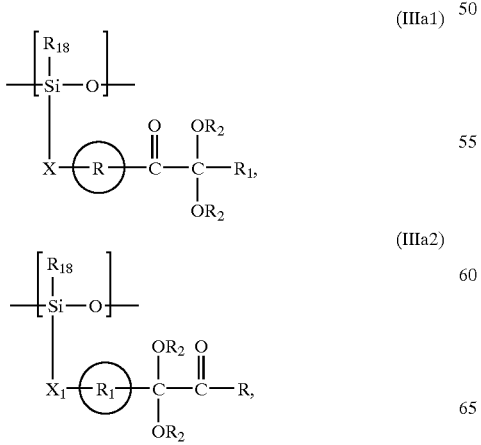
(IIIa1)
(IIIa2)

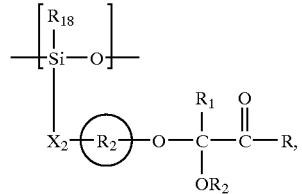
(IIIa3)

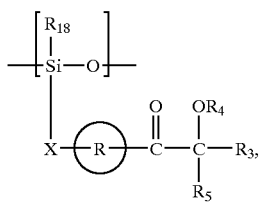
(IIIa4)

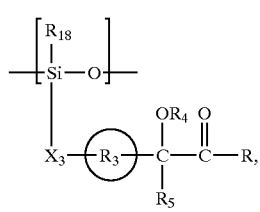
(IIIa5)

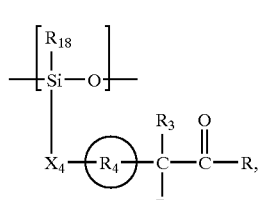
(IIIa6)

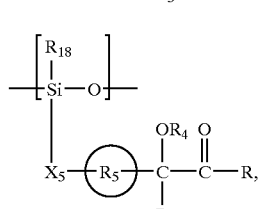
(IIIa7)

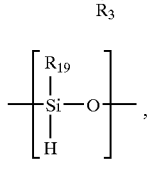
(IIIb)

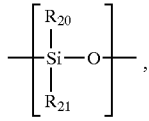
(IIIc)

are distributed randomly or in blocks, and in which formulae the circle is intended to denote that a radical R, $R_1$, $R_2$, $R_3$, $R_4$, $R_5$ as defined above is substituted by the appropriate silyl radical by way of the bridge X, $X_1$, $X_2$, $X_3$, $X_4$, $X_5$;

or

A, $A_1$, $A_2$, $A_3$, $A_4$ and $A_5$ are each independently of the others a surface-active radical $A_0$;

n is a number from 1 to 1000 or, when the siloxane starting material is a mixture of oligomeric siloxanes, n can also be less than 1 but greater than 0;

m is a number from 0 to 100;

p is a number from 0 to 10 000;

A₀ is $C_6$–$C_{30}$alkyl, $C_6$–$C_{30}$alkenyl, $C_6$–$C_{30}$alkynyl, $C_6$–$C_{30}$aralkyl, $C_6$–$C_{30}$alkyl-(CO)—, $C_6$–$C_{30}$alkenyl-(CO)—, $C_6$–$C_{30}$alkynyl-(CO)—, $C_6$–$C_{30}$aralkyl-(CO)—, $C_6$–$C_{30}$alkyl-Si($R_{18}$)($R_{19}$)—, $C_6$–$C_{30}$alkenyl-Si($R_{18}$)($R_{19}$)— or $C_8$–$C_{30}$alkynyl-Si($R_{18}$)($R_{19}$)— each of which being unsubstituted or substituted by OH, $C_1$–$C_4$alkoxy, phenyl, naphthyl, halogen, CN, $SR_{13}$, $NR_{14}R_{15}$ and/or by —O(CO)$R_{11}$ and optionally being interrupted by one or more —O—, —S— or —$NR_{17}$—;

$G_1$ is $C_1$–$C_{18}$alkyl or a radical of formula

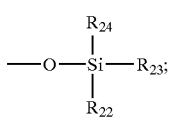

$G_2$ is $C_1$–$C_{18}$alkyl or a radical of formula

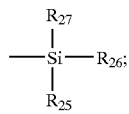

or $G_1$ and $G_2$ together are a single bond;

$R_{18}$, $R_{19}$, $R_{20}$, $R_{22}$, $R_{23}$, $R_{24}$, $R_{25}$, $R_{26}$ and $R_{27}$ are each independently of the others $C_1$–$C_{18}$alkyl, phenyl, $C_2$–$C_6$hydroxyalkyl, $C_2$–$C_6$aminoalkyl or $C_5$–$C_8$cycloalkyl;

$R_{21}$ is unsubstituted $C_1$–$C_{18}$alkyl or $C_1$–$C_{18}$alkyl substituted by hydroxy, $C_1$–$C_{12}$alkoxy, halogen, $C_3$–$C_8$cycloalkyl and/or by $N(R_{14})(R_{15})$; or $R_{21}$ is unsubstituted phenyl or phenyl substituted by $C_1$–$C_{12}$alkyl, $C_1$–$C_{12}$alkoxy, halogen, hydroxy and/or by $N(R_{14})(R_{15})$; or $R_{21}$ is $C_5$–$C_8$cycloalkyl;

X and $X_3$, when A or $A_3$ is a radical of formula III, are each independently of the other a single bond,
- —U—$C_1$–$C_{10}$alkylene, —U—$C_3$–$C_{12}$cycloalkylene,
- —U—$C_6$–$C_{12}$bicycloalkylene, —U—$C_1$–$C_{10}$alkylene interrupted by one or more non-consecutive $C_3$–$C_{12}$cycloalkylene,
- —U—$C_3$–$C_{12}$cycloalkylene, $C_6$–$C_{12}$bicycloalkylene or —U—$C_6$–$C_{12}$bicycloalkylene,
- —U—$C_1$–$C_{10}$alkylene interrupted by one or more non-consecutive O and $C_3$–$C_{12}$cycloalkylene, —U—$C_3$–$C_{12}$cycloalkylene, $C_6$–$C_{12}$bicycloalkylene and/or —U—$C_6$–$C_{12}$bicycloalkylene,

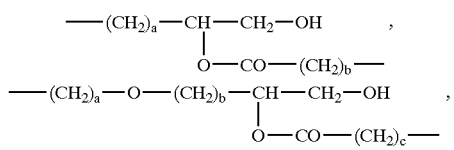

—($CH_2$)$_a$—CH(OH)—$CH_2$—O—CO—($CH_2$)$_b$—, —($CH_2$)$_a$—O—($CH_2$)$_b$—CH(OH)—$CH_2$—O—CO—($CH_2$)$_c$—, $C_2$–$C_{10}$alkenylene, $C_2$–$C_{10}$alkynylene —($CH_2$)$_a$—O—, —O—($CH_2$)$_a$—, —O—($CH_2$)$_a$—O—, —($CH_2$)$_a$—O—($CH_2$)$_b$—, —($CH_2$)$_a$—O—($CH_2$)$_b$—O—($CH_2$)$_c$—, —($CH_2$)$_a$—$NR_{17}$—($CH_2$)$_b$—, —($CH_2$)$_a$—$NR_{17}$—, —($CH_2$)$_a$—O—($CH_2$)$_b$—$NR_{17}$—, —($CH_2$)$_a$—O—($CH_2$)$_b$—$NR_{17}$—($CH_2$)$_c$—, —($C_2$–$C_{10}$alkenylene)-O—($CH_2$)$_a$—, —($C_2$–$C_{10}$alkenylene)-O—, —($C_2$–$C_{10}$alkynylene)-O—($CH_2$)$_a$—, —($C_2$–$C_{10}$alkynylene)-O—, —($C_2$–$C_{10}$alkenylene)-O—($CH_2$)$_a$—O—, —($C_2$–$C_{10}$alkynylene)-O—($CH_2$)$_a$—O—, —($C_2$–$C_{10}$alkenylene)-$NR_{17}$—, —($C_2$–$C_{10}$alkenylene)-O—($CH_2$)$_a$—$NR_{17}$—, —($C_2$–$C_{10}$alkynylene)-$NR_{17}$— or —($C_2$–$C_{10}$alkynylene)-O—($CH_2$)$_a$—$NR_{17}$—;

and

X and $X_3$, when A or $A_3$ denotes $A_0$, are each independently of the other a single bond, —O—, —S— or —$NR_{17}$—;

$X_1$ and $X_5$, when $A_1$ or $A_5$ is a radical of formula III, are each independently of the other a single bond,
- —$CH_2$—U—$C_1$–$C_{10}$alkylene, —$CH_2$—U—$C_3$–$C_{12}$cycloalkylene,
- —$CH_2$—U—$C_6$–$C_{12}$bicycloalkylene, —$CH_2$—U—$C_1$–$C_{10}$alkylene interrupted by one or more non-consecutive $C_3$–$C_{12}$cycloalkylene, —U—$C_3$–$C_{12}$cycloalkylene, $C_6$–$C_{12}$bicycloalkylene or —U—$C_6$–$C_{12}$bicycloalkylene,
- —U—$C_1$–$C_{10}$alkylene interrupted by one or more non-consecutive O and $C_3$–$C_{12}$cycloalkylene,
- —U—$C_3$–$C_{12}$cycloalkylene, $C_6$–$C_{12}$bicycloalkylene and/or —U—$C_6$–$C_{12}$bicycloalkylene,

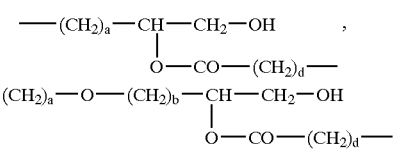

—($CH_2$)$_a$—CH(OH)—$CH_2$—O—CO—($CH_2$)$_d$—, —($CH_2$)$_a$—O—($CH_2$)$_b$—CH(OH)—$CH_2$—O—CO—($CH_2$)$_d$—, $C_2$–$C_{10}$alkenylene, $C_2$–$C_{10}$alkynylene —($CH_2$)$_a$—O—, —($CH_2$)$_a$—O—($CH_2$)$_b$—, —($CH_2$)$_a$—O—($CH_2$)$_b$—O—, —($CH_2$)$_a$—O—($CH_2$)$_b$—O—($CH_2$)$_c$—, —($CH_2$)$_a$—$NR_{17}$—($CH_2$)$_b$—, —($CH_2$)$_a$—$NR_{17}$—($CH_2$)$_b$—O—, —($CH_2$)$_a$—$NR_{17}$—($CH_2$)$_b$—O—($CH_2$)$_c$—, —($C_2$–$C_{10}$alkenylene)-O—($CH_2$)$_a$—, —($C_2$–$C_{10}$alkenylene)-O—, —($C_2$–$C_{10}$alkynylene)-O—($CH_2$)$_a$—, —($C_2$–$C_{10}$alkynylene)-O—, —($C_2$–$C_{10}$alkenylene)-$NR_{17}$—($CH_2$)$_a$—, —($C_2$–$C_{10}$alkenylene)-$NR_{17}$—($CH_2$)$_a$—O—, —($C_2$–$C_{10}$alkenylene)-$NR_{17}$—($CH_2$)$_a$—O—($CH_2$)$_c$—, —($C_2$–$C_{10}$alkynylene)-$NR_{17}$—($CH_2$)$_a$—, —($C_2$–$C_{10}$alkynylene)-$NR_{17}$—($CH_2$)$_a$—O— or —($C_2$–$C_{10}$alkynylene)-$NR_{17}$—($CH_2$)$_a$—O—($CH_2$)$_c$—;

and $X_1$ and $X_5$, when $A_1$ or $A_5$ denotes $A_0$, are each independently of the other a single bond;

$X_2$ and $X_4$, when $A_2$ or $A_4$ is a radical of formula III, are each independently of the other a single bond,
- —$CH_2$—U—$C_1$–$C_{10}$alkylene, —$CH_2$—U—$C_3$–$C_{12}$cycloalkylene,
- —$CH_2$—U—$C_6$–$C_{12}$bicycloalkylene, —$CH_2$—U—$C_1$–$C_{10}$alkylene interrupted by one or more non-consecutive $C_3$–$C_{12}$cycloalkylene, —U—$C_3$–$C_{12}$cycloalkylene, $C_6$–$C_{12}$bicycloalkylene or —U—$C_6$–$C_{12}$bicycloalkylene, —$CH_2$—U—$C_1$–$C_{10}$alkylene interrupted by one or more non-consecutive O and $C_3$–$C_{12}$cycloalkylene, —$CH_2$—U—$C_3$–$C_{12}$cycloalkylene, $C_6$–$C_{12}$bicycloalkylene and/or —U—$C_6$–$C_{12}$bicycloalkylene,

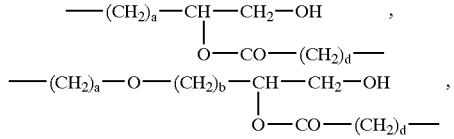

—$(CH_2)_a$—CH(OH)—$CH_2$—O—CO—$(CH_2)_d$—,
—$(CH_2)_a$—O—$(CH_2)_b$CH(OH)—$CH_2$—O—CO—$(CH_2)_d$—,
$C_2$–$C_{10}$alkenylene, $C_2$–$C_{10}$alkynylene, —$(CH_2)_a$—O—, —$(CH_2)_a$—O—$(CH_2)_b$—,
—$(CH_2)_a$—O—$(CH_2)_b$—O—, —$(CH_2)_a$—$NR_{17}$—$(CH_2)_b$—,
—$(CH_2)_a$—$NR_{17}$—$(CH_2)_b$—O—,
—$(CH_2)_a$—$NR_{17}$—$(CH_2)_b$—O—$(CH_2)_c$—,
—($C_2$–$C_{10}$alkenylene)-O—$(CH_2)_a$—,
—($C_2$–$C_{10}$alkenylene)-O—, —($C_2$–$C_{10}$alkynylene)-O—$(CH_2)_a$— or
—($C_2$–$C_{10}$alkynylene)-O—; and $X_2$ and $X_4$, when $A_2$ or $A_4$ denotes $A_0$, are each independently of the other a single bond;

—U— is —COO—, —$(CH_2)_a$—COO— —Si— or $(CH_2)_a$—Si— a, b and c are each independently of the others a number from 0 to 10; with the proviso, however, that they are at least 1 when the methylene group in question is positioned between two oxygen atoms or between an oxygen atom and a nitrogen atom.

d is a number from 1 to 10.

$C_1$–$C_{18}$Alkyl is linear or branched and is, for example, $C_1$–$C_{12}$—, $C_1$–$C_8$—, $C_1$–$C_6$— or $C_1$–$C_4$-alkyl. Examples include methyl, ethyl, propyl, isopropyl, n-butyl, sec-butyl, isobutyl, tert-butyl, pentyl, hexyl, heptyl, 2,4,4-trimethylpentyl, 2-ethylhexyl, octyl, nonyl, decyl, undecyl, dodecyl, tetradecyl, pentadecyl, hexadecyl, heptadecyl and octadecyl.

$C_1$–$C_{12}$alkyl, $C_1$–$C_8$alkyl and $C_1$–$C_4$alkyl have the same meanings as given above up to the corresponding number of carbon atoms.

$C_6$–$C_{30}$Alkyl is likewise linear or branched and is, for example: $C_6$–$C_{24}$—, $C_6$–$C_{12}$—, $C_{10}$–$C_{30}$—, $C_{10}$–$C_{24}$— or $C_{12}$–$C_{30}$-alkyl. Examples include hexyl, heptyl, 2,4,4-trimethylpentyl, 2-ethylhexyl, octyl, nonyl, decyl, undecyl, dodecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl and triacontyl.

$C_2$–$C_{12}$Alkyl interrupted by one or more oxygen atoms is interrupted, for example, from 1 to 9 times, e.g. from 1 to 7 times or once or twice, by —O—. When the radicals are interrupted by a plurality of oxygen atoms, the oxygen atoms are in each case separated from one another by at least one methylene group resulting, for example, in structural units such as —$CH_2$—O—$CH_3$, —$CH_2CH_2$—O—$CH_2CH_3$, —[$CH_2CH_2O$]$_y$—$CH_3$, in which y=from 1 to 9, —($CH_2CH_2O$)$_7$$CH_2CH_3$, —$CH_2$—CH($CH_3$)—O—$CH_2$—$CH_2CH_3$ or —$CH_2$—CH($CH_3$)—O—$CH_2CH_3$.

$C_2$–$C_6$Hydroxyalkyl is $C_2$–$C_6$alkyl substituted by OH. The alkyl radical is linear or branched and can have the meanings given hereinabove (up to the corresponding number of carbon atoms).

$C_2$–$C_6$Aminoalkyl is $C_2$–$C_6$alkyl substituted by $NH_2$. The alkyl radical is linear or branched and can have the meanings given above (up to the corresponding number of carbon atoms).

$C_1$–$C_{12}$Alkoxy denotes linear or branched radicals and is, for example, $C_1$–$C_{10}$—, $C_1$–$C_8$—, $C_1$–$C_6$— or $C_1$–$C_4$-alkoxy. Examples include methoxy, ethoxy, propoxy, isopropoxy, n-butyloxy, sec-butyloxy, isobutyloxy, tert-butyloxy, pentyloxy, hexyloxy, heptyloxy, 2,4,4-trimethylpentyloxy, 2-ethylhexyloxy, octyloxy, nonyloxy, decyloxy and dodecyloxy, especially methoxy, ethoxy, propoxy, isopropoxy, n-butyloxy, sec-butyloxy, isobutyloxy, tert-butyloxy, preferably methoxy. $C_1$–$C_4$Alkoxy is likewise linear or branched and has, for example, the meanings given hereinabove up to the corresponding number of carbon atoms.

$C_3$–$C_8$Cycloalkyl is linear or branched alkyl that contains at least one ring, for example cyclopropyl, cyclopentyl, methylcyclopentyl, cyclohexyl, methyl- or dimethyl-cyclohexyl, or cyclooctyl, especially cyclopentyl or cyclohexyl.

$C_5$–$C_8$Cycloalkyl has the meanings given hereinabove up to the corresponding number of carbon atoms.

$C_3$–$C_6$Alkenyl may be mono- or poly-unsaturated and also linear or branched and is, for example, $C_3$–$C_4$alkenyl. Examples include allyl, methallyl, 1,1-dimethylallyl, 1-butenyl, 2-butenyl, 1,3-pentadienyl and 1-hexenyl, especially allyl.

$C_6$–$C_{30}$Alkenyl is likewise linear or branched and mono- or poly-unsaturated and is, for example: $C_6$–$C_{24}$—, $C_6$–$C_{12}$—, $C_{10}$–$C_{30}$—, $C_{10}$–$C_{24}$— or $C_{12}$–$C_{30}$-alkenyl. Examples include hexenyl, heptenyl, 2,4,4-trimethylpentenyl, 2-ethylhexenyl, octenyl, nonenyl, decenyl, undecenyl, dodecenyl, tetradecenyl, pentadecenyl, hexadecenyl, heptadecenyl, octadecenyl, nona-decenyl, icosenyl, henicosenyl, docosenyl, tricosenyl, tetracosenyl, pentacosenyl, hexacosenyl, heptacosenyl, octacosenyl and triacontenyl.

$C_6$–$C_{30}$Alkynyl is linear or branched and mono- or poly-unsaturated and is, for example: $C_6$–$C_{24}$—, $C_6$–$C_{12}$—, $C_{10}$–$C_{30}$—, $C_{10}$–$C_{24}$— or $C_{12}$–$C_{30}$-alkynyl. Examples include hexynyl, heptynyl, 2,4,4-trimethylpentynyl, 2-ethylhexynyl, octynyl, nonynyl, decynyl, undecynyl, dodecynyl, tetradecynyl, pentadecynyl, hexadecynyl, heptadecynyl, octadecynyl, nonadecynyl, icosynyl, henicosynyl, docosynyl, tricosynyl, tetracosynyl, pentacosynyl, hexacosynyl, heptacosynyl, octacosynyl and triacontynyl.

Alkylene and cycloalkylene groups are divalent forms of alkyl and cycloalkyl group as defined above.

$C_6$–$C_{12}$Bicycloalkylene is preferably bicycloheptylene, bicyclooctylene.

$C_6$–$C_{30}$Aralkyl is alkyl substituted by an aromatic radical. Examples include phenyl-$C_1$–$C_{24}$-alkyl, naphthyl-$C_1$–$C_{20}$alkyl, anthryl-$C_1$–$C_{16}$alkyl and phenanthryl-$C_1$–$C_{16}$alkyl, the alkyl radicals $C_1$–$C_{24}$—, $C_1$–$C_{20}$— and $C_1$–$C_{16}$— in question being substituted by the respective aromatic radical phenyl, naphthyl, anthryl or phenanthryl. The alkyl radicals are linear or branched and may have the meanings given above. Examples include benzyl, phenylethyl, α-methylbenzyl, phenylpentyl, phenylhexyl and α,α-dimethylbenzyl, especially benzyl, naphthylmethyl, naphthylethyl, naphthylpropyl and naphthyl-1-methylethyl, more especially naphthylmethyl. The alkyl unit may be in either the 1- or the 2-position of the naphthyl ring.

Halogen is fluorine, chlorine, bromine or iodine, especially chlorine or bromine, preferably fluorine.

Substituted phenyl is mono- to penta-substituted, for example mono-, di- or tri-substituted, especially mono- or di-substituted, on the phenyl ring.

A heterocyclic radical is to be understood in this context as meaning either an aliphatic or aromatic ring containing one or more, especially one or two, hetero atoms. It may also be a fused ring system. There come into consideration as the hetero atoms, for example, especially O, N and S. Examples include furyl, thienyl, pyrrolyl, oxinyl, dioxinyl and pyridyl. 5- or 6-membered rings are preferred. R denoting a heterocyclic radical is, for example, pyrrolyl, pyrrolidinyl, oxazolyl, pyridyl, 1,3-diazinyl, 1,2-diazinyl, piperidyl, morpholinyl, thianthrenyl, furanyl, pyranyl, xanthenyl, imidazolyl, thiazoylyl, pyrimidinyl, indazolinyl, indolyl, indazolyl, purinyl, isoquinolyl, quinolyl, xanthyl, thioxanthyl, acridinyl etc..

When $OR_{12}$—, $SR_{13}$— or $NR_{14}R_{15}$-substituted naphthyl, anthracyl, phenanthryl or heterocyclic rings, together with the radicals $R_{12}$, $R_{13}$, $R_{14}$ or/and $R_{15}$, form 5- or 6-membered rings, then, for example, the following structures are included

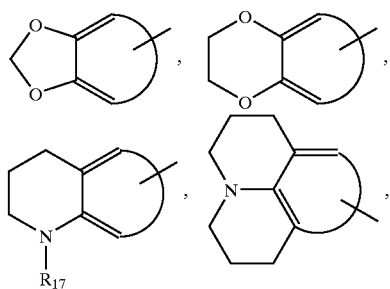

the arc and the two double bonds in each case representing the aromatic ring system.

When $R_6$, $R_7$, $R_8$, $R_9$ or $R_{10}$ denoting $OR_{12}$, $SR_{13}$ or $NR_{14}R_{15}$, together with further substituents on the phenyl ring or together with a carbon atom of the phenyl ring, form a 5- or 6-membered ring, then, for example, the following systems are included

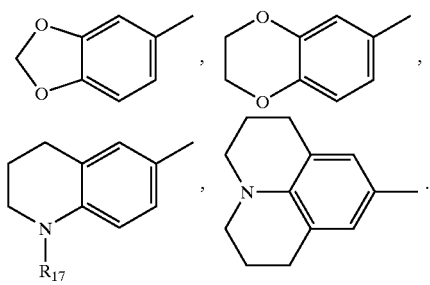

When $R_{14}$ and $R_{15}$, together with the nitrogen atom to which they are bonded, form a 5- or 6-membered ring that in addition may be interrupted by —O— or by —$NR_{17}$—, the ring is, for example, a saturated or unsaturated ring, for example aziridine, piperazine, pyrrole, pyrrolidine, oxazole, pyridine, 1,3-diazine, 1,2-diazine, piperidine or morpholine; morpholinyl, piperidyl or piperazinyl rings, especially, are formed.

When the two $R_2$ radicals together are $C_2$–$C_5$alkylene unsubstituted or substituted by $C_1$–$C_4$-alkyl or by phenyl then, together with the two oxygen atoms and the carbon atom at which the $OR_2$ groups are positioned, they form a ring, which may be substituted by $C_1$–$C_4$alkyl or by phenyl. $C_2$–$C_5$Alkylene is, for example, methylene, ethylene, propylene, butylene or pentylene. The following structures, for example, may be obtained:

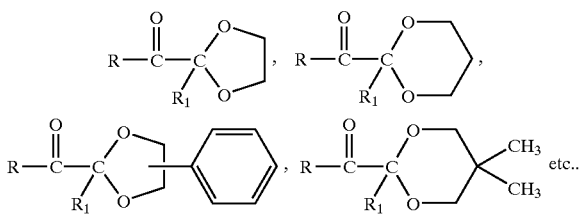

The units of formulae IIIa1, IIIa2, IIIa3, IIIa4, IIIa5, IIIa6, IIIa7, IIIb and/or IIIc are arranged randomly or in blocks, that is to say the sequence of the units in the representation of formula III is as desired. For example, blocks of units of formulae IIIa1, IIIa2, IIIa3, IIIa4, IIIa5, IIIa6, IIIa7, IIIb, IIIc can appear in succession, but it is also possible for the individual units to be linked in random distribution, depending on the siloxane used in the preparation process.

X, $X_1$, $X_2$, $X_3$, $X_4$ and $X_5$ denoting $C_1$–$C_{10}$alkylene are each linear or branched alkylene, for example $C_1$–$C_8$—, $C_1$–$C_6$—, $C_1$–$C_4$—, $C_2$–$C_8$— or $C_2$–$C_4$-alkylene, for example methylene, ethylene, propylene, isopropylene, n-butylene, sec-butylene, isobutylene, tert-butylene, pentylene, hexylene, heptylene, octylene, nonylene or decylene. X, $X_1$, $X_2$, $X_3$, $X_4$ and $X_5$ are especially $C_1$–$C_8$alkylene, e.g. ethylene, octylene,

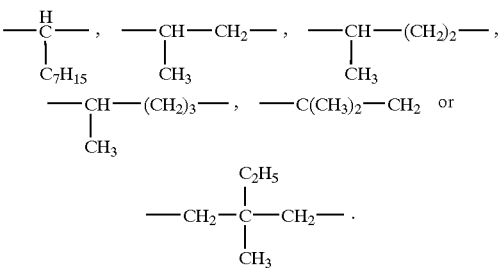

X, $X_1$, $X_2$, $X_3$, $X_4$ and $X_5$ denoting $C_3$–$C_{12}$cycloalkylene are each linear or branched alkylene groups containing at least one ring, for example cyclopropylene, cyclobutylene, cyclopentylene, cyclohexylene etc.

X, $X_1$, $X_2$, $X_3$, $X_4$ and $X_5$ denoting $C_6$–$C_{12}$bicycloalkylene are each linear or branched groups containing at least one bicyclic ring, like for example bicycloheptylene, bicyclooctylene.

$C_2$–$C_{10}$Alkenylene is mono- or poly-unsaturated, linear or branched, and is, for example, $C_2$–$C_8$—, $C_4$–$C_8$—, $C_3$–$C_8$— or $C_2$–$C_4$-alkenylene, e.g. ethenylene, 1-propenylene, 1-butenylene, 3-butenylene, 2-butenylene, 1,3-pentadienylene, 5-hexenylene or 7-octenylene.

$C_4$–$C_8$Alkenylene has the same meanings as those given above, according to the number of carbon atoms.

$C_2$–$C_{10}$alkynylene is mono- or poly-unsaturated, linear or branched and is, for example, $C_2$–$C_8$—, $C_3$–$C_8$— or $C_2$–$C_4$-alkynylene. Examples include hexynylene, heptynylene, 2,4,4-tri-methylpentynylene, 2-ethylhexynylene, octynylene, nonynylene and decynylene.

The expression "and/or" is intended to indicate that not only one of the defined alternatives (substituents) may be present, but equally a plurality of various of the defined alternatives (substituents) may be present simultaneously, that is to say mixtures of different alternatives (substituents).

The expression "at least" is intended to define one or more than one, for example one, two or three, preferably one or two.

In the description and in the patent claims, unless expressly indicated otherwise the word "comprising" is to be understood as meaning that a defined entity or a defined group of entities are included, without, however, any other substances that have not been specifically mentioned being excluded.

"a", "b" and "c" are preferably a number from 0 to 10, e.g. from 0 to 3, especially 3, but with the proviso that they are at least 1 when the methylene group in question is positioned between two oxygen atoms or between an oxygen atom and a nitrogen atom;

"p" is, for example, from 1 to 1000, from 1 to 100, from 1 to 50 or from 1 to 25; and "m" is from 0 to 100, for example from 0 to 50 or from 0 to 25, especially 0.

"n" is preferably from 1 to 100; when the siloxane starting material is a mixture of oligomeric siloxanes, "n" can also be less than 1 but greater than 0. It is in that case, for example, a number from 0.1 to 1000, from 0.5 to 1000, from 0.8 to 1000 etc..

A, $A_1$, $A_2$, $A_3$, $A_4$ und $A_5$ are preferably a radical of formula III.

Some of the compounds of formula I are novel and are included in the present application.

R is especially a radical of formula II or denotes naphthyl; a radical of formula II is preferred.

In the compounds of formulae I, when R and/or $R_3$ denote(s) a radical of formula II, at least one of the substituents $R_6$, $R_7$, $R_8$, $R_9$ and $R_{10}$ is a group -X-A or -$X_3$-$A_3$; or at least one of the substituents $R_2$, $R_4$ and $R_5$ is a group -$X_2$-$A_2$, -$X_4$-$A_4$ or -$X_5$-$R_5$. When one of the substituents $R_6$, $R_7$, $R_8$, $R_9$ and $R_{10}$ in R and $R_3$ is a group -X-A or -$X_3$-$A_3$ then, for example, from 1 to 3 or 1 or 2 or one of the substituents $R_6$, $R_7$, $R_8$, $R_9$ and $R_{10}$ is/are a group -X-A or -$X_3$-$A_3$. Preferably, 1 or 2 of the radicals $R_6$, $R_7$, $R_8$, $R_9$ and $R_{10}$ is/are -X-A or -$X_3$-$A_3$. $R_6$, $R_8$ or/and $R_{10}$ is/are especially a group - X-A or -$X_3$-$A_3$. Preferably, $R_6$ or/and $R_8$ is/are a group -X-A or -$X_3$-$A_3$.

$R_6$, $R_7$, $R_8$, $R_9$ and $R_{10}$, besides being a group —X-A or —$X_3$-$A_3$, are especially hydrogen, $C_1$–$C_4$alkyl or $C_1$–$C_4$alkoxy, preferably hydrogen.

$R_{11}$ is especially $C_1$–$C_4$alkyl or phenyl.

$R_{12}$ and $R_{13}$ are especially $C_1$–$C_4$alkyl, hydrogen, phenyl, or $C_2$–$C_6$alkyl interrupted by oxygen, preferably $C_1$–$C_4$alkyl or hydrogen.

$R_{14}$ and $R_{15}$ are especially $C_1$–$C_4$alkyl, preferably methyl, or, together with the nitrogen atom to which they are bonded, form a morpholinyl radical.

$R_{16}$ is especially $C_1$–$C_4$alkyl, unsubstituted phenyl or phenyl substituted by $C_1$–$C_4$alkyl.

$R_{17}$ is preferably hydrogen, $C_1$–$C_4$alkyl, or $C_1$–$C_4$alkyl substituted by OH.

$R_{18}$, $R_{19}$ and $R_{20}$ are preferably $C_1$–$C_4$alkyl, especially methyl.

$R_{21}$ is especially $C_1$–$C_4$alkyl, e.g. methyl.

$A_0$ is especially a $C_6$–$C_{30}$alkyl radical, that radical being unsubstituted or substituted by halogen. Preferably, $C_6$–$C_{30}$alkyl is unsubstituted or substituted by halogen, preferably fluorine. When the radical $C_6$–$C_{30}$alkyl is substituted by fluorine, it is preferably perfluorinated.

X and $X_1$ are preferably $C_3$–$C_6$alkylene, —$(CH_2)_a$—O— or —$(CH_2)_a$—O—$(CH_2)_b$—O—, especially —$(CH_2)_a$—

O— or —$(CH_2)_a$—O—$(CH_2)_b$—O—, a being especially 3 and b being especially 2.

$X_1$ and $X_5$ are preferably $C_3$–$C_6$alkylene or —$(CH_2)_a$—O—$(CH_2)_b$—, a being especially 2 and b being especially 3; $X_1$ and $X_5$ are especially $C_3$–$C_6$alkylene.

$X_2$ and $X_4$ are preferably $C_3$–$C_6$alkylene or —$(CH_2)_a$—O—$(CH_2)_b$—, a and b being expecially 3, $X_2$ and $X_4$ are especially $C_3$–$C_6$alkylene.

The compounds of formula I are prepared according to conventional methods known to the person skilled in the art.

I. When A is a radical of formula III, the compounds of formulae Ia and Ib can be obtained, for example, by reaction of a photoinitiator having (at least) one alkenyl radical (IV), (IVa), (IVb) or (IVc) with a siloxane (V) in the presence of a suitable catalyst:

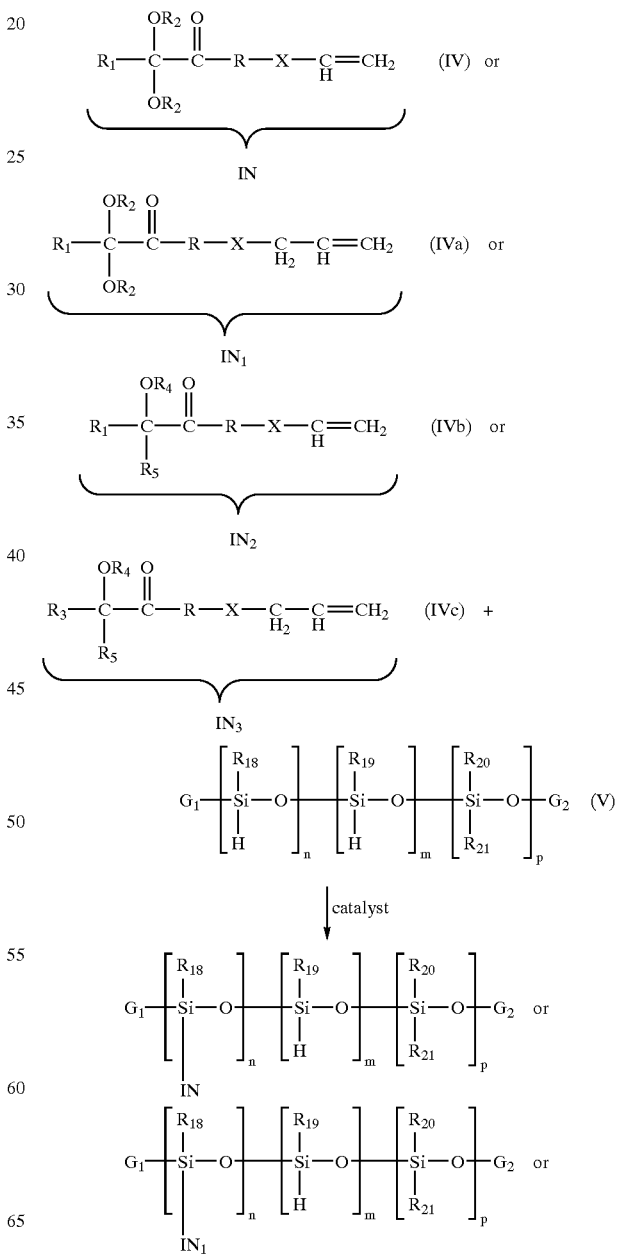

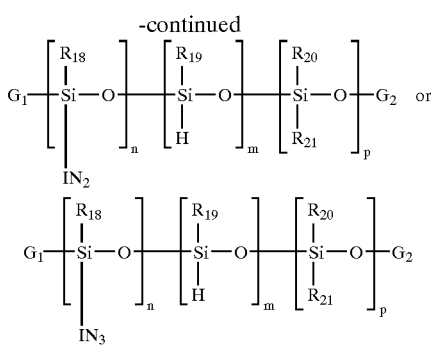

wherein IN, $IN_1$, $IN_2$ and $IN_3$ denote the radicals indicated above, but in the reaction the double bonds each become single bonds and the CH group becomes a $CH_2$ group, that is to say, in the product, —$CH_2$=CH— becomes —$CH_2$—$CH_2$— and —$CH_2$=$CH_2$—$CH_2$— becomes —$(CH_2)_3$—; R, $R_1$, $R_2$, $R_3$, $R_4$, $R_5$, $R_{18}$, $R_{19}$, $R_{20}$, $R_{21}$, X, $G_1$, $G_2$, n, m and p are as defined hereinbefore.

Conditions for such reactions are known to the person skilled in the art. The molar ratios of the alkenyl-modified compounds (IV), (IVa), (IVb) or (IVc) and the siloxane compounds (V) depend on the product desired and are generally not critical. For example the amount of (IV), (IVa), (IVb) or (IVc) to be used is selected in accordance with the content of free Si—H groups in (V) and the desired degree of substitution of those groups in the case in question. If all groups are to react, then, for example, advantageously (IV), (IVa), (IVb) or (IVc) should be added in excess. It is, however, also possible to use an excess of component (V).

The reaction temperatures are advantageously maintained in a range from 20 to 150° C., preferably from 60 to 110° C. It is furthermore advantageous to carry out the reaction, for example, in a suitable aprotic organic solvent, for example tetrahydrofuran (THF), dioxane, hexane, heptane, cyclohexane, toluene, xylene, benzene or chlorobenzene, but it is, for example, also possible to work without solvents.

The reaction mixture is usually stirred while the reaction is being carried out.

The reaction is furthermore advantageously carried out under inert conditions, for example under an argon or nitrogen atmosphere.

Catalysts suitable for the reaction procedure include, for example, noble metal catalysts, for example platinum or rhodium catalysts. Examples include $H_2PtCl_6$ and $PtCl_2$ $(C_6H_5$—CH=$CH_2)_2$. Such catalysts can be supported, for example, on suitable carrier materials, for example on aluminium oxide, such as $Pt/Al_2O_3$ (obtainable, for example, from Heraeus). There can be used as carrier material, for example, also carbon (Pt/C—but that catalyst does not have to be anhydrous—obtainable, for example, from Johnson Matthey). Examples of suitable catalysts include platinum, palladium, rhodium, nickel, cobalt and other metals, especially in powder form or in the form of complexes. Examples include platinum sponge, platinum black, chloroplatinic acid, the reaction product of chloroplatinic acid and alcohol, a complex of chloroplatinic acid and vinylsiloxane. Such catalysts are available commercially, e.g. platinum-carbonyl-cyclovinylmethylsiloxane complex, platinum-divinyl-tetramethyldisiloxane complex, platinum octane aldehyde/octanol complex, or can be obtained according to methods that are known to the person skilled in the art and are customary in the art.

The concentration of the catalyst is advantageously, for example, from 1 to 1000 ppm, e.g. from 150 to 400 ppm.

The alkenyl-modified photoinitiators (IV), (IVa) can be prepared according to methods known to the person skilled in the art, for example according to the method described in EP 162 572, EP 0 228 145, U.S. Pat. Nos. 4,534,838 or 4,587,276. Appropriate methods are also published in U.S. Pat. Nos. 4,391,963, 4,536,265 and 4,477,326.

Some of the siloxane compounds (V) are available commercially, or they can be obtained according to methods known to the person skilled in the art. For example, methods of preparation and literature references for their preparation may be found in the catalogue of the company Geleste: "ABCR Geleste 2000", pages 434–447.

II. A further possible method of preparing the surface-active photoinitiators is the reaction of a photoinitiator containing an appropriate silyl group with an alkenyl-modified siloxane:

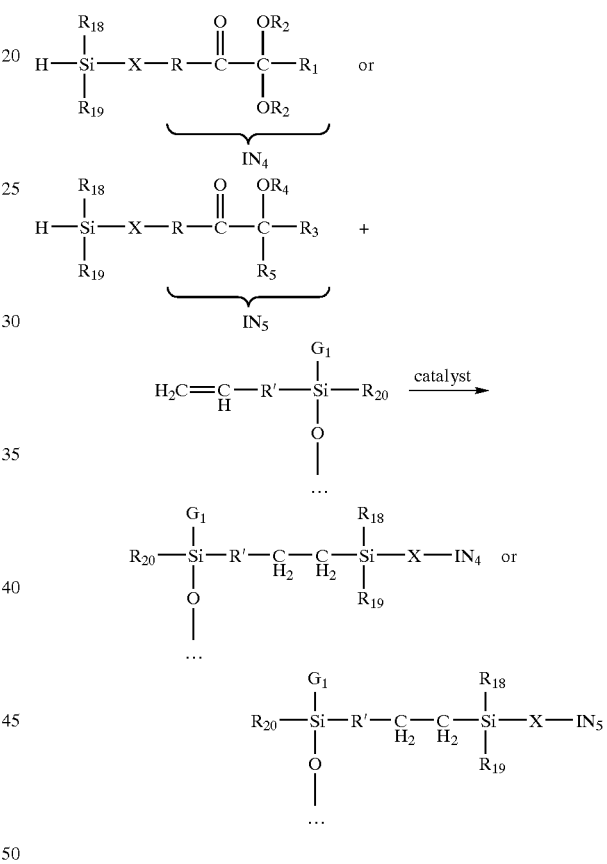

X, R, $R_1$, $R_2$, $R_3$, $R_4$, $R_5$, $R_{18}$, $R_{19}$, $R_{20}$ and $G_1$ are as defined hereinabove; R' is an alkylene radical; " . . . " denotes that attached at that position is the radical of the siloxane molecule moiety defined in formula III (according to formula III, m must be 0 in the starting material in that reaction).

The double bound of the alkenyl-moiety of the siloxane can also be the double bound of a cycloakenyl rest or of a bycycloalkenyl rest.

The reaction conditions for that method correspond to those described hereinabove. In the literature, such reactions are described, for example, in U.S. Pat. No. 4,391,963 and JMS Pure Applied Chem. A31(3) (1994), 305.

III. The surface-active photoinitiators can also be obtained, for example, by reaction of an OH-group-containing initiator with a siloxane:

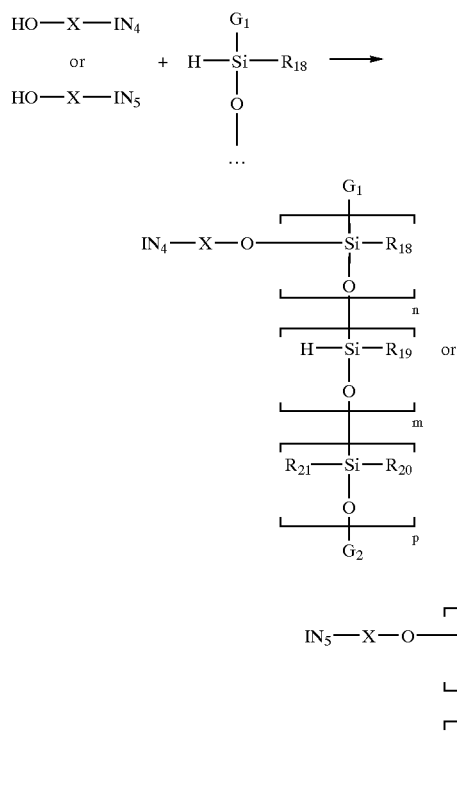

IN$_4$, IN$_5$, X, R$_{18}$, R$_{19}$, R$_{20}$, R$_{21}$, G$_1$, n, m, p and G$_2$ are as defined hereinabove; " . . . " denotes that attached at that position is the radical of the siloxane molecule moiety defined in formula III.

Catalysts suitable for that reaction include, for example, tin octoate, dibutyltin dilaurate, zinc octanoate, tin octanoate and zinc octanoate. Examples of such reactions (although the Examples contain a sensitizer unit instead of the photoinitiator unit) can be found in U.S. Pat. No. 4,921,589.

IV. In JMS Pure Appl. Chem. A 34(11) (1997), 2335–2353, L. Lecamp et al. describe a method for the preparation of siloxane-containing initiators in which an initiator containing an Si(OR")$_{1-3}$ group is reacted with a siloxane containing an Si—(OH)$_{1-2}$ group. The catalyst used is, for example, dibutyltin dilaurate:

IN$_4$, IN$_5$, X, R$_{18}$, R$_{19}$ and G$_1$ are as defined hereinabove; R" is alkyl, especially methyl; " . . . " denotes that attached at that position is the radical of the siloxane molecule moiety defined in formula III.

V. Surface-active photoinitiators corresponding to the present invention can, for example, also be obtained by reaction of a photoinitiator containing at least one carbonyl group on the aromatic ring with a siloxane containing a C—C double bond as terminal group (e.g. allyl or vinyl):

R$_{18}$ and G$_1$ are as defined hereinabove; in the examples of the literature references mentioned further below, R$^x$ together with the adjacent carbonyl group form a benzoin, a benzil dialkylketal, an α-hydroxyketone or an α-aminoketone; R' is alkylene; " . . . " denotes that attached at that position is the radical of the siloxane molecule moiety defined in formula III. The reaction can be carried out with compounds of the type IN$_6$ and also IN$_7$:

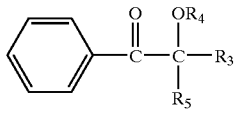

This reaction is published in U.S. Pat. No. 5,776,658. Catalysts suitable for the reaction include, for example, ruthenium compounds, as described by Murai et al in Nature 366 (1993) 529.

VI. The polymerization or copolymerization of polyalkoxysiloxanes in the presence of a base or of an acid catalyst is described in U.S. Pat. No. 4,477,326 and JP 9-328522-A. The described method is also suitable for the preparation of surface-active photoinitiators according to the invention:

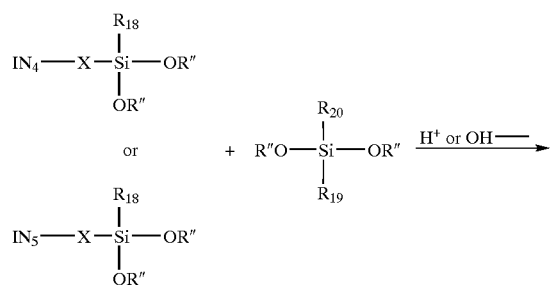

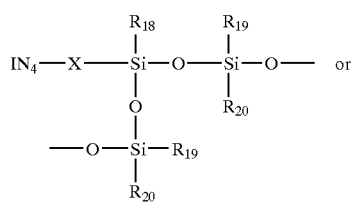

$IN_4$, $IN_5$, X, $R_{18}$, $R_{19}$ and $R_{20}$ are as defined hereinabove; and R" is alkyl.

Both polymeric and cyclic products can be obtained in such a reaction.

VII. A further method by which surface-active photoinitiators can be prepared is described, for example, in U.S. Pat. Nos. 4,587,276 and 4,477,276: the polymerization or copolymerization of siloxanes having hydrolysable groups (e.g. Si—Cl) In the presence of water:

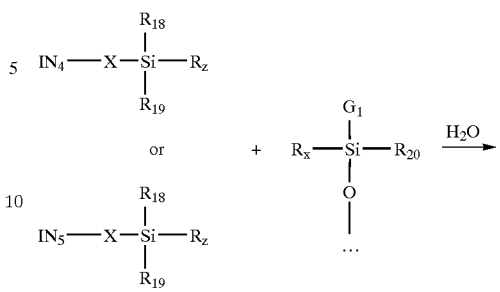

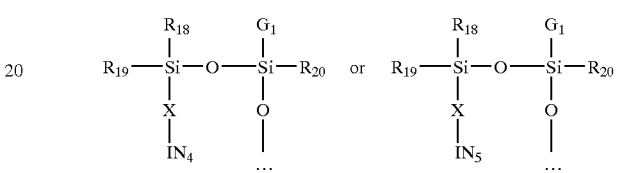

$IN_4$, $IN_5$, X, $R_{18}$, $R_{19}$, $R_{20}$ and $G_1$ are as defined hereinabove; $R_z$ is, for example, Cl or $OCH_3$; " . . . " denotes that attached at that position is the radical of the siloxane molecule moiety defined in formula III.

VIII. In J.M.S. Pure Appl. Chem. A 31(3) (1994), 305–318, A. Kolar et al. describe the preparation of photoinitiators containing siloxane radicals using 1,4-dichlorobenzene as starting material. Grignard reaction is used to create a reactive centre that is reacted with dimethyldichlorosilane or dimethyl monochlorosilane to form the corresponding silyl-modified chlorobenzene on which the corresponding α-cleavable photoinitiator carbonyl radical is inserted by further reactions. Similarly, it is also possible for compounds of formula (Ia) or (Ib) to be obtained by introducing the appropriate photoinitiator benzil dialkylketal radical or the appropriate photoinitiator benzoin radical.

IX. In Makromol. Chem. 193 (1992) 1273–1282, L. Pouliquen et al. published a multi-step reaction of photoinitiators containing acid groups with a siloxane containing epoxy radicals in the presence of acetic anhydride (the photoinitiator compounds in that reference are of the phenone/tert-amine type). That process can also be used, for example, for the preparation of the compounds according to the invention:

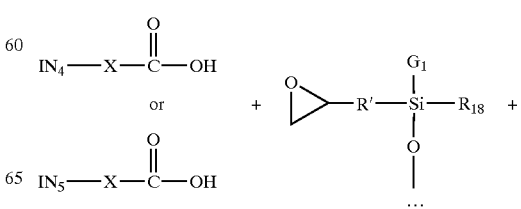

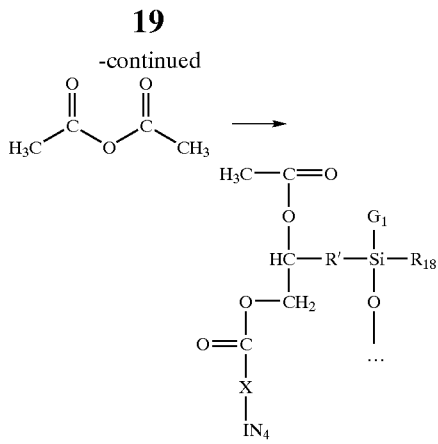

and the corresponding molecule containing $IN_5$.

Using adequate conditions, one can also add the photoinitiators containing the acid group to the siloxanes containing the epoxy radicals in the absence of acetic anhydride.

$IN_4$, $IN_5$, X, $G_1$ and $R_{18}$ are as defined hereinabove; R' is alkylene; "..." denotes that attached at that position is the radical of the siloxane molecule moiety defined in formula III.

Photoinitiators containing acid groups and siloxanes containing alkenyl, cycloalkenyl or bycycloalkenyl rest can be reacted to form surface active photoinitiators:

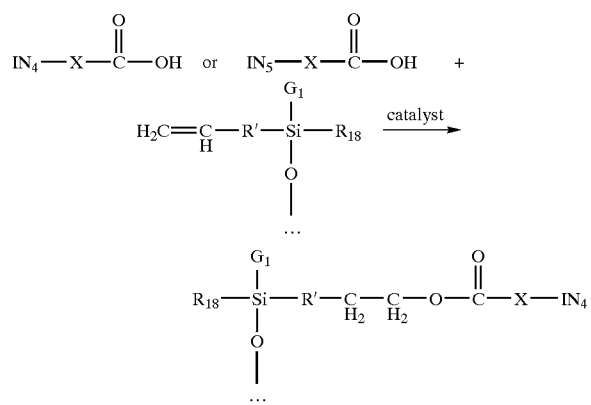

and the corresponding structures containing $IN_4$.

The same reaction can be performed with siloxane derivatives containing cycloalkenyl or bycycloalkenyl rests.

$IN_4$, $IN_5$, X, $G_1$ and $R_{18}$ are as defined hereinabove; R' is alkylene; "..." denotes that attached at that position is the radical of the siloxane molecule moiety defined in formula III.

X. Isocyanate-group-containing photoinitiators and siloxanes containing hydroxyl or amine groups can likewise be reacted to form surface-active photoinitiators:

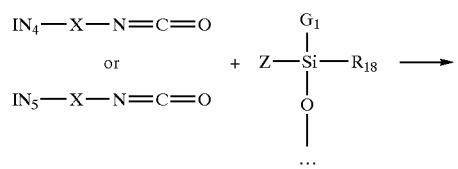

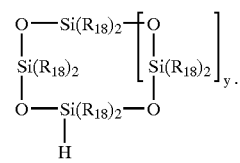

$IN_4$, $IN_5$, X, $G_1$ and $R_{18}$ are as defined hereinabove; Z is $NH_2$ or OH; $Z_1$ is NH or O; "..." denotes that attached at that position is the radical of the siloxane molecule moiety defined in formula III.

Such reactions are described, for example, in WO 96/20919.

XI. Photoinitiators substituted by cyclic siloxane radicals can be obtained, for example, by carrying out the reactions described hereinabove under I with a cyclic siloxane, for example $$\begin{array}{c} O-Si(R_{18})_2 \\ | \quad\quad\quad | \\ Si(R_{18})_2 \\ | \quad\quad\quad | \\ O-Si(R_{18})_2 \\ | \\ H \end{array} \left[ \begin{array}{c} O \\ | \\ Si(R_{18})_2 \\ | \\ O \end{array} \right]_y.$$

For the preparation of photoinitiators provided with cyclic siloxane radicals it is also possible, however, first of all to introduce linear siloxane radicals, for example using the methods described hereinabove, and then to bring about the cyclization thereof by the action of a base, for example sodium hydroxide, or by the action of an acid.

The surface-active photoinitiators containing cyclic siloxane radicals can be synthesised, for example, as described hereinabove by reaction of a cyclic siloxane with the initiator moiety in question:

IN; $IN_1$, $IN_2$, $IN_3$ (IV, IVa, IVb or IVc)+

(IN, $IN_1$, $IN_2$, $IN_3$ and $R_{18}$ are as defined hereinabove; y indicates the ring size; IN, $IN_1$, $IN_2$ and $IN_3$ being indicated in the above formula by IN only).

Also possible is a cyclization reaction of an OR"-group-containing siloxane-modified initiator moiety in the presence of acid or alkali:

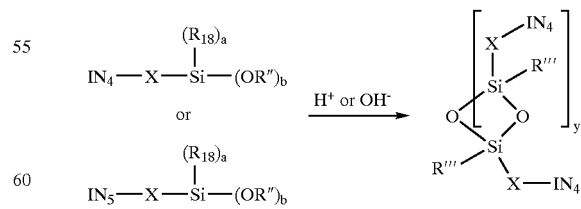

and the corresponding molecule containing $IN_5$.

$IN_4$, $IN_5$, X and $R_{18}$ are as defined hereinabove; R" is alkyl; a=0 or 1; b=2 or 3, wherein the sum of a and b is 3; depending on the definition of a and b, R'" is either $R_{18}$ or OR".

Cyclic compounds can furthermore be formed by reaction of an OR"-group-containing siloxane-modified initiator moiety with an OR"-group-containing siloxane:

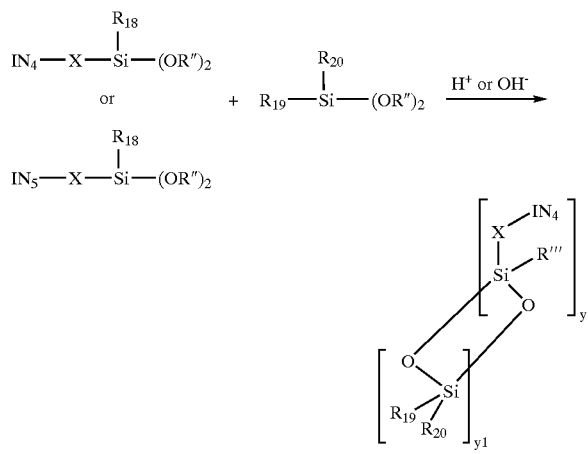

and the corresponding molecule containing $IN_5$.

($IN_4$, $IN_5$, X, $R_{18}$ $R_{19}$ and $R_{20}$ are as defined hereinabove; R" is alkyl; the sum of y and y1 determines the number or ring members).

The $Si(IN_4)(R_{18})$, $Si(IN_5)(R_{18})$ and $Si(R_{19})(R_{20})$ groups are distributed randomly or in blocks.

Compounds of formulae Ia and Ib having a plurality of identical or different radicals $A_1$-$X_1$-, $A_2$-$X_2$-, $A_3$-$X_3$-, $A_4$-$X_4$- or/and $A_5$-$X_5$- can be obtained, for example, analogously to the above-described reactions I to XI, under similar conditions using the respective appropriately substituted photoinitiators.

In the preparation of siloxane-containing photoinitiators it is also possible for mixtures of active compounds to be formed. Such mixtures can be separated according to customary methods, for example distillation, crystallisation or chromatography, or can be used in that form as surface-active photoinitiators in compositions to be polymerized.

XII. Compounds of formulae Ia and Ib wherein A denotes $A_0$ can be obtained, for example, by Friedel-Crafts alkylation of a photoinitiator (VI) or (VIa) with an appropriate alkyl halide (VII) in the presence of a suitable catalyst:

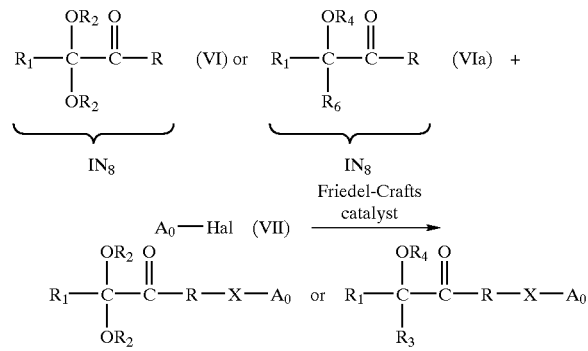

wherein R, $R_1$, $R_2$, $R_3$, $R_4$, $R_5$ and $A_0$ are as defined hereinabove; and X is a single bond.

The procedure for such reactions is known to the person skilled in the art and is described in detail in the literature (e.g. J. March, Advanced Organic Chemistry, $3^{rd}$ edition 1985, ch. 1–13, pages 479–484; or Olah, "Friedel-Crafts Chemistry", Wiley NY 1973; and also Roberts and Khalaf, "Friedel-Crafts Alkylation Chemistry", Marcel Dekker NY 1984).

XIII. Compounds of formulae Ia and Ib in which A denotes $A_0$ can also be obtained, for example, by Friedel-Crafts acylation of a photoinitiator (VI) or (VIa) with an appropriate surface-active reagent (VIII) in the presence of a suitable catalyst:

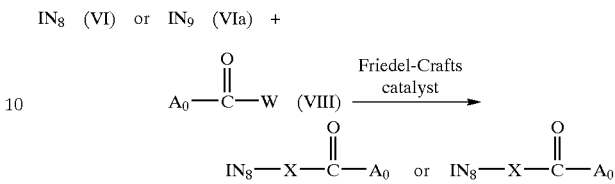

wherein $IN_8$, $IN_9$ and $A_0$ are as defined hereinabove; W is —OH or halogen, halogen being especially —Cl; and X is a single bond.

The procedure for such reactions is known to the person skilled in the art and is described in detail in the literature (e.g. J. March, Advanced Organic Chemistry, $3^{rd}$ edition 1985, ch. 1–15, pages 484–487; or Olah, "Friedel-Crafts and Related Reactions", Interscience NY 1963–1964).

XIV. Compounds of formulae Ia and Ib can also be obtained by the customary reactions, known to the person skilled in the art, of ether formation or alkylation of a thiol group or of an amine group. For example, compounds of formulae Ia and Ib can be prepared by reaction of a photoinitiator (IX) or (IXa) with an alkyl halide (VII) in the presence of a base:

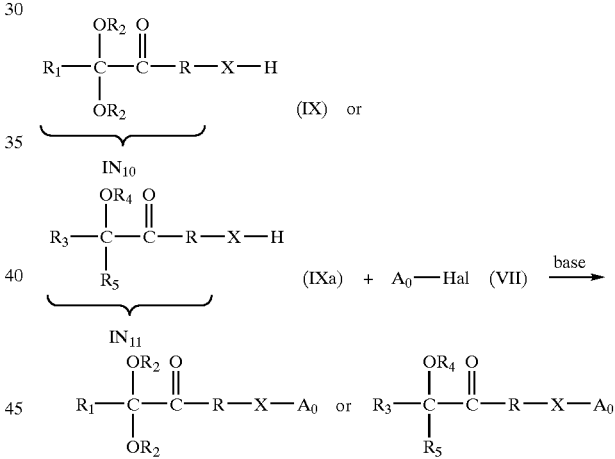

wherein R, $R_1$, $R_2$, $R_3$, $R_4$, $R_5$ and $A_0$ are as defined hereinabove; and X is —O—, —S— or —$NR_{17}$—.

Such reactions are known to the person skilled in the art and are described in detail in the literature (e.g. J. March in Advanced Organic Chemistry, $3^{rd}$ edition 1985). When X is, for example, —O—, the reaction corresponds to a Williamson ether formation (J. March in Advanced Organic Chemistry, $3^{rd}$ edition 1985, ch. 0–14, pages 342–343); when X is —S—, the reaction is as described, for example, in J. March in Advanced Organic Chemistry, $3^{rd}$ edition 1985, ch. 3–5, pages 589–590; when X is —$NR_{17}$—, the reaction corresponds to the alkylation of an amine (J. March in Advanced Organic Chemistry, $3^{rd}$ edition 1985, ch. 0–45, pages 364–366).

XV. Compounds of formulae Ia and Ib can also be obtained by acylation of appropriate photoinitiators wherein X is —O—, —S— or —$NR_{17}$—. The various possible conditions for such reactions are known to the person skilled in the art. For example, a compound Ia or Ib can be reacted by acylation of a photoinitiator (IX) with an appropriate surface-active reagent (VIII) that contains an acid group or an acid chloride group to form an ester, a thiol ester or an amide. Similar reactions can also be performed using photoinitiators (IXa) as starting material.

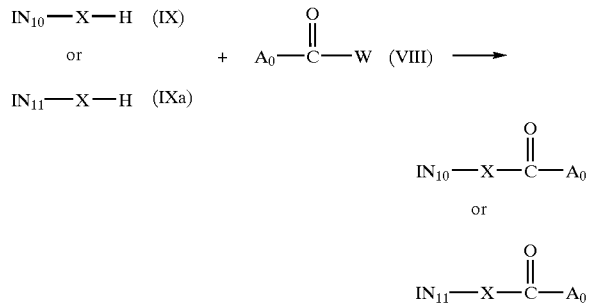

wherein $IN_{10}$, $IN_{11}$ and $A_0$ are as defined hereinabove; X in this instance is —O—, —S— or —$NR_{17}$—; W is —OH or halogen, halogen being especially —Cl.

Such reactions are known to the person skilled in the art and are described in detail in the usual organic chemistry textbooks, for example in J. March in Advanced Organic Chemistry, $3^{rd}$ edition 1985.

XV1. Compounds of formulae Ia and Ib can also be prepared by silylation of appropriate photoinitiators wherein X is an —O—, —S— or —$NR_{17}$— group. The various possible conditions for such reactions are known to the person skilled in the art. For example, compound Ia can be obtained by silylation of a photoinitiator (IX) with an appropriate surface-active reagent (X) that carries a silyl-active group, for example a group

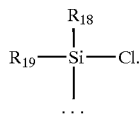

Similar reactions can also be carried out using the photoinitiator (IXa) as starting material.

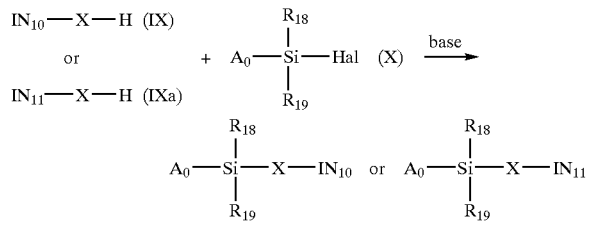

wherein $IN_{10}$, $IN_{11}$, $R_{18}$, $R_{19}$ and $A_0$ are as defined hereinabove; X in this instance is —O—, —S— —$NR_{17}$—; and -Hal is a halogen atom, especially Cl.

Such reactions are described, for example, by Lalonde and Chan in Synthesis (1985), (9), 817–45.

Compounds of formulae Ia and Ib containing a plurality of identical or different radicals $A_1$-$X_1$-, $A_2$-$X_2$-, $A_3$-$X_3$-, $A_4$-$X_4$- or/and $A_5$-$X_5$— can be obtained, for example, analogously to the reactions XII-XVI described hereinabove, under similar conditions using the respective appropriately substituted photoinitiators.

Preference is given to a process in which, in the compounds of formulae Ia and Ib, R and $R_3$ are a radical of formula II or naphthyl that is unsubstituted or substituted by A-X-, $A_3$-$X_3$-, $C_1$–$C_8$alkyl and/or by $OR_{12}$;

$R_1$ is $A_1$-$X_1$- or a radical of formula (II);

$R_2$ is $C_1$–$C_{12}$alkyl or $A_2$-$X_2$-; or the two $R_2$ radicals together are $C_2$–$C_5$alkylene;

$R_4$ is hydrogen, $C_1$–$C_{12}$alkyl or $A_4$-$X_4$-;

$R_5$ is hydrogen, $C_1$–$C_{12}$alkyl, $A_5$-$X_5$-, —$CH_2$—$OR_4$ or a radical of formula II;

$R_6$, $R_7$, $R_8$, $R_9$ and $R_{10}$ are each independently of the others hydrogen; A-X- , $A_3$-$X_3$-, $OR_{12}$, halogen, phenyl, $C_1$–$C_{12}$alkyl; or $C_2$–$C_{12}$alkyl interrupted by one or more non-consecutive oxygen atoms;

$R_{12}$ is hydrogen, phenyl, $C_3$–$C_6$alkenyl, cyclopentyl, cyclohexyl, $C_1$–$C_{12}$alkyl, or $C_2$–$C_{12}$alkyl interrupted by one or more non-consecutive oxygen atoms;

A, $A_1$, $A_2$, $A_3$, $A_4$ and $A_5$ are each independently of the others a surface-active radical of formula III or a surface-active radical $A_0$;

$A_0$ is $C_6$–$C_{30}$alkyl, $C_6$–$C_{30}$aralkyl, $C_6$–$C_{30}$alkyl-(CO)—, $C_6$–$C_{30}$aralkyl-(CO)—, $C_6$–$C_{30}$alkyl-Si($R_{18}$)($R_{19}$)-, those radicals being unsubstituted or substituted by F;

$R_{18}$, $R_{19}$, $R_{20}$, $R_{21}$, $R_{22}$, $R_{23}$, $R_{24}$, $R_{25}$, $R_{26}$ and $R_{27}$ are each independently of the others $C_1$–$C_{18}$alkyl or phenyl;

X and $X_3$, when A or $A_3$ is a radical of formula III, are $C_1$–$C_{10}$alkylene, —$(CH_2)_a$—O—, —O—$(CH_2)_a$—O—, —$(CH_2)_a$—O—$(CH_2)_b$—, —$(CH_2)_a$—O—$(CH_2)_b$—O—, —$(CH_2)_a$—$NR_{17}$—$(CH_2)_b$—, —$(CH_2)_a$—$NR_{17}$— or —$(CH_2)_a$—O—$(CH_2)_b$—$NR_{17}$—; and X and $X_3$ when A or $A_3$ denotes $A_0$, are a single bond, —O—, —S— or —$NR_{17}$—;

$X_1$ and $X_5$, when $A_1$ or $A_5$ is a radical of formula III, are each independently of the other $C_1$–$C_{10}$alkylene, —$(CH_2)_a$—O—, —$(CH_2)_a$—O—$(CH_2)_b$—, —$(CH_2)_a$—O—$(CH_2)_b$—O— or —$(CH_2)_a$—$NR_{17}$—$(CH_2)_b$—; and $X_1$ and $X_5$, when $A_1$ or $A_5$ denotes $A_0$, are each independently of the other a single bond;

$X_2$ and $X_4$, when $A_2$ or $A_4$ is a radical of formula III, are each independently of the other a single bond, $C_1$–$C_{10}$alkylene, —$(CH_2)_a$—O—, —$(CH_2)_a$—O—$(CH_2)_b$—, —$(CH_2)_a$—O—$(CH_2)_b$—O— or —$(CH_2)_a$—$NR_{17}$—$(CH_2)_b$—; and $X_2$ and $X_4$, when $A_2$ or $A_4$ denote $A_0$, are each independently of the other a single bond.

Special preference is given to a process in which, in the compounds of formulae Ia and Ib, R and $R_3$ are a radical of formula II, $R_1$ is a radical of formula (II);

$R_2$ is $C_1$–$C_{12}$alkyl;

$R_4$ is hydrogen or $C_1$–$C_{12}$alkyl;

$R_5$ is hydrogen or $A_0$;

$R_6$, $R_7$, $R_8$, $R_9$ and $R_{10}$ are each independently of the others hydrogen or A-X-;

A is a surface-active radical of formula III or a surface-active radical $A_0$;

$A_0$ is $C_6$–$C_{30}$alkyl, $C_6$–$C_{30}$alkyl—(CO)—, those radicals being unsubstituted or substituted by F;

$R_{18}$, $R_{19}$, $R_{20}$, $R_{21}$, $R_{22}$, $R_{23}$, $R_{24}$, $R_{25}$, $R_{26}$ and $R_{27}$ are each independently of the others $C_1$–$C_{18}$alkyl or phenyl;

X is $C_1$–$C_{10}$alkylene, —$(CH_2)_a$—O—, —O—$(CH_2)_a$—O—, —$(CH_2)_a$—O—$(CH_2)_b$— or —$(CH_2)_a$—O—$(CH_2)_b$—O—.

The following are examples of compounds of formulae Ia and Ib according to the invention:

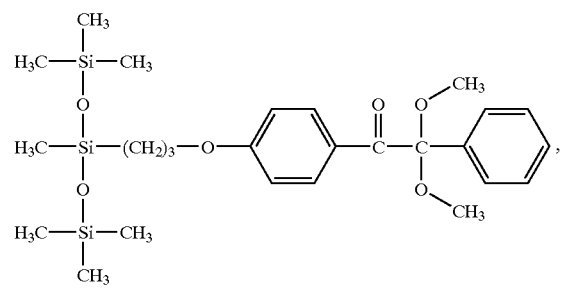
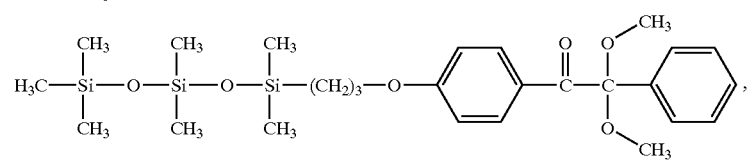
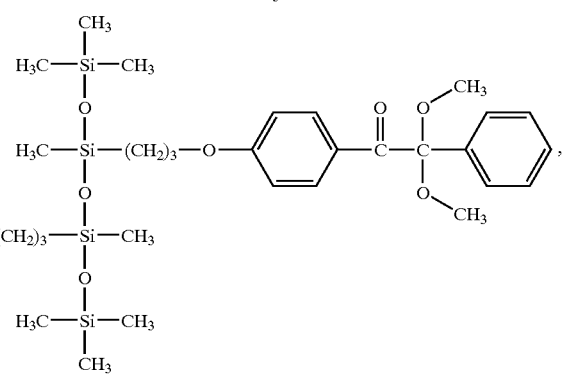
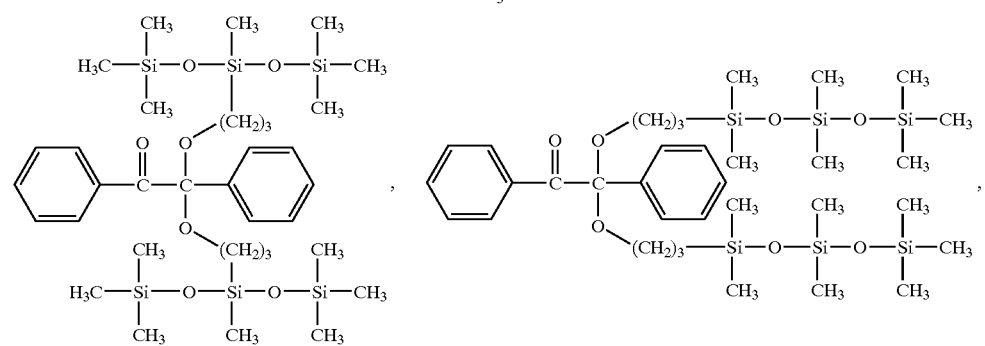
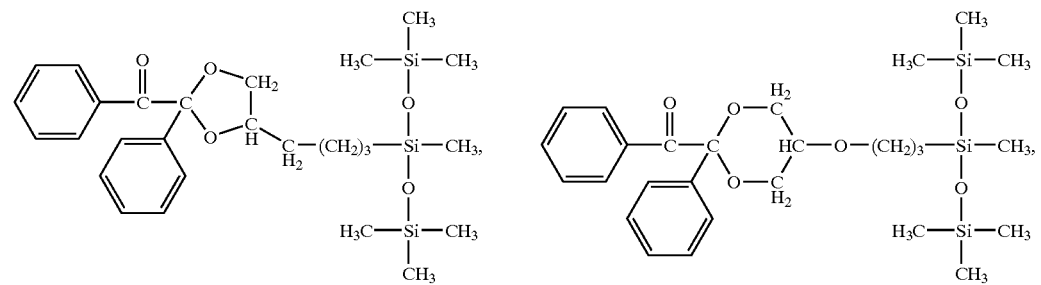
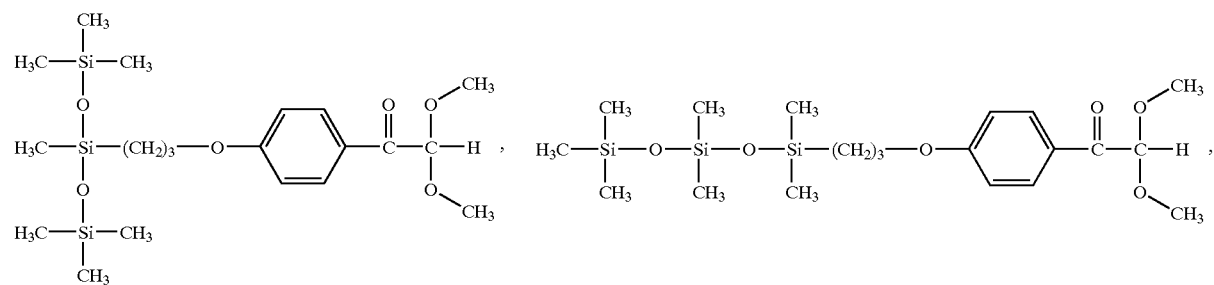

-continued
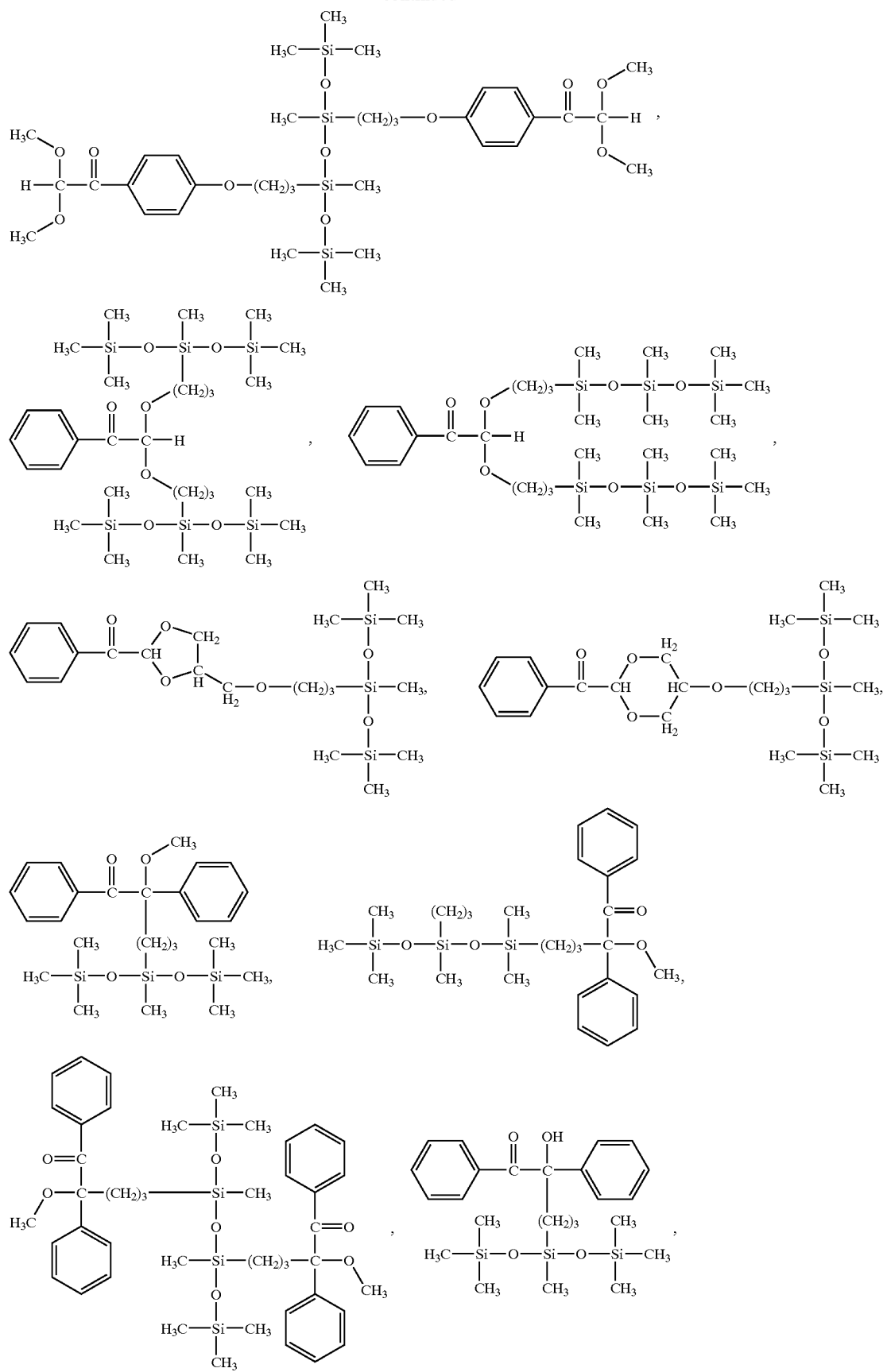

-continued
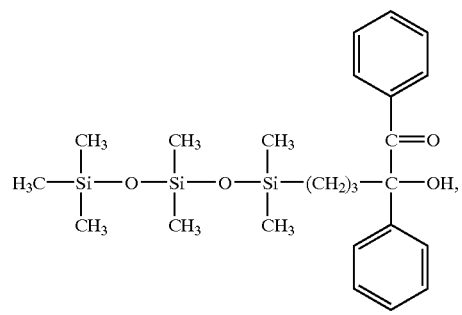 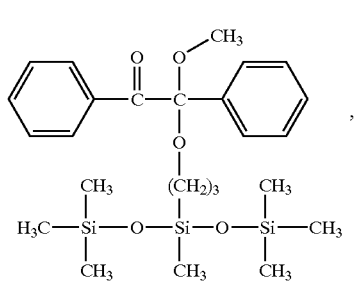
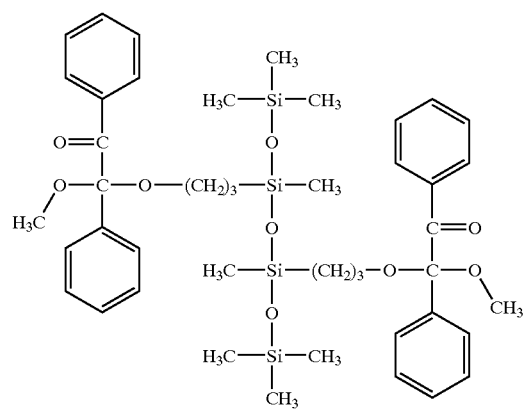 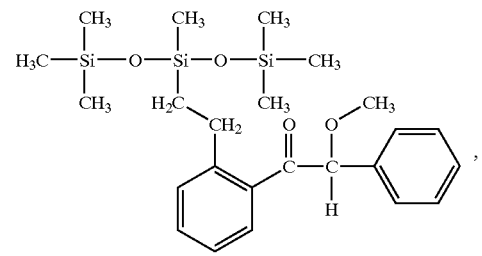
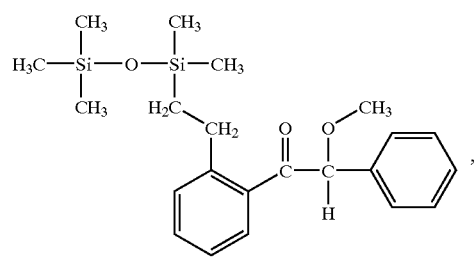 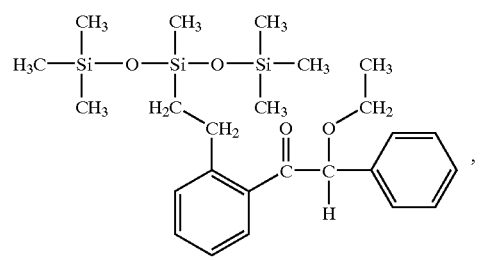
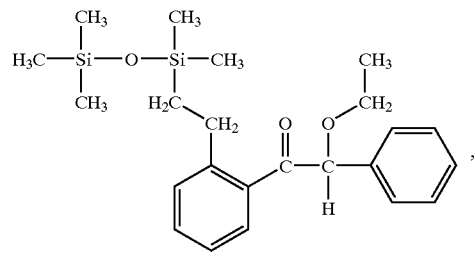 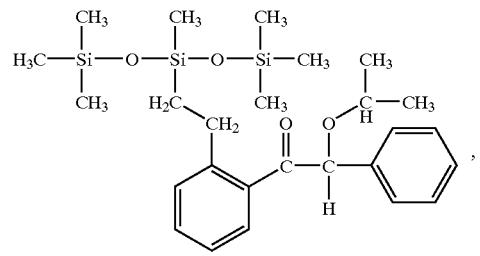
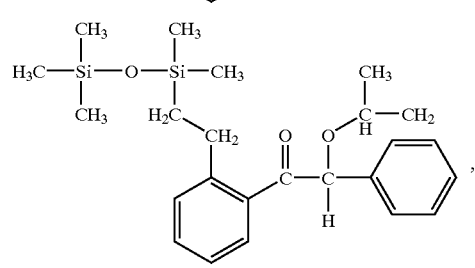 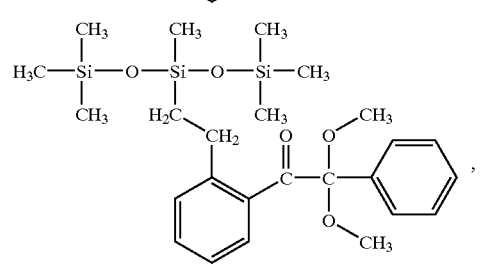

-continued
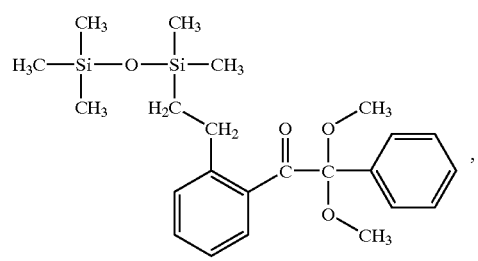, 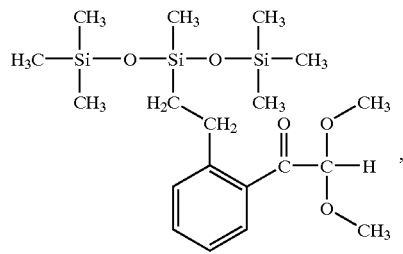,
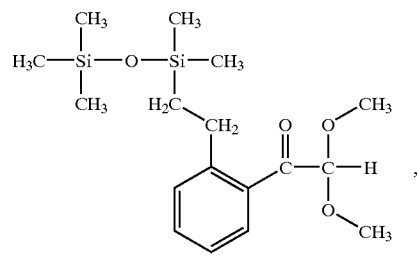, 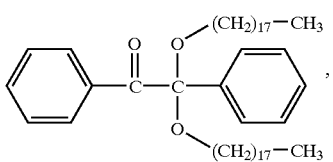, 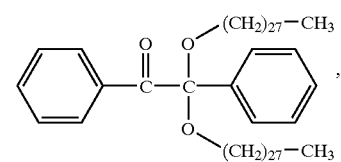,
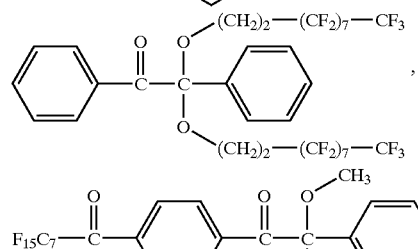, 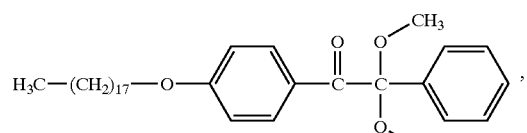,
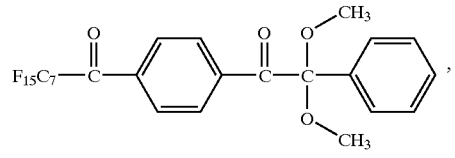, 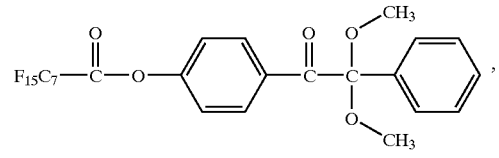,
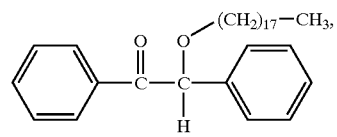, 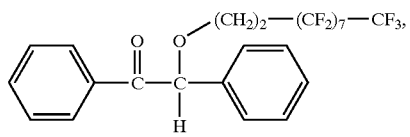, The compounds of formula I contain at least one substituent —X-A, —X$_1$-A$_1$, —X$_2$-A$_2$, —X$_3$-A$_3$, —X$_4$-A$_4$ or —X$_5$-A$_5$. Those substituents are the radicals that bring about the surface activity of the photoinitiator compounds, that is to say ensure that the photoinitiator is concentrated at the surface of the formulation to be cured.

The photoinitiators are used in accordance with the invention to cure free-radical-polymerizable systems with the aim of obtaining a cured surface having excellent properties. For that purpose, it is crucial for the photoinitiator to be concentrated at the surface of the formulation to be cured. As has already been stated above, this is achieved by appropriate substituents on the photoinitiator. An improvement in the surface properties can be achieved with the aid of such initiators not only in purely photocurable systems but also in formulations that are a mixture of thermally curable and photocurable. The present invention accordingly relates both to the use of the photoinitiators of formula I in purely photocurable formulations and to the use of the photoinitiators of formula I in formulations that are a mixture of photochemically and thermally curable. The thermal curing can be effected before, during or after the exposure to light.

The invention accordingly relates also to a process as described above in which the photocurable formulation comprises as further component at least one thermally crosslinkable compound (C), and in which the formulation is cured by irradiation with light of a wavelength ranging from 200 nm into the IR region, and the prior, simultaneous and/or subsequent action of heat.

According to the invention, the compounds of formulae Ia and Ib can be used as surface-active photoinitiators for the photopolymerization of ethylenically unsaturated compounds or of mixtures that comprise such compounds, and are oriented towards the surface of the formulation in question. According to the invention, a process for concentrating a photoinitiator at the surface of coatings thus comprises adding a surface-active photoinitiator of formula Ia or Ib to the photopolymerizable mixture comprising the ethylenically unsaturated photopolymerizable compounds.

According to the invention, when the intended use of the initiators of formula (I) is as surface-active photoinitiators, they are not used in compositions that contain siloxane-modified resin components. The compounds according to the invention are, however, excellently suitable for increasing the miscibility and compatibility of the initiator molecule with such siloxane-modified resins. Their use as surface-active photoinitiators is preferred.

The photoinitiators can also be used in combination with other photoinitiators (E) and/or further additives (D).

The invention accordingly relates also to photopolymerizable compositions comprising
(A) at least one ethylenically unsaturated free-radical-photopolymerizable compound; and
(B) at least one surface-active photoinitiator of formula Ia or Ib.

The invention relates furthermore to photopolymerizable compositions comprising
(A) at least one ethylenically unsaturated free-radical-photopolymerizable compound;
(B) at least one surface-active photoinitiator of formula Ia or Ib; and
(C) at least one thermally crosslinkable compound.

In accordance with the invention, the compositions may also comprise further different photoinitiators (E) and/or further additives (D).

Catalysts for the thermal crosslinking may also be added. Suitable examples are listed hereinbelow.

The unsaturated compounds (A) may contain one or more olefinic double bonds. They may be low molecular weight (monomeric) or higher molecular weight (oligomeric).

Examples of monomers having a double bond include alkyl and hydroxyalkyl acrylates and methacrylates, for example methyl, ethyl, butyl, 2-ethylhexyl and 2-hydroxyethyl acrylate, isobornyl acrylate, methyl methacrylate and ethyl methacrylate. Further examples are acrylonitrile, acrylamide, methacrylamide, N-substituted (meth)acrylamides, vinyl esters, such as vinyl acetate, vinyl ethers, such as isobutyl vinyl ether, styrene, alkyl- and halo-styrenes, N-vinylpyrrolidone, vinyl chloride and vinylidene chloride.

Examples of monomers having a plurality of double bonds include ethylene glycol diacrylate, propylene glycol diacrylate, neopentyl glycol diacrylate, hexamethylene glycol diacrylate and bisphenol-A diacrylate, 4,4'-bis(2-acryloyloxyethoxy)diphenylpropane, trimethylolpropane triacrylate, pentaerythritol triacrylate, pentaerythritol tetraacrylate, vinyl acrylate, divinyl-benzene, divinyl succinate, diallyl phthalate, triallyl phosphate, triallyl isocyanurate and tris(2-acryloylethyl)isocyanurate.

Examples of higher molecular weight (oligomeric) polyunsaturated compounds include acrylated epoxy resins, acrylated or vinyl ether- or epoxy-group-containing polyesters, polyurethanes and polyethers. Further examples of unsaturated oligomers include unsaturated polyester resins, which are usually prepared from maleic acid, phthalic acid and one or more diols and have molecular weights of about from 500 to 3000. In addition, it is also possible to use vinyl ether monomers and oligomers, and also maleate-terminated oligomers having polyester, polyurethane, polyether, polyvinyl ether and epoxide main chains. Combinations of vinyl ether-group-carrying oligomers and polymers, as described in WO 90/01512, are especially suitable, but copolymers of monomers functionalized with vinyl ether and maleic acid also come into consideration.

Also suitable are compounds having one or more free-radical-polymerizable double bonds. Preferably, the free-radical-polymerizable double bonds in such compounds are in the form of (meth)acryloyl groups. (Meth)acryloyl and (meth)acryl, here and in the following, denote acryloyl and/or methacryloyl, and acryl and/or methacryl, respectively. Preferably at least two polymerizable double bonds in the form of (meth)acryloyl groups are present in the molecule. The compounds may be, for example, (meth)acryloyl-functional oligomeric and/or polymeric compounds of poly(meth)acrylate. The number average molecular weight of such a compound may be, for example, from 300 to 10 000, preferably from 800 to 10 000. The compounds containing preferably free-radical-polymerizable double bonds in the form of (meth)acryloyl groups can be obtained according to customary methods, for example by reaction of poly(meth)acrylates with (meth)acrylic acid. That method, and further methods of preparation, are described in the literature and are known to the person skilled in the art. Such unsaturated oligomers can also be termed prepolymers.

Functionalized acrylates are also suitable. Examples of suitable monomers normally used to form the backbone (the base polymer) of such functionalized acrylate and methacrylate polymers include, for example, acrylate, methyl acrylate, methyl methacrylate, ethyl acrylate, ethyl methacrylate, n-butyl acrylate, n-butyl methacrylate, isobutyl acrylate, isobutyl methacrylate, 2-ethylhexyl acrylate, 2-ethylhexyl methacrylate etc. In addition, suitable amounts of functional monomers are copolymerized during the polymerization in order to obtain the functional polymers in that way. Acid-functionalized acrylate or methacrylate polymers are obtained using acid-functional monomers, such as acrylic acid and methacrylic acid. Hydroxy-functional acrylate or methacrylate polymers are obtained from hydroxy-functional monomers, such as 2-hydroxyethyl methacrylate, 2-hydroxypropyl methacrylate, 3,4-dihydroxybutyl methacrylate. Epoxy-functionalized acrylate or methacrylate polymers are obtained using epoxy-functional monomers, such as glycidyl methacrylate, 2,3-epoxybutyl methacrylate, 3,4-epoxybutyl methacrylate, 2,3-epoxycyclohexyl methacrylate, 10,11-epoxy-undecyl methacrylate etc. Similarly, it is possible, for example, for isocyanate-functionalized polymers to be prepared from isocyanate-functionalized monomers, for example meta-isopropenyl-α, α-dimethylbenzyl isocyanate.

There are especially suitable, for example, esters of ethylenically unsaturated mono- or poly-functional carboxylic acids and polyols or polyepoxides, and polymers having ethylenically unsaturated groups in the chain or in side groups, e.g. unsaturated polyesters, polyamides and polyurethanes and copolymers thereof, alkyd resins, polybutadiene and butadiene copolymers, polyisoprene and isoprene copolymers, polymers and copolymers having (meth)acryl groups in side chains, and also mixtures of one or more such polymers.

Examples of suitable mono- or poly-functional unsaturated carboxylic acids are acrylic acid, methacrylic acid, crotonic acid, itaconic acid, cinnamic acid, maleic acid, fumaric acid, itaconic acid, and unsaturated fatty acids such as linolenic acid or oleic acid. Acrylic acid and methacrylic acid are preferred.

It is also possible, however, for saturated di- or polycarboxylic acids to be used in admixture with unsaturated carboxylic acids. Examples of suitable saturated di- or poly-carboxylic acids include, for example, tetrachlorophthalic acid, tetrabromophthalic acid, phthalic anhydride, adipic acid, tetrahydrophthalic acid, isophthalic acid, terephthalic acid, trimellitic acid, heptanedicarboxylic acid, sebacic acid, dodecanedicarboxylic acid, hexahydrophthalic acid etc.

Suitable polyols are aromatic and especially aliphatic and cycloaliphatic polyols. Examples of aromatic polyols include hydroquinone, 4,4'-dihydroxydiphenyl, 2,2-di(4-hydroxyphenyl)-propane, and novolaks and resols. Examples of polyepoxides are those based on the said polyols, especially the aromatic polyols, and epichlorohydrin. Also suitable as polyols are polymers and copolymers that contain hydroxyl groups in the polymer chain or in side groups, e.g. polyvinyl alcohol and copolymers thereof and polymethacrylic acid hydroxyalkyl esters or copolymers thereof. Further suitable polyols are oligo esters having hydroxyl terminal groups.

Examples of aliphatic and cycloaliphatic polyols include alkylenediols having preferably from 2 to 12 carbon atoms, such as ethylene glycol, 1,2- and 1,3-propanediol, 1,2-, 1,3- and 1,4-butanediol, pentanediol, hexanediol, octanediol, dodecanediol, diethylene glycol, triethylene glycol, polyethylene glycols having molecular weights of preferably from 200 to 1500, 1,3-cyclopentanediol, 1,2-, 1,3- and 1,4-cyclohexanediol, 1,4-dihydroxymethylcyclohexane, glycerol, tris(β-hydroxyethyl)amine, trimethylolethane, trimethylolpropane, pentaerythritol, dipentaerythritol and sorbitol.

The polyols may be partially or fully esterified with one or with different unsaturated carboxylic acid(s), it being possible for the free hydroxyl groups in partial esters to be modified, for example etherified, or esterified with other carboxylic acids.

Examples of esters are:
trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetramethacrylate, sorbitol pentaacrylate, sorbitol hexaacrylate, oligo ester acrylates and methacrylates, glycerol di- and tri-acrylate, 1,4-cyclohexane diacrylate, bisacrylates and bismethacrylates of polyethylene glycol having a molecular weight of from 200 to 1500, and mixtures thereof.

Also suitable as component (A) are the amides of identical or different unsaturated carboxylic acids and aromatic, cycloaliphatic and aliphatic polyamines having preferably from 2 to 6, especially from 2 to 4, amino groups. Examples of such polyamines are ethylene-diamine, 1,2- and 1,3-propylenediamine, 1,2-, 1,3- and 1,4-butylenediamine, 1,5-pentylene-diamine, 1,6-hexylenediamine, octylenediamine, dodecylenediamine, 1,4-diaminocyclohexane, isophorone diamine, phenylenediamine, bisphenylenediamine, di-β-aminoethyl ether, diethylenetriamine, triethylenetetramine and di(β-aminoethoxy)- and di(β-aminopropoxy)-ethane. Further suitable polyamines are polymers and copolymers which may have additional amino groups in the side chain and oligoamides having amino terminal groups. Examples of such unsaturated amides are: methylene bisacrylamide, 1,6-hexamethylene bisacrylamide, diethylenetriamine trismethacrylamide, bis(methacrylamidopropoxy)ethane, β-methacrylamidoethyl methacrylate and N-[(β-hydroxyethoxy)ethyl]-acrylamide.

Suitable unsaturated polyesters and polyamides are derived, for example, from maleic acid and diols or diamines. The maleic acid may have been partially replaced by other dicarboxylic acids. They may be used together with ethylenically unsaturated comonomers, e.g. styrene. The polyesters and polyamides may also be derived from dicarboxylic acids and ethylenically unsaturated diols or diamines, especially from those having relatively long chains of e.g. from 6 to 20 carbon atoms. Examples of polyurethanes are those composed of saturated diisocyanates and unsaturated diols or unsaturated diisocyanates and saturated diols.

Polybutadiene and polyisoprene and copolymers thereof are known. Suitable comonomers include, for example, olefins, such as ethylene, propene, butene and hexene, (meth)-acrylates, acrylonitrile, styrene and vinyl chloride. Polymers having (meth)acrylate groups in the side chain are likewise known. They may be, for example, reaction products of novolak-based epoxy resins with (meth)acrylic acid; homo- or co-polymers of vinyl alcohol or hydroxyalkyl derivatives thereof that have been esterified with (meth) acrylic acid; or homo- and co-polymers of (meth)acrylates that have been esterified with hydroxyalkyl (meth)acrylates.

The photopolymerizable compounds (A) can be used on their own or in any desired mixtures. Preferably, mixtures of polyol (meth)acrylates are used.

Binders may also be added to the compositions according to the invention, this being particularly advantageous when the photopolymerizable compounds are liquid or viscous substances. The amount of binder may be, for example, from 5 to 95% by weight, preferably from 10 to 90% by weight and especially from 40 to 90% by weight, based on total solids. The choice of the binder is made in accordance with the field of use and the properties required therefor, such as developability in aqueous and organic solvent systems, adhesion to substrates and sensitivity to oxygen.

Suitable binders are, for example, polymers having a molecular weight of approximately from 5000 to 2 000 000, preferably from 10 000 to 1 000 000. Examples are: homo- and co-polymers of acrylates and methacrylates, e.g. copolymers of methyl methacrylate/ethyl acrylate/methacrylic acid, poly(methacrylic acid alkyl esters), poly(acrylic acid alkyl esters); cellulose esters and ethers, such as cellulose acetate, cellulose acetate butyrate, methyl-cellulose, ethyl-cellulose; polyvinyl butyral, polyvinyl formal, cyclized caoutchouc, polyethers such as polyethylene oxide, polypropylene oxide, polytetrahydrofuran; polystyrene, polycarbonate, polyurethane, chlorinated polyolefins, polyvinyl chloride, copolymers of vinyl chloride/vinylidene chloride, copolymers of vinylidene chloride with acrylonitrile, methyl methacrylate and vinyl acetate, polyvinyl acetate, copoly(ethylene/vinyl acetate), polymers such as polycaprolactam and poly(hexamethylene adipamide), polyesters such as poly-(ethylene glycol terephthalate) and poly(hexamethylene glycol succinate).

There may also be used as component (A), that is to say as UV-curable component, the resins listed hereinbelow under (C1). Of special interest are, for example, unsaturated acrylates having reactive functional groups. The reactive functional group may, for example, be selected from a hydroxyl, thiol, isocyanate, epoxy, anhydride, carboxyl, amino and a blocked amino group. Examples of OH-group-containing unsaturated acrylates are hydroxyethyl, hydroxybutyl and also glycidyl acrylates.

The unsaturated compounds can also be used in admixture with non-photopolymerizable film-forming components. These may be, for example, polymers that can be dried physically or solutions thereof in organic solvents, for example nitrocellulose or cellulose acetobutyrate, but they may also be chemically or thermally curable resins, for example polyisocyanates, polyepoxides or melamine resins. Melamine resins are to be understood as meaning not only condensation products of melamine (=1,3,5-triazine-2,4,6-triamine) but also condensation products of melamine derivatives. They are generally film-forming binders based on a thermoplastic or thermocurable resin, mainly on a thermocurable resin. Examples include alkyd resins, acrylic resins, polyester resins, phenol resins, melamine resins, epoxy resins and polyurethane resins and mixtures thereof. The concomitant use of thermally curable resins is important for use in so-called hybrid systems, which are both photopolymerized and thermally crosslinked.

Component (A) may be, for example, a coating composition comprising (A1) one or more compounds containing free-radical-polymerizable double bonds that, in addition, contain at least one further functional group that is reactive in terms of an addition and/or condensation reaction (examples are given hereinbefore), (A2) one or more compounds containing free-radical-polymerizable double bonds that, in addition, contain at least one further functional group that is reactive in terms of an addition and/or condensation reaction, the additional reactive functional group being complementary to, that is to sayreactive with, the additional reactive functional group(s) of component (A1), (A3) optionally at least one monomeric, oligomeric and/or polymeric compound having at least one functional group that is reactive, in terms of an addition and/or condensation reaction, with respect to the functional groups of component (A1) or component (A2) present in addition to the free-radical-polymerizable double bonds.

Component (A2) carries the relevant groups complementary to, that is to say reactive with, component (A1). It is also possible for different kinds of functional group to be present in one component. With component (A3), there is a further component available that contains functional groups reactive in terms of addition and/or condensation reactions, those groups being able to react with the functional groups of (A1) or (A2) present in addition to the free-radical-polymerizable double bonds. Component (A3) does not contain any free-radical-polymerizable double bonds. Examples of such (A1), (A2), (A3) combinations are to be found in WO 99/55785. Examples of suitable reactive functional groups are selected, for example, from hydroxyl, thiol, isocyanate, epoxy, anhydride, carboxyl and blocked amino groups. Examples are described hereinbefore.

Constituents of component (C) include, for example, thermally curable surface-coating or coating-system constituents customary in the art. Where appropriate, component (C) accordingly consists of a plurality of constituents.

Examples of component (C) include, for example, oligomers and/or polymers derived from $\alpha,\beta$-unsaturated acids and derivatives thereof, e.g. polyacrylates and polymethacrylates, polymethyl methacrylates modified in respect of impact resistance using butyl acrylate, polyacrylamides and polyacrylonitriles. Further examples of component (C) are urethanes, polyurethanes that are derived on the one hand from polyethers, polyesters and polyacrylates having free hydroxyl groups or thiol groups and on the other hand from aliphatic or aromatic polyisocyanates, and precursors thereof. Accordingly component (C) includes, for example, also crosslinkable acrylic resins derived from substituted acrylic acid esters, e.g. epoxy acrylates, urethane acrylates or polyester acrylates. In addition, alkyd resins, polyester resins and acrylate resins and modifications thereof that are crosslinked with melamine resins, urea resins, isocyanates, isocyanurates, polyisocyanates, polyisocyanurates and epoxy resins, can be constituents of component (C).

Component (C) is, for example, generally a film-forming binder based on a thermoplastic or thermocurable resin, chiefly on a thermocurable resin. Examples include alkyd resins, acrylic resins, polyester resins, phenol resins, melamine resins, epoxy resins, polyurethane resins and mixtures thereof. Examples of such resins are described, for example, in Ullmann's Encyclopedia of Industrial Chemistry, 5th edition, Vol. A18, pp. 368–426, VCH, Weinheim 1991.

Component (C) can be a cold-curable or a hot-curable binder, the addition of a curing catalyst possibly being advantageous. Suitable catalysts for accelerating the full cure of the binder are described, for example, in Ullmann's Encyclopedia of Industrial Chemistry, Vol. A18, p. 469,, VCH Verlagsgesellschaft, Weinheim 1991.

The following are examples of special binders suitable as component (C):

1. surface-coating compositions based on cold- or hot-crosslinkable alkyd, acrylate, polyester, epoxy or melamine resins or mixtures of such resins, optionally with the addition of a curing catalyst;
2. two-component polyurethane surface-coating compositions based on hydroxyl-group-containing acrylate, polyester or polyether resins and aliphatic or aromatic isocyanates, isocyanurates or polyisocyanates;
3. two-component polyurethane surface-coating compositions based on thiol-group-containing acrylate, polyester or polyether resins and aliphatic or aromatic isocyanates, isocyanurates or polyisocyanates;
4. one-component polyurethane surface-coating compositions based on blocked isocyanates, isocyanurates or polyisocyanates which are deblocked during stoving; the addition of melamine resins is also possible, if desired;
5. one-component polyurethane surface-coating compositions based on aliphatic or aromatic urethanes or polyurethanes and hydroxyl-group-containing acrylate, polyester or polyether resins;
6. one-component polyurethane surface-coating compositions based on aliphatic or aromatic urethane acrylates or polyurethane acrylates having free amine groups in the urethane structure and melamine resins or polyether resins, optionally with the addition of a curing catalyst;
7. two-component surface-coating compositions based on (poly)ketimines and aliphatic or aromatic isocyanates, isocyanurates or polyisocyanates;
8. two-component surface-coating compositions based on (poly)ketimines and an unsaturated acrylate resin or a polyacetoacetate resin or a methacrylamidoglycolate methyl ester;
9. two-component surface-coating compositions based on carboxyl- or amino-group-containing polyacrylates and polyepoxides;
10. two-component surface-coating compositions based on anhydride-group-containing acrylate resins and a polyhydroxy or polyamino component;
11. two-component surface-coating compositions based on acrylate-containing anhydrides and polyepoxides;
12. two-component surface-coating compositions based on (poly)oxazolines and anhydride-group-containing acrylate resins or unsaturated acrylate resins or aliphatic or aromatic isocyanates, isocyanurates or polylsocyanates;
13. two-component surface-coating compositions based on unsaturated (poly)acrylates and (poly)malonates;
14. thermoplastic polyacrylate surface-coating compositions based on thermoplastic acrylate resins or extrinsically crosslinking acrylate resins in combination with etherified melamine resins;
15. surface-coating systems, especially clear lacquers, based on malonate-blocked isocyanates with melamine resins (e.g. hexamethoxymethylmelamine) as crosslinkers (acid-catalysed);
16. UV-curable systems based on oligomeric urethane acrylates and/or acylate acrylates, optionally with the addition of other oligomers or monomers;
17. dual-cure systems, which are cured first thermally and then by UV, or vice versa, the constituents of the surface-coating formulation containing double bonds that can be caused to react by UV light and photoinitiators and/or by electron beam curing.

Blocked isocyanates as may be employed, inter alia, in component (C) are described, for example, in Organischer Metallschutz: Entwicklung und Anwendung von Beschichtungs-stoffen [Organic Protection of Metals: Development and Application of Coating Materials], page 159–160, Vincentz Verlag, Hannover (1993). These are compounds in which the highly reactive NCO group is "blocked" by reaction with specific radicals, such as primary alcohols, phenol, acetoacetates, ∈-caprolactam, phthalimide, imidazole, oxime or amine. The blocked isocyanate is stable in liquid systems and also in the presence of hydroxyl groups. On heating, the blocking agents are eliminated again and the NCO group is exposed.

Both 1-component (1K) and 2-component (2K) systems may be used as component (C). Examples of such systems are described in Ullmann's Encyclopedia of Industrial Chemistry, Vol. A18, Paints and Coatings, page 404–407, VCH Verlagsgesellschaft mbH, Weinheim (1991).

The composition may be optimized by specially adapting the formulation, for example by varyihg the binder/crosslinker ratio. Such measures are well known to the person skilled in the art of coatings technology.

In the curing process of the invention, component (C) is preferably a mixture based on acrylate/melamine (and melamine derivatives), 2-component polyurethane, 1-component polyurethane, 2-component epoxy/carboxy or 1-component epoxy/carboxy. Mixtures of these systems are also possible, an example being the addition of melamine (or derivatives thereof) to 1-component polyurethanes.

Component (C) is preferably a binder based on a polyacrylate with melamine or on a melamine derivative. Preference is also given to a system based on a polyacrylate polyol or/and polyester polyol with an unblocked polyisocyanate or polyisocyanurate.

Component (C) may furthermore comprise monomeric or/and oligomeric compounds containing ethylenically unsaturated bonds (prepolymers) which additionally contain at least one or more OH, HS, $NH_2$, COOH, epoxy or NCO groups (=C1) capable of reaction with the binder and/or crosslinker constituent of component (C). Following application and thermal curing, the ethylenically unsaturated bonds are converted by UV radiation into a crosslinked, high molecular weight form. Examples of such components (C) are described, for example, in the above-mentioned publication, Ullmann's Encyclopedia of Industrial Chemistry, $5^{th}$ edition, Vol. A18, pages 451–453, or by S. Urano, K. Aokl, N. Tsuboniva and R. Mizuguchi in Progress in Organic Coatings, 20 (1992), 471–486, or by H. Terashima and O. Isozaki in JOCCA 1992 (6), 222.

(C1) may be, for example, an OH-group-containing unsaturated acrylate, e.g. hydroxyethyl or hydroxybutyl acrylate, or a glycidyl acrylate. Component (C1) may be of any desired construction (may comprise, e.g., polyester, polyacrylate, polyether units, etc.) provided that an ethylenically unsaturated double bond and also free OH, COOH, $NH_2$, epoxy or NCO groups are present.

(C1) can also be obtained, for example, by reacting an epoxy-functional oligomer with acrylic acid or methacrylic acid. A typical example of an OH-functional oligomer containing vinylic double bonds is

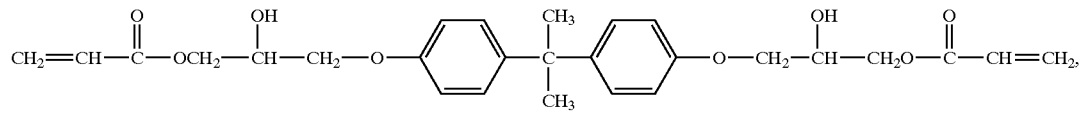

obtained by reacting CH$_2$=CHCOOH with

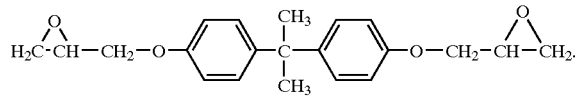

One possibility for preparing component (C1) is also, for example, the reaction of an oligomer that contains only one epoxy group and at another position in the molecule possesses a free OH group.

The ratio of components (A) to (C) in the UV-crosslinking and thermally crosslinking formulations is not critical. "Dual-cure" systems are well known to the person skilled in the art, who is therefore well aware of the optimum ratios of the UV-crosslinkable and thermally crosslinkable components for the particular desired application. For example, the compositions may comprise components (A) and (C) in a ratio of from 5:95 to 95:5, from 20:80 to 80:20 or from 30:70 to 70:30, e.g. from 40:60 to 60:40.

Examples of "dual-cure" systems, i.e. systems containing both UV-curable and thermally curable components, may be found, inter alia, in U.S. Pat. No. 5,922,473, columns 6 to 10.

It is also possible to add solvents or water to the compositions used in the process of the invention. Where the compositions are used without solvents, they are, for example, powder coating formulations. Suitable solvents are solvents which are known to the person skilled in the art and are customary particularly in coatings technology. Examples are various organic solvents, such as ketones, e.g. methyl ethyl ketone, cyclohexanone; aromatic hydrocarbons, e.g. toluene, xylene or tetramethylbenzene; glycol ethers, such as diethylene glycol monoethyl ether, dipropylene glycol diethyl ether; esters, such as ethyl acetate; aliphatic hydrocarbons, such as hexane, octane, decane; or petroleum solvents, such as petroleum ether.

The invention also provides compositions comprising as component (A) at least one ethylenically unsaturated photopolymerizable compound in emulsion or solution in water. Such radiation-curable aqueous prepolymer dispersions are available commercially in numerous variations. They are understood to b a dispersion of water and at least one prepolymer dispersed therein. The concentration of the water in these systems is, for example, from 5 to 80% by weight, especially from 30 to 60% by weight. The radiation-curable prepolymer or prepolymer mixture is present, for example, in concentrations of from 95 to 20% by weight, especially from 70 to 40% by weight. In these compositions the sum of the percentages stated for water and prepolymers is in each case 100; the auxiliaries and additives are extra in different amounts depending on the intended use.

The radiation-curable film-forming prepolymers which are in dispersion, and often also in solution, in water are monofunctional or polyfunctional ethylenically unsaturated prepolymers which are known per se for aqueous prepolymer dispersions, can be initiated by means of free radicals, and have a polymerizable double bond content of, for example, from 0.01 to 1.0 mol per 100 g of prepolymer and also have an average molecular weight of, for example, at least 400, especially from 500 to 10 000. Depending on the intended application, however, prepolymers with higher molecular weights may also be suitable.

Use is made, for example, of polyesters containing polymerizable C—C double bonds and having an acid number of not more than 10, polyethers containing polymerizable C—C double bonds, hydroxyl-group-containing reaction products of a polyepoxide containing at least two epoxide groups per molecule with at least one α,β-ethylenically unsaturated carboxylic acid, polyurethane (meth)acrylates, and also acrylic copolymers containing α,β-ethylenically unsaturated acrylic radicals, as described, for example, in EP 012 339. Mixtures of these prepolymers can likewise be used. Examples of further suitable prepolymers include the polymerizable prepolymers described in EP 033 896, which are thioether adducts of polymerizable prepolymers having an average molecular weight of at least 600, a carboxyl group content of from 0.2 to 15% and a polymerizable C—C double bond content of from 0.01 to 0.8 mol per 100 g of prepolymer. Other suitable aqueous dispersions based on specific alkyl (meth)acrylate polymers are described in EP 041 125; suitable water-dispersible, radiation-curable prepolymers of urethane acrylates are given, for example, in DE 29 36 039. As further additives, these radiation-curable aqueous prepolymer dispersions may comprise dispersing aids, emulsifiers, antioxidants, light stabilizers, dyes, pigments, fillers, e.g. talc, gypsum, silica, rutile, carbon black, zinc oxide, iron oxides, reaction accelerators, flow agents, lubricants, wetting agents, thickeners, matting agents, antifoams, and other auxiliaries customary in coatings technology. Suitable dispersing aids include water-soluble organic compounds of high molecular weight containing polar groups, such as polyvinyl alcohols, polyvinylpyrrolidone or cellulose ethers. Emulsifiers that can be used include nonionic, and possibly also ionic, emulsifiers.

The compounds of the invention and mixtures thereof may also be used as free-radical photoinitiators or photoinitiating systems for radiation-curable powder coating compositions. The powder coating compositions may be based on solid resins and monomers containing reactive double bonds, such as maleates, vinyl ethers, acrylates, acrylamides and mixtures thereof. A free-radically UV-curable powder coating composition can be formulated by mixing unsaturated polyester resins with solid acrylamides (e.g. methylacrylamidoglycolate methyl ester) and a free-radical photoinitiator of the invention, as described for example in the paper "Radiation Curing of Powder Coating", Conference Proceedings, Radtech Europe 1993 by M. Wittig and Th. Gohmann. Free-radically UV-curable powder coating compositions can also be formulated by mixing unsaturated polyester resins with solid acrylates, methacrylates or vinyl ethers and a photoinitiator (or photoinitiator mixture) of the invention. The powder coating compositions may also include binders, as described for example in DE 42 28 514 and EP 636 669. The powder coating formulations described in EP 636 669 contain, for example, a) an unsaturated resin from the group of the (semi)crystalline or amorphous unsaturated polyesters, unsaturated polyacrylates or mixtures thereof with unsaturated polyesters, particular preference being given to those derived from maleic acid or fumaric acid; b) an oligomeric or polymeric crosslinking agent containing vinyl ether-functional, vinyl ester-functional or (meth)acrylate-functional groups, particular preference being given to vinyl ether oligomers, such as divinyl ether-functionalized urethanes; c) the photoinitiator. The UV-curable powder coating compositions may also comprise white or coloured pigments. For example, preferably rutile titanium dioxide may be used in concentrations of up to 50% by weight in order to give a cured powder coating possessing good hiding power. The technique normally involves applying the powder to the substrate, such as metal or wood, by electrostatic or tribostatic spraying, melting the powder by heating and, after a smooth film has formed, radiation-curing the coating with ultraviolet and/or visible light, for example using medium-pressure mercury lamps, metal halide lamps or xenon lamps. A particular advantage of the radiation-curable powder coating compositions over their thermally curable counterparts is that the flow time after melting of the powder particles can be selectively extended in order to ensure the formation of a smooth, high-gloss coating. Unlike thermally curable systems, radiation-curable powder coating compositions can be so formulated, without the unwanted effect of a shortened lifetime, that they melt at relatively low temperatures. For this reason they are also suitable as coatings for heat-sensitive substrates, such as wood or plastics.

Where the powder coating compositions are to be applied to non-heat-sensitive substrates, for example metals (vehicle coatings), however, it is also possible to provide dual-cure powder coating formulations with the photoinitiators of the invention. Such formulations are known to the person skilled in the art; they are cured both thermally and by means of UV. Formulations of this kind may be found, for example, in U.S. Pat. No. 5,922,473.

Besides the photoinitiators of the invention, the powder coating formulations may also comprise UV absorbers. Appropriate examples are listed hereinbelow.

The photopolymerizable mixtures can also contain various additives (D) in addition to the photoinitiator. Examples thereof are thermal inhibitors, which are intended to prevent premature polymerization, e.g. 2,2,6,6-tetramethyl-4-hydroxypiperidin-1-oxyl (4-hydroxy-TEMPO) and derivatives thereof, e.g. bis(2,2,6,6-tetramethylpiperidin-1-oxyl-4-yl)-decanedioate or polyalkyl-piperidin-N-oxyl free radicals, 3-arylbenzofuran-2-one and derivatives thereof, e.g. 5,7-di-tert-butyl-3-phenyl-3H-benzofuran-2-one (as described, for example, in Swiss Application No. 2270/99 of Sep. 12, 1999), hydroquinone, hydroquinone derivatives, p-methoxyphenol, β-naphthol and sterically hindered phenols, e.g. 2,6-di(tert-butyl)-p-cresol. In order to increase dark-storage stability it is possible to use, for example, copper compounds, such as copper naphthenate, stearate or octoate, phosphorus compounds, for example triphenylphosphine, tributylphosphine, triethyl phosphite, triphenyl phosphite or tribenzyl phosphite, quaternary ammonium compounds, e.g. tetramethyl-ammonium chloride or trimethylbenzylammonium chloride, or hydroxylamine derivatives, e.g. N-diethylhydroxylamine. For the purpose of excluding atmospheric oxygen during polymerization it is possible to add paraffin or similar wax-like substances which, being insoluble in the polymer, migrate to the surface at the beginning of the polymerization and form a transparent surface layer which prevents air from entering. Equally possible is the application of a layer that is impermeable to oxygen. As light stabilizers it is possible to add UV absorbers, e.g. those of the hydroxyphenylbenzotriazole, hydroxyphenylbenzophenone, oxalic acid amide or hydroxyphenyl-s-triazine type. Such compounds can be used on their own or in the form of mixtures, with or without the use of sterically hindered amines (HALS). The following are examples of such UV absorbers and light stabilizers:

1. 2-(2'-Hydroxyphenyl)benzotriazoles, for example 2-(2'-hydroxy-5'-methylphenyl)-benzo-triazole, 2-(3',5'-di-tert-butyl-2'-hydroxyphenyl)benzotriazole, 2-(5'-tert-butyl-2'-hydroxy-phenyl)benzotriazole, 2-(2'-hydroxy-5'-(1,1,3,3-tetramethylbutyl)phenyl)benzotriazole, 2-(3',5'-dl-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)-benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)-benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-dodecyl-2'-hydroxy-5'-methylphenyl)benzotriazole, 2-(3'-tert-butyl-2'-hydroxy-5'-(2-iso-octyloxycabonylethyl)phenylbenzotriazole, 2,2'-methylene-bis[4-(1,1,3,3-tetramethyl-butyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$— where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)phenyl]-benzotriazole.

2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

3. Esters of substituted and unsubstituted benzoic acids, as for example 4-tert-butyl-phenyl salicylate, phenyl salicylate, octylphenyl salicylate, dibenzoyl resorcinol, bis(4-tert-butyl-benzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

5. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)-sebacate, bis(1-octyloxy-2,2,6,6-tetramethyl-4-piperidyl)sebacate, bis(1,2,2,6,6-pentamethyl-4-piperidyl)n-butyl-3,5-di-tert-butyl-4-hydroxybenzylmalonate, the condensate of 1-(2- hydroxyethyl)-2,2,6,6-tetramethyl-4hydroxypiperidine and succinic acid, linear or cyclic condensates of N,N'-bis(2,2,6,6-tetramethyl-4-piperidyl)hexamethylenedlamine and 4-tert-octylamino-2,6-dichloro-1,3,5-triazine, tris(2,2,6,6-tetramethyl-4-piperidyl)nitrilo-triacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetra-methylpiperidine, 4-stearyloxy-2,2,6,6-tetramethylpiperidine, bis(1,2,2,6,6-pentamethyl-piperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethyl-piperidyl)sebacate, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)-pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino) ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro [4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetra-methyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

6. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

7. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

8. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl)4,4'-biphenylene diphosphonite, 6-iso-octyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3',5,5'-tetra-tert-butyl-1,1'-biphenyl-2,2'-diyl)phosphite], 2-ethyl-hexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

Furthermore, it is possible to use additives customary in the art, such as antistatics, flow improvers and adhesion promoters.

The photoinitiators of formulae Ia and Ib can also act as flow improvers, since they are oriented towards the surface and also influence the surface properties through the group A, $A_1$, $A_2$, $A_3$, $A_4$ or $A_5$. Further flow improvers customary in the art may also be added. Examples include siloxane compounds and fluorohydrocarbon compounds and polyacrylates widely available on the market.

The invention relates also to the use of compounds of formulae Ia and Ib as flow improvers, optionally in combination with further customary flow improvers.

DIN 55945 defines levelling as "the more or less pronounced capacity of a still-liquid coating itself to compensate the unevennesses which arise in the course of its application." (cf. J. Bieleman, Lackadditive, [Additives for Coatings], VCH Weinheim 1998, chapter 6). The levelling of a coating composition depends greatly on its flow behaviour and on its surface tension. Flow improvers are substances that, by reducing the viscosity and/or surface tension, help wet coatings to become films that flow out evenly. In the case of powder coating compositions, flow improvers also lower the melt viscosity and the glass transition temperature and have an additional degassing effect. Flow improvers are used to eliminate levelling defects or surface defects which detract from the overall appearance of the coating. Levelling defects or surface defects include the orange peel effect, formation of structures, cratering, fisheyes, sensitivity to draughts, substrate welting problems, brush marks, runs, bittiness, pinholes, etc. The use of the compounds of the invention as flow improvers makes It possible to lower the surface tension. The surface tension can be calculated, by determining the marginal angle of a drop of liquid on a surface (contact angle measurement).

In order to accelerate the photopolymerization, there may be added as further additives (D) amines, especially tertiary amines, for example tributylamine, triethanolamine, p-dimethyl-aminobenzoic acid ethyl ester, Michler's ketone, N-methyl-diethanolamine, N-dimethyl-ethanolamine, N-ethylmorpholine, N-methylmorpholine, diazabicyclooctane (triethylene-diamine), 18-diazabicyclo[5.4.0]undec-7-ene (DBU), 1,5-diazabicyclo[4.3.0]non-5-ene (DBN) and salts thereof. Further examples include quaternary ammonium salts, for example trimethylbenzylammonium chloride. The action of the amines can be enhanced by the addition of aromatic ketones of the benzophenone type. Amines suitable for use as oxygen capture agents are, for example, substituted N,N-dialkylanilines, as described in EP 339 841. Further accelerators, co-initiators and auto-oxidizers are thiols, thioethers, disulfides and phosphines, as described e.g. in EP 438 123 and GB 2 180 358.

It is also possible to add chain transfer reagents customary in the art to the compositions of the invention. Examples are mercaptans, amines and benzothiazole.

The photopolymerization may furthermore be accelerated by adding photosensitizers as further additives (D), which shift or broaden the spectral sensitivity. These photosensitizers are, in particular, aromatic carbonyl compounds such as benzophenone derivatives, thioxanthone derivatives, and also especially isopropylthioxanthone, anthraquinone derivatives and 3-acylcoumarin derivatives, terphenyls, styryl ketones, and also 3-(aroylmethylene)thiazolines, camphorquinone, and also eosine dyes, rhodamine dyes and erythrosine dyes.

The amines indicated above, for example, may also be considered as photosensitizers.

The curing process, especially of compositions that are pigmented (with titanium dioxide for example), may also be assisted by adding an additional additive (D) which is a component which under thermal conditions forms free radicals, such as an azo compound, for instance 2,2'-azobis (4-methoxy-2,4-dimethylvaleronitrile), a triazene, diazo sulfide, pentazadiene or a peroxy compound such as hydroperoxide or peroxycarbonate, e.g. tert-butyl hydroperoxide, as described for example in EP 245 639.

As further additives (D), the compositions may also comprise, for example, a photoreducible dye, such as xanthene, benzoxanthene, benzothioxanthene, thiazine, pyronine, porphyrin or acridine dyes, and/or a radiation-cleavable trihalomethyl compound. Similar compositions are described, for example, in EP 445 624.

Further common additives (D)—depending on the intended use—include optical brighteners, fillers, e.g. kaolin, talc, barytes, gypsum, chalk or silicate fillers, pigments, dyes, wetting agents or flow improvers.

For the hardening of thick and pigmented coatings it is appropriate to add glass microbeads or pulverized glass fibres, as described for example in U.S. Pat. No. 5,013,768.

The formulations may also comprise dyes and/or white or coloured pigments. Depending on the intended application, both inorganic and organic pigments may be used. Such additives are known to the person skilled in the art; some examples are titanium dioxide pigments, of, for example, the rutile or anatase type, carbon black, zinc oxide, such as zinc white, iron oxides, such as yellow iron oxide, red iron oxide, chrome yellow, chrome green, nickel titanium yellow, ultramarine blue, cobalt blue, bismuth vanadate, cadmium yellow or cadmium red. Examples of organic pigments are monoazo or bisazo pigments, and also metal complexes thereof, phthalocyanine pigments, polycyclic pigments, such as perylene, anthraquinone, thioindigo, quinacridone or triphenylmethane pigments, and also diketo-pyrrolopyrrole, isoindolinone, e.g. tetrachloroisoindolinone, isoindoline, dioxazine, benzimidazolone and quinophthalone pigments.

The pigments may be used individually or in a mixture in the formulations.

The pigments, depending on the intended use, are added to the formulations in the amounts customary in the art, for example in an amount of from 1 to 60% by weight, or from 10 to 30% by weight, based on the total mass.

The formulations may, for example, also comprise organic dyes from a very wide variety of classes. Examples are azo dyes, methine dyes, anthraquinone dyes or metal complex dyes. Customary concentrations are, for example, from 0.1 to 20%, especially from 1 to 5%, based on the total mass.

The choice of additives is guided by the respective field of application and by the properties desired for that field. The above-described additives (D) are customary in the art and, accordingly, are used in the amounts that are customary in the art.

In certain cases it may be of advantage to use mixtures of two or more of the photoinitiators of the formulae Ia or/and Ib; it is advantageous, for example, to use mixtures obtained directly in the preparation. It is of course also possible to use mixtures with known photo-initiators (E), examples being mixtures with camphorquinone, benzophenone, benzophenone derivatives, acetophenone, acetophenone derivatives, such as α-hydroxycycloalkyl phenyl ketones or 2-hydroxy-2-methyl-1-phenylpropanone, dialkoxyacetophenones, α-hydroxy- or α-amino-acetophenones, such as (4-methylthiobenzoyl)-1-methyl-1-morpholinoethane, (4-morpholinobenzoyl)-1-benzyl-1-dimethylaminopropane, 4-aroyl-1,3-dioxolanes, benzoin alkyl ethers and benzil ketals, such as benzil dimethyl ketal, phenyl glyoxalates and derivatives thereof, dimeric phenyl glyoxalates, peresters, for example benzophenonetetra-carboxylic peresters as described, for example, in EP 126 541, monoacylphosphine oxides, such as (2,4,6-trimethylbenzoyl)phenylphosphine oxide, bisacylphosphine oxides, such as bis(2,6-dimethoxybenzoyl)(2,4,4-trimethylpent-1-yl)phosphine oxide, bis(2,4,6-trimethylbenzoyl)phenylphosphine oxide or bis(2,4,6-trimethylbenzoyl)(2,4-dipentyloxyphenyl)-phosphine oxide, trisacylphosphine oxides, halomethyltriazines, e.g. 2-[2-(4-methoxyphenyl)-vinyl]-4,6-bistrichloromethyl[1,3,5]triazine, 2-(4-methoxyphenyl)-4,6-bistrichloromethyl-[1,3,5]triazine, 2-(3,4-dimethoxyphenyl)-4,6-bistrichloromethyl[1,3,5]triazine, 2-methyl-4,6-bistrichloromethyl[1,3,5]triazine, hexaarylbisimidazole/coinitiator systems, e.g. ortho-chlorohexaphenylbisimidazole together with 2-mercaptobenzothiazole, ferrocenium compounds or titanocenes, such as dicyclopentadienyl bis(2,6-difluoro-3-pyrrolophenyl)titanium, borate photoinitiators or o-acyloxime photoinitiators, as described, for example, in GB 2 339 571. Where the photoinitiators of the invention are employed in hybrid systems, i.e. systems which can be cured both free-radically and cationically, use is made, in addition to the free-radical curing agents of formula I and any further free-radical curing agents, of cationic photoinitiators, such as benzoyl peroxide (other suitable peroxides are described in U.S. Pat. No. 4,950,581, column 19, lines 17–25), or aromatic sulfonium, phosphonium or iodonium salts, as described, for example, in U.S. Pat. No. 4,950,581, column 18, line 60 to column 19, line 10.

The photopolymerizable compositions contain the photoinitiator advantageously in an amount of from 0.05 to 15% by weight, preferably from 0.1 to 5% by weight, based on the composition. The stated amount of photoinitiator is based on the sum of all of the photo-initiators added, if mixtures thereof are used, i.e. both on the photoinitiator (B) and on the photoinitiators (B)+(E).

The photopolymerizable compositions can be used for a variety of purposes: for example, as a printing ink, as a clear lacquer, as a white paint, as a chromatically pigmented paint, for example for wood or metal, as powder coating compositions, as coating compositions for, inter alia, paper, wood, metal or plastics, as a daylight-curable coating for the marking of buildings and roads, for photographic reproduction techniques, for holographic recording materials, for image recording techniques or for producing printing plates which can be developed with organic solvents or using aqueous alkalis, for producing masks for screen printing, as dental filling compounds, as adhesives, as pressure-sensitive adhesives, as laminating resins, as etch resists or permanent resists, both liquid and in the form of dry films, as photostructurable dielectrics, and as solder resists for electronic circuits, as resists for producing colour filters for any type of screen, or for producing structures in the production process of plasma displays and electroluminescent displays, for the production of optical switches, optical lattices (interference grids), for the production of three-dimensional articles by mass curing (UV curing in transparent moulds) or by the stereolithography process, as described, for example, in U.S. Pat. No. 4,575,330, for producing composite materials (e.g. styrene polyesters which may, where appropriate, contain glass fibres and/or other fibres and other auxiliaries), and of fine layers (gel coats) and high-film-build compositions, for the coating or sealing of electronic components, or as coatings for optical fibres. The compositions are suitable, furthermore, for the production of optical lenses, e.g. contact lenses or Fresnel lenses, and also for producing medical instruments, aids or implants.

The compositions may also be used to produce gels having thermotropic properties, as described, for example, in DE 19 700 064 and EP 678 534.

The compounds of the formulae Ia and Ib may additionally be used as initiators for emulsion, bead or suspension polymerization or as initiators in a polymerization for the fixing of states of order of liquid-crystalline monomers and oligomers, or as initiators for the fixing of dyes on organic materials.

The photocurable compositions of the invention are suitable, for example, as coating materials for substrates of all kinds, e.g. wood, textiles, paper, ceramics, glass, plastics, such as polyesters, polyethylene terephthalate, polyolefins or cellulose acetate, especially in the form of films, and also metals, such as Al, Cu, Ni, Fe, Zn, Mg or Co and GaAs, Si or $SiO_2$, to which a protective coat, or—by imagewise exposure—an image, is to be applied.

The photoinitiators according to present invention are also suitable for use in compositions as coatings for optical fibers. In general, optical fibers are coated with protective coats directly after their production. The fiber of glass is drawn and then one or more coatings are applied to the glass string. Usually, one, two or three coats are applied, the top coating, for example, is colored ("ink layer or ink coating").

Further, several thus coated optical fibers may be put together to a bundle and be coated all together, i.e. cabling of the fibers. The compositions according to the present invention in general are suitable for any of these coatings, which have to exhibit good softness over a broad temperature range, good tensile strength and toughness and rapid UV-curing characteristics.

Each of the coats, inner primary (usually a soft coating), outer primary or secondary (usually a harder coating than the inner coating), tertiary or the cabling coat, may comprise at least one radiation-curable oligomer, at least one radiation curable monomer diluent, at least one photoinitiator, and additives.

In general all radiation curable oligomers are suitable. Preferred are oligomers with a molecular weight of at least 500, for example 500–10'000, 700–10'000, 1'000–8'000 or 1'000–7'000, in particular urethane oligomers, containing at least one unsaturated group. Preferably the radiation curable oligomer has two terminal functional groups. The coat may contain not only one specific oligomer, but also mixtures of different oligomers. The preparation of suitable oligomers is known to the person skilled, in the art and for example published in U.S. Pat. No. 6,136,880, incorporated herein by reference. The oligomers are, for example, prepared by reacting an oligomer diol, preferably a diol having 2–10 polyoxaalkylene groups, with a diisocyanate or a polyisocyanate and a hydroxy-functional ethylenically unsaturated monomer, e.g. hydroxyalkyl(meth)acrylate. Specific examples of each of the components named above, as well as suitable ratios of these components are given in U.S. Pat. No. 6,136,880, incorporated herein by reference.

The radiation curable monomer can be used in a manner to control the viscosity of the coating formulation. Accordingly, a low viscosity monomer with at least one functional group capable of photoinitiated polymerization is employed. The amount for example is chosen to adjust the viscosity in a range from 1'000 to 10'000 mPas, i.e. usually for example from 10–90, or 10–80 wt % are used. The functional group of the monomer diluent preferably is of the same kind than the one of the oligomer component, for example an acrylate or vinyl ether function and a higher alkyl or polyether moiety. Examples of monomer diluents suitable for coating compositions for optical fibers are published in U.S. Pat. No. 6,136,880, col. 12, line 11ff., incorporated herein by reference.

In primary coatings preferably monomers having an acrylate or vinyl ether functionality and a polyether moiety of 4 to 20 C atoms is used. Specific examples are given in the US patent incorporated by reference and cited above.

The composition may also comprise a poly(siloxane,) as described in U.S. Pat. No. 5,595,820 to improve the adhesive properties of the formulation on the optical fiber glass substrate.

The coating composition usually also comprises further additives, e.g. antioxidants, light stabilizers, UV absorbers such as for example given in the list above in particular ™IRGANOX 1035, 1010, 1076, 1222, ™TINUVIN P, 234, 320, 326, 327, 328, 329, 213, 292, 144, 622LD (all provided by Ciba Specialty Chemicals), ™ANTIGENE P, 3C, FR, GA-80, ™SUMISORB TM-061 (provided by Sumitomo Chemical Industries Co.), ™SEESORB 102, 103, 501, 202, 712, 704 (provided by Sypro Chemical Co., Ltd.), ™SANOL LS770 (provided by Sankyo Co. Ltd.) to prevent the coloring of the coat, in particular during the processing, and to improve the stability of the cured coat. Particularly interesting are stabilizer combinations of hindered piperidine derivatives (HALS) and hindered phenol compounds, e.g. a combination of IRGANOX 1035 and TINUVIN 292, for example in a ratio of 1:1. Further, additives are for example wetting agents and other additives having an effect on the rheology properties of the coating. Also amines, for example diethylamine, can be added.

Other examples for additives for compositions for the coating of optical fibers are silane coupling agents, e.g. γ-aminopropyltriethoxysilane, γ-mercaptopropyltrimethoxysilane, γ-methacryloxypropyltrimethoxysilane, SH6062, SH6030 (provided by Toray-Dow Corning Silcone Co., Ltd.), KBE 903, KBE 603, KBE 403 (provided by Shin-Etsu Chemical Co., Ltd.)

In order to prevent coloring of the coatings the compositions may also comprise fluorescent additives or optical brighteners, as, for example, ™UVITEX OB, provided by Ciba Specialty Chemicals.

The photoinitiators according to the present application in coating compositions for optical fibers can be admixed with one or more other known photoinitiators. These are in particular monoacylphosphine oxides, such as diphenyl-2,4,6-trimethylbenzoyl phosphine oxide; bisacylphosphine oxides, such as bis(2,4,6-trimethylbenzoyl)-phenyl phosphine oxide (™IRGACURE 819), bis(2,6-dimethoxybenzoyl)-2,4,4-trimethylpentyl phosphine oxide; α-hydroxyketones, such as 1-hydroxycyclohexyl phenyl ketone (™IRGACURE 184), 2-hydroxy-2-methyl-1-phenyl-1-propanone (™DAROCUR 1173), 2-hydroxy-1[-4-(2-hydroxy-ethoxy)phenyl]-2-methyl-1-propanone (™IRGACURE 2959); α-aminoketones, such as 2-methyl-1-[4-(methylthio)phenyl]-2-(4-morpholinyl)-1-propanone (™IRGACURE 907), 2-benzyl-2-(dimethylamino)-1-[4-(4-morpholinyl)phenyl]-1-butanone (™IRGACURE 369); benzophenones, such as benzophenone, 2,4,6-trimethylbenzophenone, 4-methylbenzophenone, 2-methylbenzophenone, 2-methoxycarbonylbenzophenone, 4,4'-bis(chloromethyl)-benzophenone, 4-chlorobenzophenone, 4-phenylbenzophenone, 4,4'-bis(dimethylamino)benzophenone, 4,4'-bis(diethylamino) benzophenone, methyl 2-benzoylbenzoate, 3,3'-dimethyl-4-methoxybenzophenone, 4-(4-methylphenylthio) benzophenone and also ketal compounds, for example 2,2-dimethoxy-1,2-diphenyl-ethanone (™IRGACURE 651); monomeric or dimeric phenylglyoxalic acid esters, such as for example methyl phenylglyoxalic acid ester or 1,2-(benzoylcarboxy)ethane. In particular suitable are admixtures with mono- or bisacylphosphine oxides and/or α-hydroxy ketones.

It is evident that the formulations, in order to enhance the properties of the photoinitiators may also comprise sensitizer compounds, for example amines.

The coatings are either applied "wet on dry" or "wet on wet". In the first case after the application of the primary coat a curing step by irradiation with UV light is carried out prior to the application of the second coat. In the second case both coatings are applied and cured together by irradiation with UV light.

The curing with UV irradiation in this application usually takes place in a nitrogen atmosphere. In general all radiation sources usually employed in the photocuring technique can be used for the curing of optical fiber coatings. These are, for example the radiation sources listed below Generally, mercury medium pressure lamps or/and Fusion D lamps are used. Also flash lights are suitable. It is evident that the emission of the lamps is matched with the absorption of the photoinitiator or photoinitiator mixture which is used. The optical fiber coating compositions may also be cured by irradiation with an electron beam, in particular with low power electron beams, as is, for example disclosed in WO 98/41484.

In order to distinguish different fibers in an assembly, the fibers may be covered with a third colored coating ("ink coating"). The compositions used for this coating in addition to the polymerizable components and the photoinitiator comprise a pigment or dye. Examples for pigments suitable for optical fiber coatings are inorganic pigments, such as for example titanium dioxide, zinc oxide, zinc sulfide, barium sulfate, aluminium silicate, calcium silicate, carbon black, black iron oxide, copper chromite black, iron oxides, chromium oxide greens, iron blue, chrome green, violet (e.g. manganese violet, cobalt phosphate, $CoLiPO_4$), lead chromates, lead molybdates, cadmium titanate and pearlescent and metallic pigments, as well as organic pigments, such as monoazo pigments, di-azo pigments, di-azo condensation pigments, quinacridone pigments, dioxazine violet, vat pigments, perylene pigments, thioindigo pigments, phthalocyanine pigments and tetrachloroisoindolinones. Examples for suitable pigments are carbon black for a black coating, titanium dioxide for a white coating, diarylide yellow or diazo based pigments for yellow coatings, phthalocyanine blue, and other phthalocyanines for blue coatings, anthraquinone red, naphthole red, monazo based pigments, quinacridone pigments, anthraquinone and perylenes for red coatings, phthalocyanine green and nitroso based pigments for green coatings, monazo and diazo based pigments, quinacridone pigments, anthraquinones and perylenes for orange coatings, and quinacridone violet, basic dye pigments and carbazole dioxazine based pigments for violet coatings. The person skilled in the art is well aware of formulating and combining suitable further pigments if even more colored coatings, such as aqua, brown, gray, pink etc. are needed.

The mean particle size of the pigments usually is about 1 μm or less. The size of commercial pigments can be reduced by milling, if necessary. The pigments for example, can be added to the formulation in the form of a dispersion in order to simplify the mixing with the other ingredients of the formulation. The pigments are, for example dispersed in a low viscosity liquid, e.g. a reactive diluent. Preferred is the use of organic pigments. Suitable amounts for pigment in the ink coating are for example 1–20, 1–15, preferably 1–10 wt %.

The ink coating in general also comprises a lubricant to provide improved break-out properties of the single coated optical fiber from the matrix. Examples of such lubricants are silicones, fluorocarbon oils or resins and the like, preferably a silicone oil or a functionalized silicone compound, e.g. silicone diacrylate is used.

The compositions according to the present invention are further suitable as a matrix material for an assembly of coated optical fibers. That is, several of the primary, secondary (and in some cases tertiary) coated fibers, for example, in the third coat being differentiated by different colors, are assembled in a matrix.

The coating of an assembly preferably besides the additives given above also contains a release agent to allow for easy access to the individual fibers during the installation of the optical fiber cables. I.e.

Examples for such release agents are teflon, silicones, silicon acrylates, fluorocarbon oils or resins and the like. The release agents suitably are added in an amount of 0.5–20 wt %. Examples of ink coatings and matrix materials for coated optical fibers are given in U.S. Pat. Nos. 6,197,422, 6,130,980 and EP 614099, Incorporated herein by reference.

The substrates can be coated by applying a liquid composition, a solution or suspension to the substrate. The choice of solvent and the concentration are guided primarily by the nature of the composition and by the coating technique. The solvent should be inert, i.e. it should not enter into any chemical reaction with the components and it should be able to be removed again in the course of drying after coating. Examples of suitable solvents are ketones, ethers and esters, such as methyl ethyl ketone, isobutyl methyl ketone, cyclo-pentanone, cyclohexanone, N-methylpyrrolidone, dioxane, tetrahydrofuran, 2-methoxyethanol, 2-ethoxyethanol, 1-methoxy-2-propanol, 1,2-dimethoxyethane, ethyl acetate, n-butyl acetate and ethyl 3-ethoxypropionate.

The formulation is applied uniformly to a substrate by means of known coating techniques, for example by spincoating, dipping, knife coating, curtain coating techniques, brush application, spraying, especially by electrostatic spraying, and reverse roll coating, and also by electrophoretic deposition. It is also possible to apply the photosensitive layer to a temporary flexible support and then, by layer transfer via lamination, to the final substrate. Examples of methods of application are described in Ullmann's Encyclopedia of Industrial Chemistry, 5$^{th}$ edition, Vol. A18, pp. 491–500.

The application amount (coat thickness) and nature of the substrate (coat support) are dependent on the desired field of application. The dry film thickness range generally embraces values from about 0.1 μm to more than 100 μm, preferably from 0.02 to 2 cm.

A further field of use of photocuring is that of metal coating, as in the coating of metal sheets and tubes, cans or bottle closures, for example, and also photocuring on plastics coatings, for example PVC-based wall or floor coverings.

Examples of the photocuring of paper coatings are the colourless varnishing of labels, record sleeves or book covers.

Also preferred is the use of the coating formulation comprising the surface-active photoinitiators as a finishing paint for applications in the automobile industry, especially as a pigmented or unpigmented top coat of the coating, but use for layers beneath the top coat is also possible.

The photosensitivity of the compositions of the invention generally ranges from about 200 nm into the IR region. Suitable radiation is present, for example, in sunlight or light from artificial sources. Light sources employed therefore include a large number of a very wide variety of types. Both point sources and arrays (lamp carpets) are suitable. Examples are carbon arc lamps, xenon arc lamps, medium-, high- and low-pressure mercury lamps, possibly doped with metal halides (metal-halogen lamps), microwave-excited metal vapour lamps, excimer lamps, superactinic fluorescent tubes, fluorescent lamps, argon incandescent lamps, flashlights, e.g. high-energy flashlights, photographic floodlamps, light-emitting diodes (LEDs), electron beams and X-rays. The distance between the lamp and the substrate to be exposed may vary, depending on the intended application and the type and output of the lamps, for example between 2 cm and 150 cm. Especially suitable are laser light sources, e.g. excimer lasers, such as Krypton-F lasers for exposure at 248 nm. Lasers in the visible range can also be used.

As already mentioned, curing in the process of the invention may take place solely by exposure to electromagnetic radiation. Depending on the composition of the formulation to be cured, however, thermal curing before, during or after irradiation is advantageous. Thermal curing takes place in accordance with methods known to the person skilled in the art. Curing is generally carried out in an oven, e.g. a circulating air oven, on a hotplate, or by irradiation using IR lamps. Curing without auxiliaries at room temperature is likewise possible, depending on the binder system used. The curing temperatures are generally between room temperature and 150° C., e.g. 25–150° C. or 50–150° C. In the case of powder coating compositions or "coil coat" compositions, the curing temperatures may also be higher, e.g. up to 350° C.

Where the formulation includes thermally curable components (C), it is additionally possible in accordance with the invention to add thermal drying catalysts or curing catalysts to the formulation as additional additives (D). Examples of possible drying catalysts, or thermal curing catalysts, are organic metal compounds, amines or/and phosphines. Organic metal compounds are, for example, metal carboxylates, especially those of the metals Pb, Mn, Hf, Co, Zn, Zr or Cu, or metal chelates, especially those of the metals Hf, Al, Ti or Zr, or organo-metal compounds such as organotin compounds. Examples of metal carboxylates are the stearates of Pb, Mn or Zn, the octoates of Co, Zn or Cu, the naphthenates of Mn and Co or the corresponding linoleates or tallates. Examples of metal chelates are the aluminium, titanium or zirconium chelates of acetylacetone, ethyl acetylacetate, salicylaldehyde, salicylaldoxime, o-hydroxyacetophenone or ethyl trifluoroacetylacetate and the alkoxides of those metals. Examples of organotin compounds are dibutyltin oxide, dibutyltin dilaurate and dibutyltin dioctoate. Examples of amines are especially tertiary amines, for example tributylamine, triethanolamine, N-methyldiethanolamine, N-dimethylethanolamine, N-ethyl-morpholine, N-methylmorpholine and diazabicyclooctane (triethylenediamine) and salts thereof. Further examples include quaternary ammonium salts, for example trimethylbenzylammonium chloride. It is also possible to use phosphines as curing catalyst, for example triphenylphosphine. Suitable catalysts are also described, for example, in J. Bielemann, Lackadditive, Wiley-VCH Verlag GmbH, Weinheim, 1998, pages 244–247. Examples include carboxylic acids, for example p-toluenesulfonic acid, dodecylbenzenesulfonic acid, dinonylnaphthalenesulfonic acid and dinonylnaphthalene-disulfonic acid. Latent or blocked sulfonic acids, for example, can also be used, it being possible for the acid to be blocked ionically or non-ionically.

Such catalysts are used in concentrations known to the person skilled in the art and customary in the art.

The invention relates also to a process for photopolymerizing non-volatile monomeric, oligomeric or polymeric compounds containing at least one ethylenically unsaturated double bond, which process comprises exposing a composition as described above to electro-magnetic radiation ranging from 200 to 600 nm.

The invention relates also to the use of the above-described composition and to a process for the production of pigmented and unpigmented surface coatings, powder coatings, fine layers (gel coats), composite materials or glass fibre cable coatings.

The invention likewise relates to a coated substrate that is coated on at least one surface with a composition as described above.

The Examples which follow illustrate the invention further, without any intention of restricting the invention to the Examples. As in the remainder of the description and in the claims, parts and percentages are by weight unless indicated otherwise. References to alkyl radicals containing more than three carbon atoms without indication of the isomer should be understood in each case as referring to the n-isomers.

Preparation of

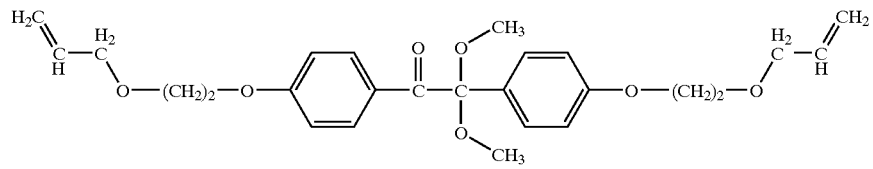

(0.54 g, 1.59 mmol) tetrabutylammonium hydrogensulfate (Bu$^4$N$^+$ $^-$HSO$_4$) and NaOH 50% (16 ml) were added to a solution of (3 g, 7.97 mmol) 1,2-bis-[4-(2-hydroxy-ethoxy)-phenyl]-2,2-dimethoxy-ethanone in 16 ml dichlormethane at room temperature. To the resulting solution (1.92 g, 15.59 mmol) allybromide were added dropwise. The reaction mixture was stirred over night. The organic phases were separated and washed with water. After drying over MgSO$_4$, filtering, removal of the solvent by evaporation and chromatography, (eluent hexane/ethylacetate 1:1) the compound 1,2-bis-[4-(2-allyloxy-ethoxy)-phenyl]-2,2-dimethoxy-ethanone (2.74 g, 75%) was obtained in the form of a colorless liquid.

$^1$H-NMR (CDCl$_3$) δ [ppm]: 7.90 (m, 2H arom.); 7.33 (m, 2 H arom.); 6.70 (m, 2 H arom.); 6.62 (m, 2 H arom.); 5.62 (m, 2 H, 2 —O—CH$_2$—C$\underline{H}$=CH$_2$); 5.07 (m, 4 H, 2 —O—CH$_2$CH=C$\underline{H}_2$); 3.91 (m, 8 H, 2 —O—C$\underline{H}_2$—CH=CH$_2$ und 2 —O—CH$_2$—CH$_2$—O—C$_6$H$_4$—); 3.60 (t, J=4.8, 4 H, 2 —O—C$\underline{H}_2$—CH$_2$—O—C$_6$H$_4$—); 3.02 (s, 6 H, 2 C—O—C$\underline{H}_3$).

EXAMPLE 1

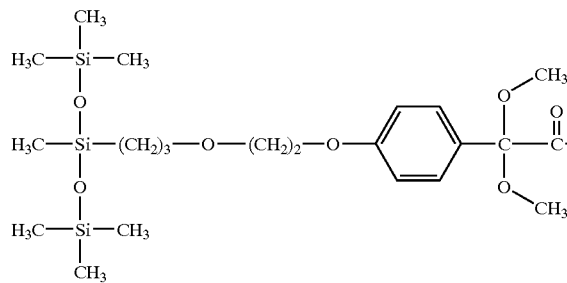

(Formula Ia, R and R$_1$ are radicals of the formula II, R$_2$=—CH$_3$, R$_6$, R$_7$, R$_9$, R$_{10}$=H, R$_8$=-X-A, X=—O—(CH$_2$)$_2$—O—(CH$_2$)$_3$—, A is a radical of formula III, R$_{18}$, R$_{22}$, R$_{23}$, R$_{24}$, R$_{25}$, R$_{26}$, R$_{27}$=CH$_3$, n=1, m=p=0)

A mixture of one equivalent of the compound prepared as described in A and 2.2 equivalents of 1,1,1,3,5,5,5-Heptamethyltrisiloxane in toluene (25 ml) was heated under reflux in the presence of 0.008 equivalent (based on the Pt content) of a carbon-supported Pt catalyst (Pt/C 5%) for 4 hours. The mixture was then filtered off. The resulting solution was treated with carbon black. Filtration and evaporation of the solvent gave the above compound (3.06 g, 56%) as an yellow oil.

U.V. (CH$_3$CN) max. at 281 nm (ε 18'482), 223 nm (∈ 19'379). $^1$H NMR (CDCl$_3$) δ [ppm]: 7.99 (m, 2 H arom.); 7.43 (m, 2 H arom.); 6.81 (m, 2 H arom.); 6.71 (m, 2 H arom.); 4.00 (m, 4 H, 2 —O—C$\underline{H}_2$—CH$_2$—CH$_2$—Si); 3.67 (m, 4 H, 2 —O—CH$_2$—C$\underline{H}_2$—O—C$_6$H$_4$—); 3.38 (m, 4 H, 2 —O—C$\underline{H}_2$—CH$_2$—O—C$_6$H$_4$—); 3.11 (s, 6 H, 2 C—O— CH$_3$); 1.51 (m, 4 H, 2 —O—CH$_2$—C$\underline{H}_2$—CH$_2$—Si); 0.37 (m, 4 H, 2 —O—CH$_2$—CH$_2$—C$\underline{H}_2$—Si); 0.01 (m, 42 H, 14 Si—CH$_3$).

EXAMPLE 2

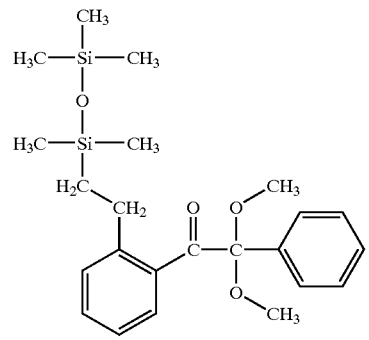

(Formula Ia, R is a radical of the formula II wherein R$_6$=-X-A und R$_7$, R$_8$, R$_9$, R$_{10}$=H, R$_1$ is a radical of the formula II, wherein R$_6$, R$_7$, R$_8$, R$_9$, R$_{10}$=H, R$_2$=—CH$_3$, X=—(CH$_2$)$_2$—, A is a radical of the formula III, R$_{18}$, G$_1$, R$_{25}$, R$_{26}$, R$_{27}$=CH$_3$, n=1, m=p=0)

The compound of Example 2 is prepared according to the method described in Example 5. using 1 mole equivalent of 2,2-dimethoxy-2-phenylacetophenone and 1.2 mole equivalents of pentamethylvinyldisiloxane (eluent for flash chromatography hexane/dichlormethane (2:1)).

U.V. (CH$_3$CN) max. at 253 nm (∈ 5'822). $^1$H-NMR (CDCl$_3$) δ [ppm]: 7.53 (d, J=8, 1 H arom.); 7.44 (m, 2 H arom.); 7.23 (m, 4 H arom.); 7.11 (d, J=7, 1 H arom.); 7.03 (d, J=5, 1 H arom.); 3.24 (s, 6 H, 2 —O—CH$_3$); 2.32–2.28 (m, 2 H, —C$\underline{H}_2$—CH$_2$—Si—); 0.69–0.64 (m, 2 H, —CH$_2$—C$\underline{H}_2$—Si—); 0.01 (s, 9 H, —Si—(CH$_3$)$_3$); -0.06 (s, 6 H, 2 —Si—CH$_3$), $^{13}$C-NMR (CDCl$_3$) δ [ppm]: 199.2 (C=O); 145.3/136.4/135.6 (C$_{arom}$); 130.4/129.3/128.7/ 128.2/127.2/124.2 (HC$_{arom}$); 104.7 (C); 50.1 (OCH$_3$); 26.8/ 20.5 (—CH$_2$—CH$_2$—); 1.8 (—Si—(CH$_3$)$_3$); 0.0 (—Si— (CH$_3$)$_2$). m/z (EI+Cl, NH$_3$): (MH$^+$-32; 100), 151 (35).

EXAMPLE 3

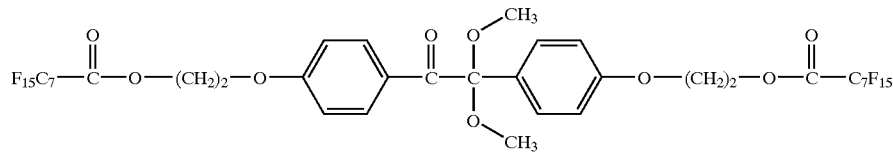

(Formula Ia, R and $R_1$ are radicals of formula II, $R_2$=—$CH_3$, $R_6$, $R_7$, $R_9$, $R_{10}$=H, $R_8$=-X-A, X=—O—$(CH_2)_2$—O—, A=$A_0$=—C(O)—$C_7F_{15}$) (5.05 g, 11.69 mmol) pentadecafluorooctanoyl chloride was added dropwise at room temperature to a solution of 1,2-bis-[4-(2-hydroxy-ethoxy)-phenyl]-2,2-dimethoxy-ethanone (2 g, 5.3 mmol), triethylamine (1.29 g, 12.75 mmol) and 4-dimethylamino-pyridine (0.065 g, 0.531 mmol) in dichlormethane (51 ml). The mixture was stirred over night. The solvent was removed in vacuo. Ether was added to the residue and the resulting mixture was washed with 5% HCl, saturated $NaHCO_3$ and water. The organic phase was dried over $NaSO_4$ and filtered and the solvent was removed in vacuo.

After chromatography (eluent hexane/ethylacetate 2:1) (3.04 g, 49%) 2,2,3,3,4,4,5,5,6,6,7,7,8,8,8-Pentadecafluoro-octanoic acid 2w-(1,1-dimethoxy-2-oxo-2-{4-[2-(2,2,3,3,4,4,5,5,6,6,7,7,8,8,8-pentadecafluoro-octanoyloxy)-ethoxy]-phenyl}-ethyl)-phenoxy]-ethyl ester was obtained as colorless liquid.

U.V. ($CH_3CN$) max. at 288 nm ($\in$ 23'126). $^1$H-NMR ($CDCl_3$) δ [ppm]: 8.10 (m, 2 H arom.); 7.53 (m, 2 H arom.); 6.84 (m, 2 H arom.); 6.78 (m, 2 H arom.); 4.70 (m, 4 H, 2 —O—$CH_2$—$CH_2$—O—); 4.24 (m, 4 H, 2 —O—$CH_2$—$CH_2$—O—); 3.20 (s, 6 H, 2 C—O—$CH_3$). m/z (APCl): 1168 ($M^+$); According to the mass spectrum there is also a further compound present in a small amount: 772 ($M^+$).

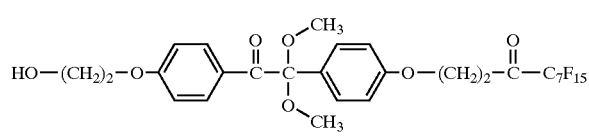

M = 772

EXAMPLE 4

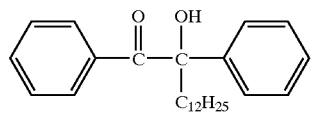

(Formula Ib, R and $R_3$ are radicals of the formula II, $R_4$=H, $R_5$=-$X_5$-$A_5$, $R_6$, $R_7$, $R_8$, $R_9$; $R_{10}$=H, $X_5$=single bond, $A_5$=$A_0$=—$C_{12}H_{25}$. 23.48 g bromo-dodecane and 18.8 ml of 20% NaOH solution were added dropwise to a solution of 20 g benzoin in 190 ml DMSO. The mixture was stirred for 19 hours at room temperature whereby an oil was obtained. Said oil was separated and the solution was extracted with petroleum ether. Said oil and the organic phase were combined and dried over $MgSO_4$. Filtration, evaporation of the solvent, flash chromatography and recrystallisation from petroleum ether and 2% AcOEt gave the product as white solid.

mp=84.3–85.3° C. U.V. (THF) max. at 338 nm ($\in$ 206), 248 nm ($\in$ 13'400).

$^1$H-NMR ($d_6$-Aceton+$d_4$—MeOD) δ [ppm]: 7.76 (d, 2 H arom.); 7.40 (m, 2 H arom.); 7.32–7.11 (m, 6 H arom.); 2.12–1.97 (m, 2 H, —C(OH)($C_8H_5$)—$CH_2$—); 1.15 (m, 20 H, —$(CH_2)_{10}$); 0.77 (t, J=5, 3 H, —$CH_3$).

EXAMPLE 5

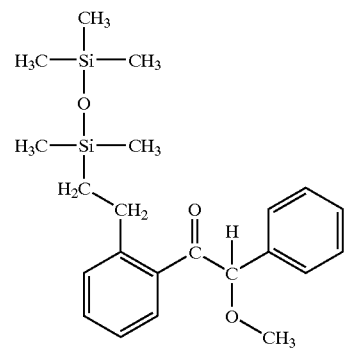

(Formula Ib, R is a radical of the formula II wherein: $R_6$=-X-A and $R_7$, $R_8$, $R_9$, $R_{10}$=H, and $R_3$ is a radical of the formula II wherein: $R_6$, $R_7$, $R_8$, $R_9$, $R_{10}$=H, $R_4$=—$CH_3$, $R_5$=H, X=—$(CH_2)_2$—, A is a radical of the formula III, $R_{18}$, $G_1$, $R_{25}$, $R_{26}$, $R_{27}$=$CH_3$, n=1, m=p=0) Benzoin methyl ether (6.8 g, 30 mmol), pentamethylvinyidisiloxane (6.3 g, 36 mmol) and $Ru(H)_2(CO)(PPh_3)_3$ (0.55 g, 0.6 mmol) were added to (50 ml) toluene. The reaction mixture was heated to reflux for 24 hours. The reaction mixture was cooled to room temperature Flashchromatography (hexane:dichloromethane (1:1)) gave 4.96 g of the reaction product as a yellow oil.

U.V. ($CH_3CN$) max. at 247 nm ($\in$ 7'265). $^1$H-NMR ($CDCl_3$) δ [ppm]: 7.41 (d, J=8, 1 H arom.); 7.29–7.10 (m, 8 H arom.); 5.34 (s, 1 H, —C(O)—$CH(OCH_3)$—.); 3.39 (s, 3 H, —O—$CH_3$); 2.51-2.33 (m, 2 H, —$CH_2$—$CH_2$—Si—); 0.64–0.56 (m, 1 H, —$CH_2$—$CH_2$—Si—); 0.36–0.28 (m, 1 H, —$CH_2$——$CH_2$—Si—); 0.00 (s, 9 H, Si—$(CH_3)_3$); –0.05/–0.06 (2×s, 6 H, 2 Si—$CH_3$). $^{13}$C-NMR ($CDCl_3$) δ [ppm]: 199.0 (C=O); 143.5/134.5/133.3 ($C_{arom}$); 129.1/128.0/126.7/126.5/125.7/123.0 ($HC_{arom}$); 85.7 (OCH); 55.2 ($OCH_3$); 27.4/18.4 ($CH_2$); 0.0 (—Si—$(CH_3)_3$); –1.8 (—Si—$(CH_3)_2$). m/z (GC-EI) kein $M^+$; 279 (29), 163 (13), 147 (100), 121 (57), 73 (10).

Application Examples

Example A1

Curing of a UV-Curable Clear Lacquer

A clear dual-cure system based on polyurethanes is prepared by mixing:

21.1 parts of Desmophen® LS 2009/1, hydroxy-functional polyacrylate (Bayer AG)

32.3 parts of Roskydal® FWO 2518C, isocyanurate-based urethane acrylate 80% in butyl acetate (Bayer AG)

0.3 parts of Baysilone® OL 17, flow improver, 10% in xylene (Bayer AG)

0.3 parts of Modaflow® flow improver, (Monsanto)

26.0 parts of 1-methoxy-2-propanol (Fluka Chemicals)

0.5 parts of Byk® 306, flow improver (Byk-Chemie)

11.2 parts of Roskydal® FWO 2545 E urethane acrylate with isocyanate groups (Bayer AG)

The samples were prepared by adding 2% of the photoinitiator. The mixtures were applied to a white coil-coated aluminium panel, air-dried for 5 min. at room temperature and heated on a hotplate at 80° C. for 10 min. Irradiation is then carried out using a UV processor (2×1120 W/cm) at a belt speed of 5 m/min. A tack-free dry film with a thickness of approximately 40 μm is obtained.

45 min. after cure, the pendulum hardness according to Koenig (DIN 53157) is measured. Surface energy of the coating is determined by measuring static water contact angle θ using a contact angle system G10 from Krüss. The higher the value of the pendulum hardness measurement, the harder the cured surface. The higher the contact angle, the better the moisture resistance and scratch resistance.

| Initiator | pendulum hardness (sec) | water contact angle θ |
|---|---|---|
| Irgacure 651 comparative | 24 | 90 |
| Example 1 | 20 | 96 |
| Example 2 | 11 | 93 |
| Example 4 | 15 | 96 |
| Example 5 | 15 | 94 |
| Irgacure 651: 2,2-dimethoxy-1,2-diphenylethan-1-one | | |

Example A2

A clear UV-curable system based on polyurethane acrylate is prepared by mixing:

50.0 parts of a bifunctional urethane acrylate (Actilan® 200, Akcros)

25.0 parts of tripropylene glycol diacrylate (SR 306, Cray Valley)

15.0 parts of trimethylolpropane triacrylate (TMPTA) (UCB)

10.0 parts of dipentaerythrol pentaacrylate (SR 399, Cray Valley)

The samples were prepared by adding 2% of the photoinitiator.

The mixtures were applied to a white chipboard panel and irradiated using a UV processor (2×80 W/cm) at a belt speed of 3 m/min. A tack-free dry film with a thickness of approximately 50 μm is obtained.

30 min. after cure, the pendulum hardness according to Koenig (DIN 53157) is measured. Surface energy of the coating is determined by measuring static water contact angle θ using a contact angle system G10 from Krüss. The higher the value of the pendulum hardness measurement, the harder the cured surface. The higher the contact angle, the better the moisture resistance and scratch resistance.

| Initiator | pendulum hardness (sec) | water contact angle θ |
|---|---|---|
| Irgacure 651 | 151 | 66 |
| Example 4 | 144 | 70 |

What is claimed is:

1. A process for the production of a coating having a scratch-resistant durable surface, which comprises
   (1) preparing a photocurable formulation comprising
       (A) an ethylenically unsaturated polymerizable compound; and
       (B) a photoinitiator;
   (2) applying the formulation to a substrate; and
   (3) curing the formulation either
       solely by irradiation with electromagnetic radiation of a wavelength ranging from 200 nm into the IR region from 200 to 800 nm or from 200 to 600 nm, or by irradiation with electromagnetic radiation of a wavelength ranging from 200 nm into the IR region from 200 to 800 nm or from 200 to 600 nm, and the prior, simultaneous and/or subsequent action of heat;
   wherein
   the formulation comprises as photoinitiator (B) at least one surface-active photoinitiator, concentrated at the surface of the formulation after applying the formulation to the substrate, of formula Ia or Ib:

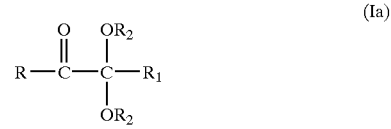

(Ia)

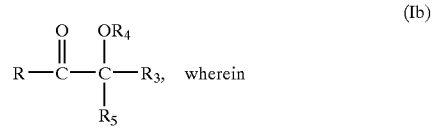

(Ib)

R and $R_3$ are each a radical of formula II

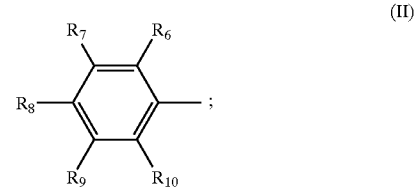

(II)

or

R and $R_3$ are naphthyl, anthracyl, phenanthryl or a heterocyclic radical, the radicals naphthyl, anthracyl, phenanthryl and the heterocycle being unsubstituted or substituted by A-X-, $A_3$-$X_3$-, $C_1$–$C_8$alkyl, phenyl, $OR_{12}$, $SR_{13}$ or/and by $NR_{14}R_{15}$, and the substituents $OR_{12}$, $SR_{13}$ and $NR_{14}R_{15}$ being capable, by way of the radicals $R_{12}$, $R_{13}$, $R_{14}$ and/or $R_{15}$ together with further substituents on the naphthyl ring, anthracyl ring, phenanthryl ring or heterocycle or together with one of the carbon atoms of the naphthyl ring, anthracyl ring, phenanthryl ring or heterocycle, of forming 5- or 6-membered rings;

$R_1$ is hydrogen, $A_1$-$X_1$— or a radical of formula (II), or $R_1$ is $C_1$–$C_{12}$alkyl unsubstituted or substituted by OH, $C_1$–$C_4$alkoxy, phenyl, naphthyl, halogen, CN, —C(O)$R_{11}$ and/or by —O(CO)$R_{11}$; or $R_1$ is $C_2$–$C_{12}$alkyl interrupted by one or more non-consecutive oxygen atoms;

$R_2$ is $A_2$-$X_2$- or $C_1$–$C_{12}$alkyl unsubstituted or substituted by $C_1$–$C_4$alkoxy, phenyl, —C(O)$R_{11}$ and/or by —C(O)$R_{11}$; or the two $R_2$ radicals together are $C_2$–$C_5$alkylene unsubstituted or substituted by $C_1$–$C_4$alkyl or by phenyl;

$R_4$ is hydrogen, $A_4$-$X_4$—; $C_1$–$C_{12}$alkyl unsubstituted or substituted by OH, $C_1$–$C_4$alkoxy, phenyl, naphthyl, halogen, CN, —C(O)$R_{11}$ and/or by —O(CO)$R_{11}$; or $R_4$ is $C_2$–$C_{12}$alkyl interrupted by one or more non-consecutive oxygen atoms;

$R_5$ is hydrogen, $A_5$-$X_5$-, —$CH_2$—$OR_4$; or $C_1$–$C_{12}$alkyl unsubstituted or substituted by OH, $C_1$–$C_4$alkoxy, phenyl, naphthyl, halogen, CN, —C(O)$R_{11}$ and/or by —O(CO)$R_{11}$; or $R_5$ is $C_2$–$C_{12}$alkyl interrupted by one or more non-consecutive oxygen atoms; or $R_5$ is a radical of formula II;

$R_6$, $R_7$, $R_8$, $R_9$, and $R_{10}$ are each independently of the others hydrogen, A-X-, $A_3$-$X_3$-; $C_1$–$C_{12}$alkyl unsubstituted or substituted by OH, $C_1$–$C_4$alkoxy, phenyl, naphthyl, halogen, CN, —C(O)$R_{11}$ and/or by —O(CO)$R_{11}$; or $C_2$–$C_{12}$alkyl interrupted by one or more non-consecutive oxygen atoms; or $R_6$, $R_7$, $R_8$, $R_9$ and $R_{10}$ are each independently $OR_{12}$, $SR_{13}$, $NR_{14}R_{15}$, —C(O)$R_{11}$ or halogen, or phenyl unsubstituted or substituted by $C_1$–$C_4$alkyl or/and by $C_1$–$C_4$alkoxy, the substituents $OR_{12}$, $SR_{13}$ and $NR_{14}R_{15}$ being capable, by way of the radicals $R_{12}$, $R_{13}$, $R_{14}$ and/or $R_{15}$ together with further substituents on the phenyl ring or together with one of the carbon atoms of the phenyl ring, of forming 5- or 6-membered rings;

$R_{11}$ is $C_1$–$C_8$alkyl, or phenyl unsubstituted or substituted by $C_1$–$C_4$alkyl and/or by $C_1$–$C_4$alkoxy;

$R_{12}$ and $R_{13}$ are each independently of the other hydrogen; or $C_1$–$C_{12}$alkyl unsubstituted or substituted by OH, $C_1$–$C_4$alkoxy, phenyl, phenoxy or/and by —O(CO)$R_{11}$; or $R_{12}$ and $R_{13}$ are $C_2$–$C_{12}$alkyl interrupted by one or more non-consecutive oxygen atoms; or $R_{12}$ and $R_{13}$ are phenyl, $C_3$–$C_6$alkenyl, cyclopentyl, cyclohexyl or naphthyl, those radicals being unsubstituted or substituted by $C_1$–$C_4$alkoxy, phenyl or/and by $C_1$–$C_4$alkyl;

$R_{14}$ and $R_{15}$ are each independently of the other hydrogen; $C_1$–$C_{12}$alkyl unsubstituted or substituted by OH, $C_1$–$C_4$alkoxy or/and by phenyl; or $C_2$–$C_{12}$alkyl interrupted by one or more non-consecutive oxygen atoms; or $R_{14}$ and $R_{15}$ are phenyl, —(CO)$R_{11}$ or $SO_2R_{16}$; or $R_{14}$ and $R_{15}$, together with the nitrogen atom to which they are bonded, form a 5-, 6- or 7-membered ring that is optionally interrupted by —O— or by —$NR_{17}$—;

$R_{16}$ is $C_1$–$C_{12}$alkyl, unsubstituted phenyl or phenyl substituted by $C_1$–$C_4$alkyl;

$R_{17}$ is hydrogen, $C_1$–$C_8$alkyl unsubstituted or substituted by OH or by $C_1$–$C_4$alkoxy; or phenyl unsubstituted or substituted by OH, $C_1$–$C_4$alkyl or by $C_1$–$C_4$alkoxy;

with the proviso that in formulae (Ia) and (Ib) at least one substituent A-X-, $A_1$-$X_1$-, $A_2$-$X_2$-, $A_3$-$X_3$-, $A_4$-$X_4$- or $A_5$-$X_5$- is present;

A, $A_1$, $A_2$, $A_3$, $A_4$ and $A_5$ are each independently of the others a surface-active radical of formula III

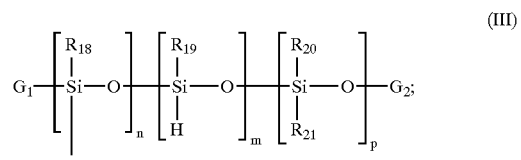

wherein the units IIIa1, IIIa2, IIIa3, IIIa4, IIIa5, IIIa6, IIIa7, IIIb and/or IIIc

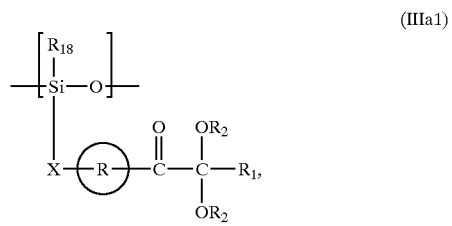

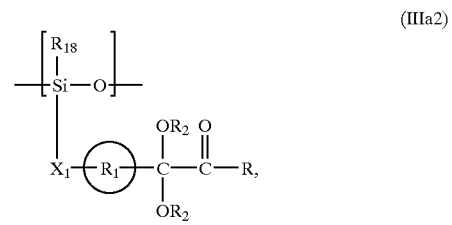

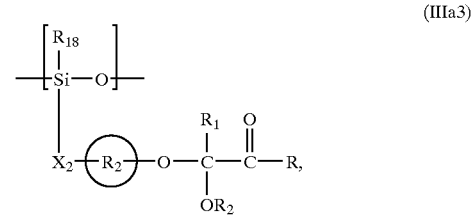

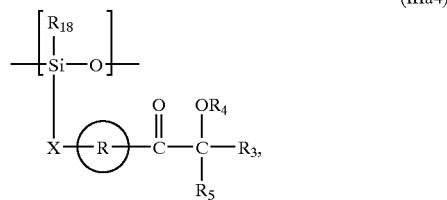

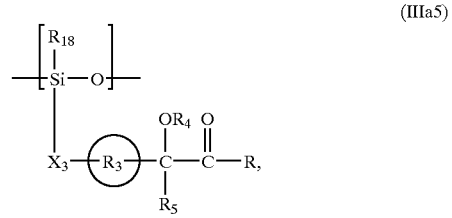

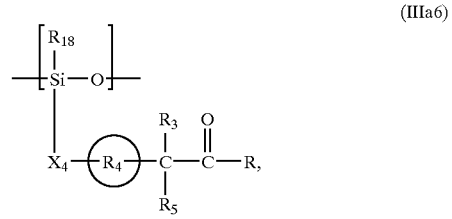

-continued (IIIa7)
$$\left[\begin{array}{c} R_{18} \\ | \\ Si-O \\ | \\ X_5-(R_5)-\overset{OR_4}{\underset{R_3}{C}}-\overset{O}{C}-R, \end{array}\right]$$

(IIIb)
$$\left[\begin{array}{c} R_{19} \\ | \\ Si-O \\ | \\ H \end{array}\right],$$

(IIIc)
$$\left[\begin{array}{c} R_{20} \\ | \\ Si-O \\ | \\ R_{21} \end{array}\right],$$

are distributed randomly or in blocks, and in which formulae the circle is intended to denote that a radical R, $R_1$, $R_2$, $R_3$, $R_4$, $R_5$ as defined above is substituted by the silyl radical of formula (III) by way of the bridge X, $X_1$, $X_2$, $X_3$, $X_4$, $X_5$; or A, $A_1$, $A_2$, $A_3$, $A_4$ and $A_5$ are each independently of the others a surface-active radical $A_0$;

n is a number from 1 to 1000 or, when the siloxane starting material is a mixture of oligomeric siloxanes, n can also be less than 1 but greater than 0;

m is a number from 0 to 100;

p is a number from 0 to 10 000;

$A_0$ is $C_6$–$C_{30}$alkyl, $C_6$–$C_{30}$alkenyl, $C_6$–$C_{30}$alkynyl, $C_6$–$C_{30}$aralkyl, $C_6$–$C_{30}$alkyl-(CO)—, $C_6$–$C_{30}$alkenyl-(CO)—, $C_8$–$C_{30}$alkynyl-(CO)—, $C_6$–$C_{30}$aralkyl-(CO)—, $C_8$–$C_{30}$alkyl-Si($R_{18}$)($R_{19}$)—, $C_6$–$C_{30}$alkenyl-Si($R_{18}$)($R_{19}$)— or $C_6$–$C_{30}$alkynyl-Si($R_{18}$)($R_{19}$) each of which being unsubstituted or substituted by OH, $C_1$–$C_4$alkoxy, phenyl, naphthyl, halogen, CN, $SR_{13}$, $NR_{14}R_{15}$ and/or by —O(CO)$R_{11}$ and optionally being interrupted by one or more —O—, —S— or —$NR_{17}$—;

$G_1$ is $C_1$–$C_{18}$alkyl or a radical of formula $$-O-\underset{\underset{R_{22}}{|}}{\overset{\overset{R_{24}}{|}}{Si}}-R_{23};$$

$G_2$ is $C_1$–$C_{18}$alkyl or a radical of formula $$-\underset{\underset{R_{25}}{|}}{\overset{\overset{R_{27}}{|}}{Si}}-R_{26};$$

or $G_1$ and $G_2$ together are a single bond;

$R_{18}$, $R_{19}$, $R_{20}$, $R_{22}$, $R_{23}$, $R_{24}$, $R_{25}$, $R_{26}$ and $R_{27}$ are each independently of the others $C_1$–$C_{18}$alkyl, phenyl, $C_2$–$C_6$hydroxyalkyl, $C_2$–$C_6$aminoalkyl or $C_5$–$C_8$cycloalkyl;

$R_{21}$ is unsubstituted $C_1$–$C_{18}$alkyl or $C_1$–$C_{18}$alkyl substituted by hydroxy, $C_1$–$C_{12}$alkoxy, halogen, $C_3$–$C_8$cycloalkyl and/or by N($R_{14}$)($R_{15}$); or $R_{21}$ is unsubstituted phenyl or phenyl substituted by $C_1$–$C_{12}$alkyl, $C_1$–$C_{12}$alkoxy, halogen, hydroxy and/or by N($R_{14}$)($R_{15}$); or $R_{21}$ is $C_5$–$C_8$cycloalkyl;

X and $X_3$, when A or $A_3$ is a radical of formula III, are each independently of the other a single bond,
—U—$C_1$–$C_{10}$alkylene, —U—$C_3$–$C_{12}$cycloalkylene,
—U—$C_6$–$C_{12}$bicycloalkylene, —U—$C_1$–$C_{10}$alkylene interrupted by one or more non-consecutive $C_3$–$C_{12}$cycloalkylene,
—U—$C_3$–$C_{12}$cycloalkylene, $C_6$–$C_{12}$bicycloalkylene or —U—$C_6$–$C_{12}$bicycloalkylene,
—U—$C_1$–$C_{10}$alkylene interrupted by one or more non-consecutive O and $C_3$–$C_{12}$cycloalkylene,
—U—$C_3$–$C_{12}$cycloalkylene, $C_6$–$C_{12}$bicycloalkylene and/or —U—$C_6$–$C_{12}$bicycloalkylene, $$-(CH_2)_a-\underset{\underset{O-CO-(CH_2)_b-}{|}}{CH}-CH_2-OH\;,$$

$$-(CH_2)_a-O-(CH_2)_b-\underset{\underset{O-CO-(CH_2)_c-}{|}}{CH}-CH_2-OH\;,$$

—$(CH_2)_a$—CH(OH)—$CH_2$—O—CO—$(CH_2)_b$—,
—$(CH_2)_a$-O—$(CH_2)_b$—CH(OH)—$CH_2$—O—CO—$(CH_2)_c$—,
$C_2$–$C_{10}$alkenylene, $C_2$–$C_{10}$alkynylene, —$(CH_2)_a$—O—, —O—$(CH_2)_a$—, —O—$(CH_2)_a$—O—,
—$(CH_2)_a$—O—$(CH_2)_b$—, —$(CH_2)_a$—O—$(CH_2)_b$—O—, —$(CH_2)_a$—$NR_{17}$—$(CH_2)_b$—, —$(CH_2)_a$—$NR_{17}$—,
—$(CH_2)_a$—O—$(CH_2)_b$—$NR_{17}$—, —$(CH_2)_a$—O—$(CH_2)_b$—$NR_{17}$—$(CH_2)_c$—,
—$(C_2$–$C_{10}$alkenylene)—O—$(CH_2)_a$—,
—$(C_2$–$C_{10}$alkenylene)-O—, —$(C_2$–$C_{10}$alkynylene)—O—$(CH_2)_a$—, —$(C_2$–$C_{10}$alkynylene)-O—,
—$(C_2$–$C_{10}$alkenylene)-O—$(CH_2)_a$—O—,
—$(C_2$–$C_{10}$alkynylene)-O—$(CH_2)_a$—O—,
—$(C_2$–$C_{10}$alkenylene)-$NR_{17}$—,
—$(C_2$–$C_{10}$alkenylene)-O—$(CH_2)_a$—$NR_{17}$—,
—$(C_2$–$C_{10}$alkynylene)-$NR_{17}$— or
—$(C_2$–$C_{10}$alkynylene)-O—$(CH_2)_a$—$NR_{17}$—;

and

X and $X_3$, when A or $A_3$ denotes $A_0$, are each independently of the other a single bond, —O—, —S— or —$NR_{17}$—;

$X_1$ and $X_5$, when $A_1$ or $A_5$ is a radical of formula III, are each independently of the other a single bond,
—$CH_2$—U—$C_1$–$C_{10}$alkylene, —$CH_2$—U—$C_3$–$C_{12}$cycloalkylene,
—$CH_2$—U—$C_6$–$C_{12}$bicycloalkylene, —$CH_2$—U—$C_1$–$C_{10}$alkylene interrupted by one or more non-consecutive $C_3$–$C_{12}$cycloalkylene,
—U—$C_3$–$C_{12}$cycloalkylene, $C_6$–$C_{12}$bicycloalkylene or —U—$C_6$–$C_{12}$bicycloalkylene,
—U—$C_1$–$C_{10}$alkylene interrupted by one or more non-consecutive O and $C_3$–$C_{12}$cycloalkylene,
—U—$C_3$–$C_{12}$cycloalkylene, $C_6$–$C_{12}$bicycloalkylene and/or —U—$C_6$–$C_{12}$bicycloalkylene, $$-(CH_2)_a-\underset{\underset{O-CO-(CH_2)_d-}{|}}{CH}-CH_2-OH\;,$$

-continued

—(CH$_2$)$_a$—O—(CH$_2$)$_b$—CH—CH$_2$—OH ,
                              |
                              O—CO—(CH$_2$)$_d$—

—(CH$_2$)$_a$—CH(OH)—CH$_2$—O—CO—(CH$_2$)$_d$—,
—(CH$_2$)$_a$—O—(CH$_2$)$_b$—CH(OH)—CH$_2$—O—CO—(CH$_2$)$_d$—,
C$_2$–C$_{10}$alkenylene, C$_2$–C$_{10}$alkynylene —(CH$_2$)$_a$—O—, —(CH$_2$)$_a$—O—(CH$_2$)$_b$—, —(CH$_2$)$_a$—O—(CH$_2$)$_b$—O—,
—(CH$_2$)$_a$—O—(CH$_2$)$_b$—O—(CH$_2$)$_c$—, —(CH$_2$)$_a$—NR$_{17}$—(CH$_2$)$_a$—NR$_{17}$—(CH$_2$)$_b$—O—,
—(CH$_2$)$_a$—NR$_{17}$—(CH$_2$)$_b$—O—(CH$_2$)$_c$—,
—(C$_2$–C$_{10}$alkenylene)—O—(CH$_2$)$_a$—,
—(C$_2$–C$_{10}$alkenylene)—O—,
—(C$_2$–C$_{10}$alkynylene)-O—(CH$_2$)$_a$—,
—(C$_2$–C$_{10}$alkynylene)-O—, —(C$_2$–C$_{10}$alkenylene)-NR$_{17}$—(CH$_2$)$_a$—,
—(C$_2$–C$_{10}$alkenylene)-NR$_{17}$—(CH$_2$)$_a$—,
—(C$_2$–C$_{10}$alkenylene)-NR$_{17}$—(CH$_2$)$_a$—O—(CH$_2$)$_c$—,
—(C$_2$–C$_{10}$alkynylene)-NR$_{17}$—(CH$_2$)$_a$—,
—(CH$_2$–C$_{10}$alkynylene)-NR$_{17}$—(CH$_2$)$_a$—O— or
—(C$_2$–C$_{10}$alkynylene)-NR$_{17}$—(CH$_2$)$_a$—O—(CH$_2$)$_c$—; and X$_1$ and X$_5$, when A$_1$ or A$_5$ denotes A$_0$, are each independently of the other a single bond;

X$_2$ and X$_4$, when A$_2$ or A$_4$ is a radical of formula III, are each independently of the other a single bond,
—CH$_2$—U—C$_1$–C$_{10}$alkylene, —CH$_2$—U—C$_3$–C$_{12}$cycloalkylene,
—CH$_2$—U—C$_6$–C$_{12}$bicycloalkylene, —CH$_2$—U—C$_1$–C$_{10}$alkylene interrupted by one or more non-consecutive
C$_3$–C$_{12}$cycloalkylene, —U—C$_3$–C$_{12}$cycloalkylene, C$_6$–C$_{12}$bicycloalkylene or —U—C$_6$–C$_{12}$bicycloalkylene,
—CH$_2$—U—C$_1$–C$_{10}$alkylene interrupted by one or more non-consecutive O and C$_3$–C$_{12}$cycloalkylene,
—CH$_2$—U—C$_3$–C$_{12}$cycloalkylene, C$_6$–C$_{12}$bicycloalkylene and/or —U—C$_6$–C$_{12}$bicycloalkylene, —(CH$_2$)$_a$—CH—CH$_2$—OH ,
              |
              O—CO—(CH$_2$)$_d$—

—(CH$_2$)$_a$—O—(CH$_2$)$_b$—CH—CH$_2$—OH ,
                              |
                              O—CO—(CH$_2$)$_d$—

—(CH$_2$)$_a$—CH(OH)—CH$_2$—O—CO—(CH$_2$)$_d$—,
—(CH$_2$)$_a$—O—(CH$_2$)$_b$—CH(OH)—CH$_2$—O—CO—(CH$_2$)$_d$—,
C$_2$–C$_{10}$alkenylene, C$_2$–C$_{10}$alkynylene, —(CH$_2$)$_a$—O—, —(CH$_2$)$_a$—O—(CH$_2$)$_b$—, —(CH$_2$)$_a$—O—(CH$_2$)$_b$—O—,
—(CH$_2$)$_a$—NR$_{17}$—(CH$_2$)$_b$—, —(CH$_2$)$_a$—NR$_{17}$—(CH$_2$)$_b$—O—, —(CH$_2$)$_a$—NR$_{17}$—(CH$_2$)$_b$—O—(CH$_2$)$_c$—,
—(C$_2$–C$_{10}$alkenylene)-O—(CH$_2$)$_a$—,
—(C$_2$–C$_{10}$alkenylene)-O—, —(C$_2$–C$_{10}$alkynylene)-O—(CH$_2$)$_a$— or
—(C$_2$–C$_{10}$alkynylene)-O—; and X$_2$ and X$_4$, when A$_2$ or A$_4$ denotes A$_0$, are each independently of the other a single bond;
—U— is —COO—, —(CH$_2$)$_a$—COO— —Si— or (CH$_2$)$_a$—Si— a, b and c are each independently of the others a number from 0 to 10; with the proviso, however, that they are at least 1 when the methylene group is positioned between two oxygen atoms or between an oxygen atom and a nitrogen atom, d is a number from 1 to 10.

2. A process according to claim 1, wherein in the compounds of formulae Ia and Ib R and R$_3$ are a radical of formula II or naphthyl that is unsubstituted or substituted by A-X-, A$_3$-X$_3$-, C$_1$–C$_8$alkyl and/or by OR$_{12}$;

R$_1$ is A$_1$-X$_1$— or a radical of formula (II);

R$_2$ is C$_1$–C$_{12}$alkyl or A$_2$-X$_2$-; or the two R$_2$ radicals together are C$_2$–C$_5$alkylene;

R$_4$ is hydrogen, C$_1$–C$_{12}$alkyl or A$_4$-X$_4$-;

R$_5$ is hydrogen, C$_1$–C$_{12}$alkyl, A$_5$-X$_5$-, —CH$_2$—OR$_4$ or a radical of formula II;

R$_6$, R$_7$, R$_8$, R$_9$ and R$_{10}$ are each independently of the others hydrogen; A-X-, A$_3$-X$_3$-, OR$_{12}$, halogen, phenyl, C$_1$–C$_{12}$alkyl; or C$_2$–C$_{12}$alkyl interrupted by one or more non-consecutive oxygen atoms;

R$_{12}$ is hydrogen, phenyl, C$_3$–C$_6$alkenyl, cyclopentyl, cyclohexyl, C$_1$–C$_{12}$alkyl, or C$_2$–C$_{12}$alkyl interrupted by one or more non-consecutive oxygen atoms;

A, A$_1$, A$_2$, A$_3$, A$_4$ and A$_5$ are each independently of the others a surface-active radical of formula III or a surface-active radical A$_0$;

A$_0$ is C$_6$–C$_{30}$alkyl, C$_6$–C$_{30}$aralkyl, C$_6$–C$_{30}$alkyl-(CO)—, C$_6$–C$_{30}$aralkyl-(CO)—, C$_6$–C$_{30}$alkyl-Si(R$_{18}$)(R$_{19}$)—, those radicals being unsubstituted or substituted by F;

R$_{18}$, R$_{19}$, R$_{20}$, R$_{21}$, R$_{22}$, R$_{23}$, R$_{24}$, R$_{25}$, R$_{26}$ and R$_{27}$ are each independently of the others C$_1$–C$_{18}$alkyl or phenyl;

X and X$_3$, when A or A$_3$ is a radical of formula III, are C$_1$–C$_{10}$alkylene, —(CH$_2$)$_a$—O—, —O—(CH$_2$)$_a$—O—, —(CH$_2$)$_a$—O—(CH$_2$)$_b$—, —(CH$_2$)$_a$—O—(CH$_2$)$_b$—O—, —(CH$_2$)$_a$—NR$_{17}$—(CH$_2$)$_b$—, —(CH$_2$)$_a$—NR$_{17}$— or —(CH$_2$)$_a$—O—(CH$_2$)$_b$—NR$_{17}$—; and X and X$_3$, when A or A$_3$ denotes A$_0$, are a single bond, —O—, —S— or —NR$_{17}$—;

X$_1$ and X$_5$, when A$_1$ or A$_5$ is a radical of formula III, are each independently of the other C$_1$–C$_{10}$alkylene, —(CH$_2$)$_a$—O—, —(CH$_2$)$_a$—O—(CH$_2$)$_b$—, —(CH$_2$)$_a$—O—(CH$_2$)$_b$—O— or —(CH$_2$)$_a$—NR$_{17}$—(CH$_2$)$_b$—; and X$_1$ and X$_5$, when A$_1$ or A$_5$ denotes A$_0$, are each independently of the other a single bond;

X$_2$ and X$_4$, when A$_2$ or A$_4$ is a radical of formula III, are each independently of the other a single bond, C$_1$–C$_{10}$alkylene, —(CH$_2$)$_a$—O—, —(CH$_2$)$_a$—O—(CH$_2$)$_b$—, —(CH$_2$)$_a$—O—(CH$_2$)$_b$—O— or —(CH$_2$)$_a$—NR$_{17}$—(CH$_2$)$_b$—; and X$_2$ and X$_4$, when A$_2$ or A$_4$ denote A$_0$, are each independently of the other a single bond.

3. A process according to claim 1, wherein in the compounds of formulae Ia and Ib
R and R$_3$ are a radical of formula II,
R$_1$ is a radical of formula II;
R$_2$ is C$_1$–C$_{12}$alkyl;
R$_4$ is hydrogen or C$_1$–C$_{12}$alkyl;
R$_5$ is hydrogen or A$_0$;
R$_6$, R$_7$, R$_8$, R$_9$ and R$_{10}$ are each independently of the others hydrogen or A-X-;
A is a surface-active radical of formula III or a surface-active radical A$_0$;

$A_0$ is $C_6$–$C_{30}$alkyl, $C_6$–$C_{30}$alkyl-(CO)—, wherein the $C_6$–$C_{30}$alkyl, $C_6$–$C_{30}$alkyl-(CO)— radicals being unsubstituted or substituted by F;

$R_{18}$, $R_{19}$, $R_{20}$, $R_{21}$, $R_{22}$, $R_{23}$, $R_{24}$, $R_{25}$, $R_{26}$ and $R_{27}$ are each independently of the others $C_1$–$C_{18}$alkyl or phenyl;

X is $C_1$–$C_{10}$alkylene, —$(CH_2)_a$—O—, —O—$(CH_2)_a$—O—, —$(CH_2)_a$—O—$(CH_2)_b$— or —$(CH_2)_a$—O—$(CH_2)_b$—O—.

4. A composition comprising (A) at least one ethylenically unsaturated free-radical-photopolymerizable compound; and (B) at least one surface-active photoinitiator of formula Ia or Ib according to claim 1.

5. A composition according to claim 4, comprising (A) at least one ethylenically unsaturated free-radical-photopolymerizable compound;

(B) at least one surface-active photoinitiator of formula Ia or Ib; and (C) at least one thermally crosslinkable compound.

6. A composition according to claim 4, comprising, in addition to components (A) and (B), further additives (D) and/or additional photoinitiators (E).

7. A compound of formula Ia or Ib as defined in claim 1.

8. A process according to claim 1, wherein the photocurable formulation comprises as further component at least one thermally crosslinkable compound (C), and wherein the formulation is cured by irradiation with electromagnetic radiation of a wavelength ranging from 200 nm into the IR region, and the prior, simultaneous and/or subsequent action of heat.

9. A process according to claim 8, wherein the thermally crosslinkable compound (C) is a binder based on a polyacrylate with melamine or on a melamine derivative, or a system based on a polyacrylate polyol or/and polyester polyol with an unblocked polyisocyanate or polyisocyanurate.

10. A process according to claim 1 for the production of pigmented or unpigmented surface coatings, powder coatings, gel coats, composite materials or glass fibre cable coatings.

11. A method of concentrating a photoinitiator at the surface of coatings comprising ethylenically unsaturated photopolymerizable compounds, wherein there is added to the photopolymerizable mixture comprising the ethylenically unsaturated photopolymerizable compounds a surface-active photoinitiator of formula Ia or Ib as defined in claim 1.

12. A coated substrate that is coated on at least one surface with a composition according to claim 4.

13. A composition according to claim 5, comprising, in addition to components (A), (B) and (C), further additives (D) and/or additional photoinitiators (E).

14. A coated substrate that is coated on at least one surface with a composition according to claim 5.

* * * * *